US008218093B2

(12) United States Patent
Kondo et al.

(10) Patent No.: US 8,218,093 B2
(45) Date of Patent: Jul. 10, 2012

(54) REMOTE CONTROLLER, IMAGE SIGNAL PROCESSING APPARATUS, AND IMAGE SIGNAL PROCESSING METHOD

(75) Inventors: Tetsujiro Kondo, Tokyo (JP); Hiroto Kimura, Tokyo (JP); Yoshiaki Oikawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 544 days.

(21) Appl. No.: 12/496,158

(22) Filed: Jul. 1, 2009

(65) Prior Publication Data

US 2010/0007790 A1 Jan. 14, 2010

(30) Foreign Application Priority Data

Jul. 14, 2008 (JP) ................................. 2008-182140

(51) Int. Cl.
*H04N 5/445* (2011.01)
*H04N 5/44* (2011.01)
*G09B 21/00* (2006.01)

(52) U.S. Cl. .......................... 348/734; 348/564; 340/4.11

(58) Field of Classification Search .................. 348/564, 348/734; 340/4.11, 22–26; 345/156
See application file for complete search history.

(56) References Cited

U.S. PATENT DOCUMENTS

| | | | |
|---|---|---|---|
| 6,703,962 B1 * | 3/2004 | Marics et al. ................. 341/176 |
| 6,795,318 B2 * | 9/2004 | Haas et al. ..................... 361/729 |
| 2003/0052860 A1 * | 3/2003 | Park et al. ...................... 345/156 |
| 2004/0125080 A1 * | 7/2004 | Ha et al. ......................... 345/156 |
| 2008/0307459 A1 * | 12/2008 | Migos ............................. 725/39 |
| 2009/0307395 A1 * | 12/2009 | Umeo et al. .................... 710/61 |
| 2010/0172109 A1 * | 7/2010 | Friedlander et al. .......... 361/732 |

FOREIGN PATENT DOCUMENTS

JP 2005-45762 2/2005

OTHER PUBLICATIONS

U.S. Appl. No. 12/474,956, filed May 29, 2009, Machimura, et al.

* cited by examiner

*Primary Examiner* — Scott Beliveau
*Assistant Examiner* — Alexander Q Huerta
(74) *Attorney, Agent, or Firm* — Oblon, Spivak, McClelland, Maier & Neustadt, L.L.P.

(57) ABSTRACT

A remote controller includes a base unit having a transmission section configured to transmit a remote control signal, a plurality of function operation units connected to the base unit and configured to operate different functions, and a priority setting section configured to set priorities of the plurality of function operation units. When each of the plurality of function operation units is operated, the transmission section of the base unit sends transmission data, the transmission data including operation data and priority data that indicates the priorities of the plurality of function operation units set by the priority setting section.

12 Claims, 40 Drawing Sheets

FIG. 4

| CATEGORY | CONNECTION STATE | DATA 1 | DATA 2 | DATA 3 | DATA 4 | CHECKSUM |
|---|---|---|---|---|---|---|
| 8 bit | 10 bit | 8 bit | 8 bit | 8 bit | 8 bit | 8 bit |

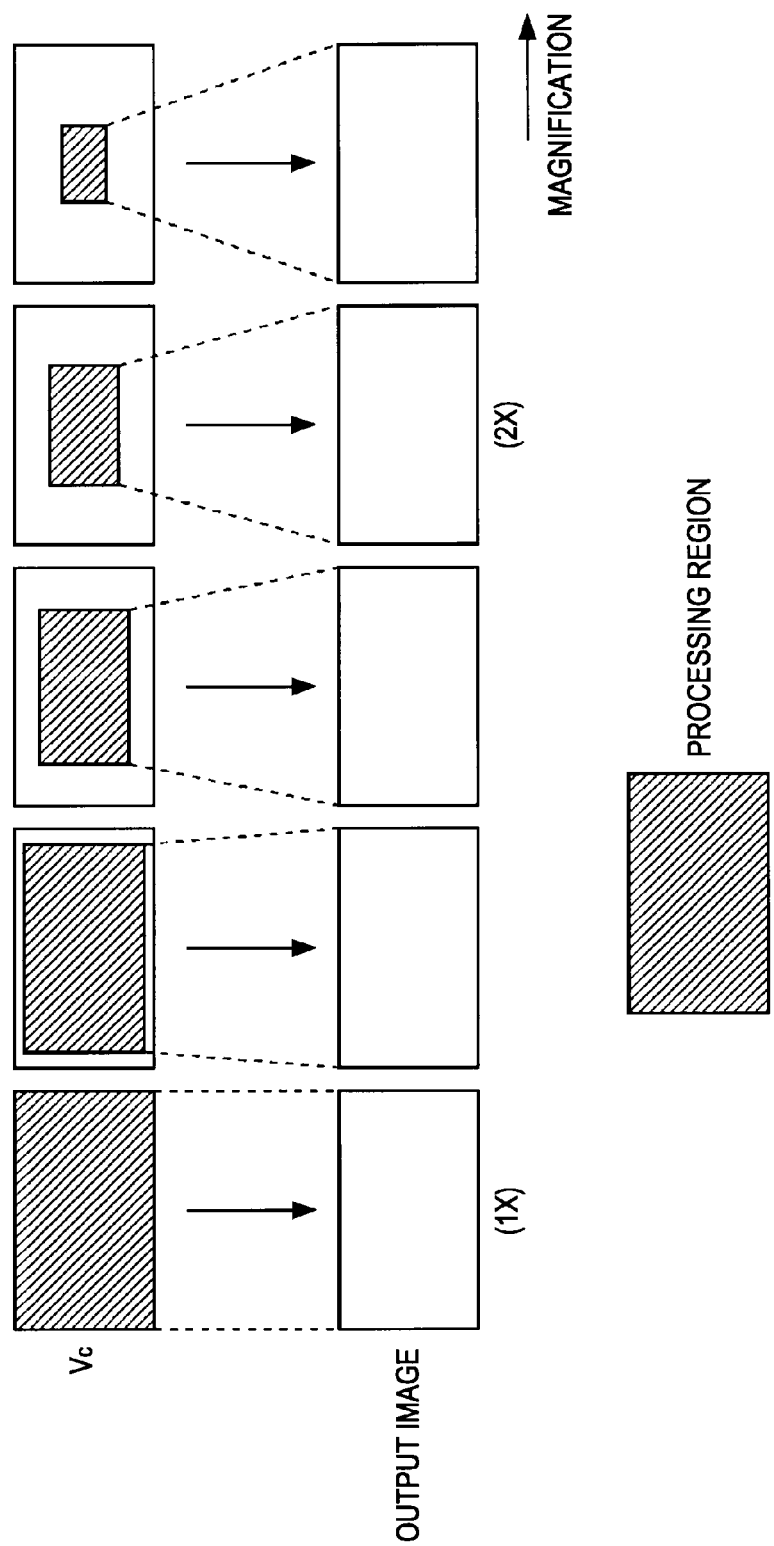

● POSITION OF CENTER OF GRAVITY

▨ PROCESSING REGION

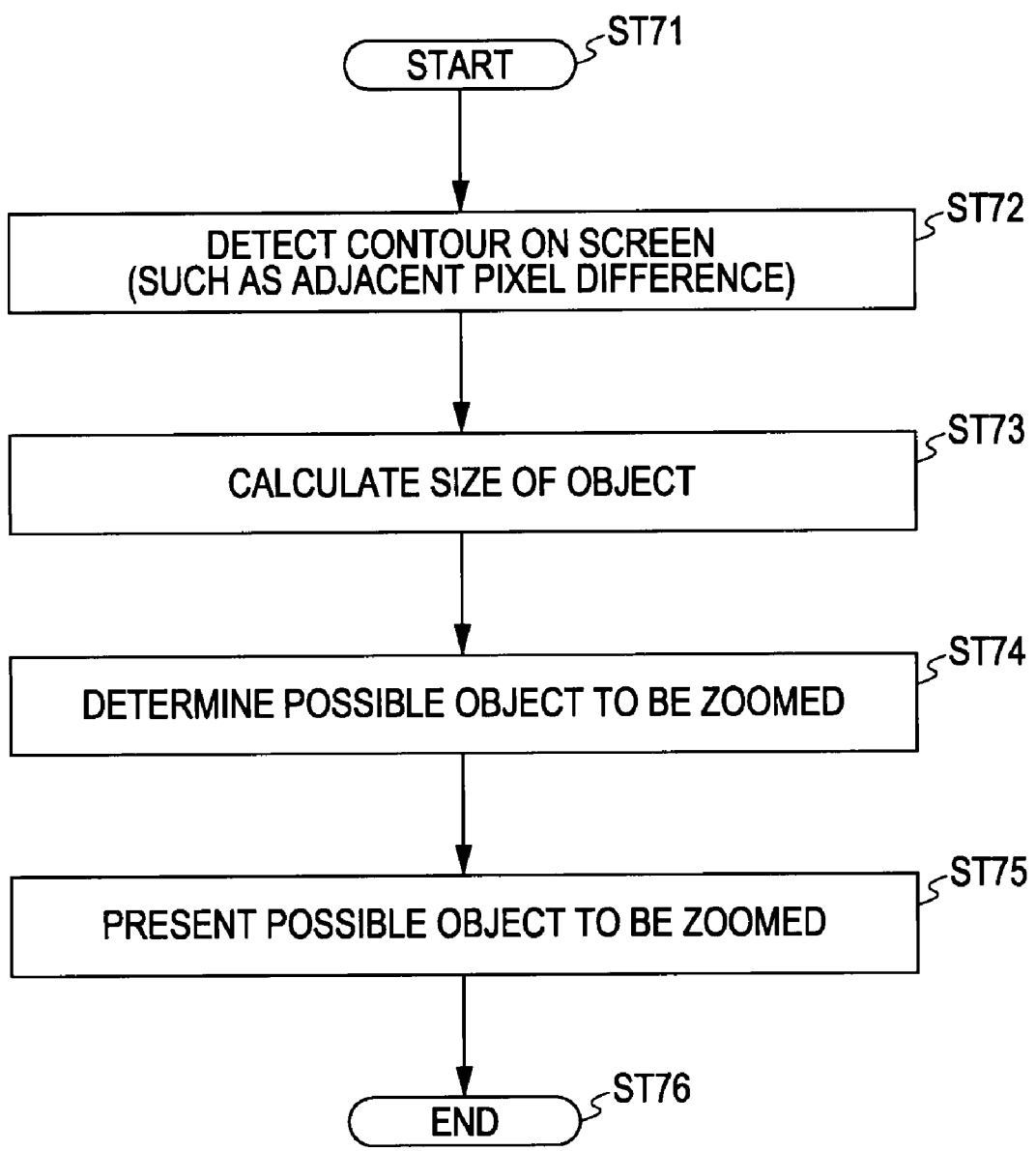

REMOTE CONTROLLER, IMAGE SIGNAL PROCESSING APPARATUS, AND IMAGE SIGNAL PROCESSING METHOD

BACKGROUND OF THE INVENTION

1. Field of the Invention

The present invention relates to a remote controller, an image signal processing apparatus, and an image signal processing method. More specifically, the present invention relates to a remote controller configured such that a plurality of function operation units that operate different functions are connected to a base unit and configured to send operation data and priority data that indicates the priorities of the plurality of function operation units so that the function operation for a device to operate can be performed in an appropriate order.

The present invention also relates to an image signal processing apparatus and an image signal processing method in which when it is determined that operation data included in transmission data is operation data of a function operation unit with the highest priority on the basis of priority data included in the transmission data, an image signal is processed on the basis of the operation data and then operation data of the other function operation units is set in the order specified in the priority data to perform processing so that function operations can be performed in an appropriate order.

2. Description of the Related Art

Japanese Unexamined Patent Application Publication No. 2005-45762 describes that a remote controller (hereinafter referred to also as "remote control") is constructed by assembling units to easily implement function extension.

SUMMARY OF THE INVENTION

Japanese Unexamined Patent Application Publication No. 2005-45762 does not mention a function that utilizes the relationship between the connected units. In general, in a device to operate which is capable of performing a plurality of function operations, there may be less effect depending on the order of the function operations or, worst, there may be an adverse effect.

It is therefore desirable to provide a mechanism in which function operations in a device to operate can be performed in an appropriate order.

An embodiment of the present invention provides a remote controller including a base unit having a transmission section configured to transmit a remote control signal, a plurality of function operation units connected to the base unit and configured to operate different functions, and a priority setting section configured to set priorities of the plurality of function operation units. When each of the plurality of function operation units is operated, the transmission section of the base unit sends transmission data, the transmission data including operation data and priority data that indicates the priorities of the plurality of function operation units set by the priority setting section.

Another embodiment of the present invention provides an image signal processing apparatus including a transmission data receiving section configured to receive transmission data, the transmission data including operation data and priority data that indicates priorities of a plurality of function operation units, an image signal processing section configured to process an input image signal to obtain an output image signal, and a control section configured to control an operation of the image signal processing section based on the transmission data received by the transmission data receiving section. When it is determined, based on the priority data included in the transmission data, that the operation data included in the transmission data is operation data of a highest-priority one of the function operation units, the control section controls the operation of the image signal processing section based on the operation data, then sets operation data of the other function operation units in an order specified by the priority data, and performs processing.

The remote controller may be configured such that a plurality of function operation units that operate different functions are connected to a base unit having a transmission section for transmitting a remote control signal. When each function operation unit is operated, the transmission section of the base unit may send transmission data including operation data and priority data that indicates the priorities of the plurality of function operation units.

The priorities of the plurality of function operation units may be set by the priority setting section. In the priority setting section, for example, the priorities may be set in accordance with an order in which the plurality of function operation units are connected to the base unit. Since the priorities are assigned in accordance with the connection order, a user can merely change the connection order of the plurality of function operation units to easily change the priorities.

For example, each of the function operation units may include a data obtaining section configured to obtain data from another one of the function operation units that is connected to the function operation unit, the data being adapted to identify the other one of the function operation units, and a data supply section configured to supply data to the other one of the function operation units, the data being adapted to identify the function operation unit. The priority data that indicates the priorities of the plurality of function operation units may include data obtained by the data obtaining sections of the plurality of function operation units. For example, the plurality of function operation units may send the data obtained by the data obtaining sections to the base unit using different lines.

Further, in the priority setting section, for example, the priorities may be set in accordance with priority setting values of the plurality of function operation units. In this case, each of the function operation units may be provided with setting means for setting a priority, such as a dual in-line package (DIP) switch. Therefore, since the priorities are set in accordance with the priority setting values, a user can change the priorities, as desired, using the setting means without changing the connection order of the function operation units.

In the transmission data receiving section of the image signal processing apparatus, for example, transmission data sent from the remote controller described above may be received. As described above, the transmission data may include operation data and priority data that indicates the priorities of the plurality of function operation units. In the image signal processing section, an input image signal may be processed to obtain an output image signal. As described above, the operation of the image signal processing section may be controlled based on the transmission data received by the transmission data receiving section.

Here, when it is determined, based on the priority data included in the transmission data, that the operation data included in the transmission data is operation data of a function operation unit with the highest priority, the operation of the image signal processing section may be controlled based on this operation data. Then, operation data of the other function operation units may be set in the order specified by the priority data. In this case, at least one of controlling the operation of the image signal processing section based on the set operation data of the other function operation units and superimposing on the output image signal a display signal for presenting the set operation data of the other function operation units to a user may be performed. In this manner, when operation data of the other function operation units is superimposed on the output image signal, in response to a user selection, the operation of the image signal processing section may be controlled based on selected operation data.

As described above, transmission data including operation data and priority data that indicates the priorities of a plurality of function operation units may be sent from a remote controller. In a device to operate, for example, an image signal processing apparatus, when the operation data included in the transmission data is operation data of a function operation unit with the highest priority, an image signal may be processed on the basis of this operation data. Then, operation data of the other function operation units may be set in the order specified in the priority data to perform processing. In the device to operate, therefore, the function operations can be performed in an appropriate order.

A remote controller according to an embodiment of the present invention may be configured such that a plurality of function operation units that operate different functions are connected to a base unit, and may be configured to send transmission data including operation data and priority data that indicates the priorities of the plurality of function operation units. Function operations in a device to operate can be performed in an appropriate order.

In an image signal processing apparatus according to another embodiment of the present invention, when it is determined that operation data included in transmission data is operation data of a function operation unit with the highest priority on the basis of priority data included in the transmission data, an image signal may be processed on the basis of the operation data and then operation data of the other function operation units may be set in the order specified in the priority data to perform processing. Function operations can be performed in an appropriate order.

BRIEF DESCRIPTION OF THE DRAWINGS

FIG. 4 is a diagram illustrating an example structure of transmission data included in a remote control signal sent from a transmission section of a base unit of the remote controller;

FIG. 15 is a diagram illustrating the relationship between zoom magnifications and processing regions of the input (image signal Vc) for obtaining pixel data items at individual positions of interest of the output (image signal Vd);

FIG. 39 is a flowchart illustrating a process procedure for detecting an object on a screen and displaying a possible object to be zoomed;

DESCRIPTION OF THE PREFERRED EMBODIMENTS

Figure 1:
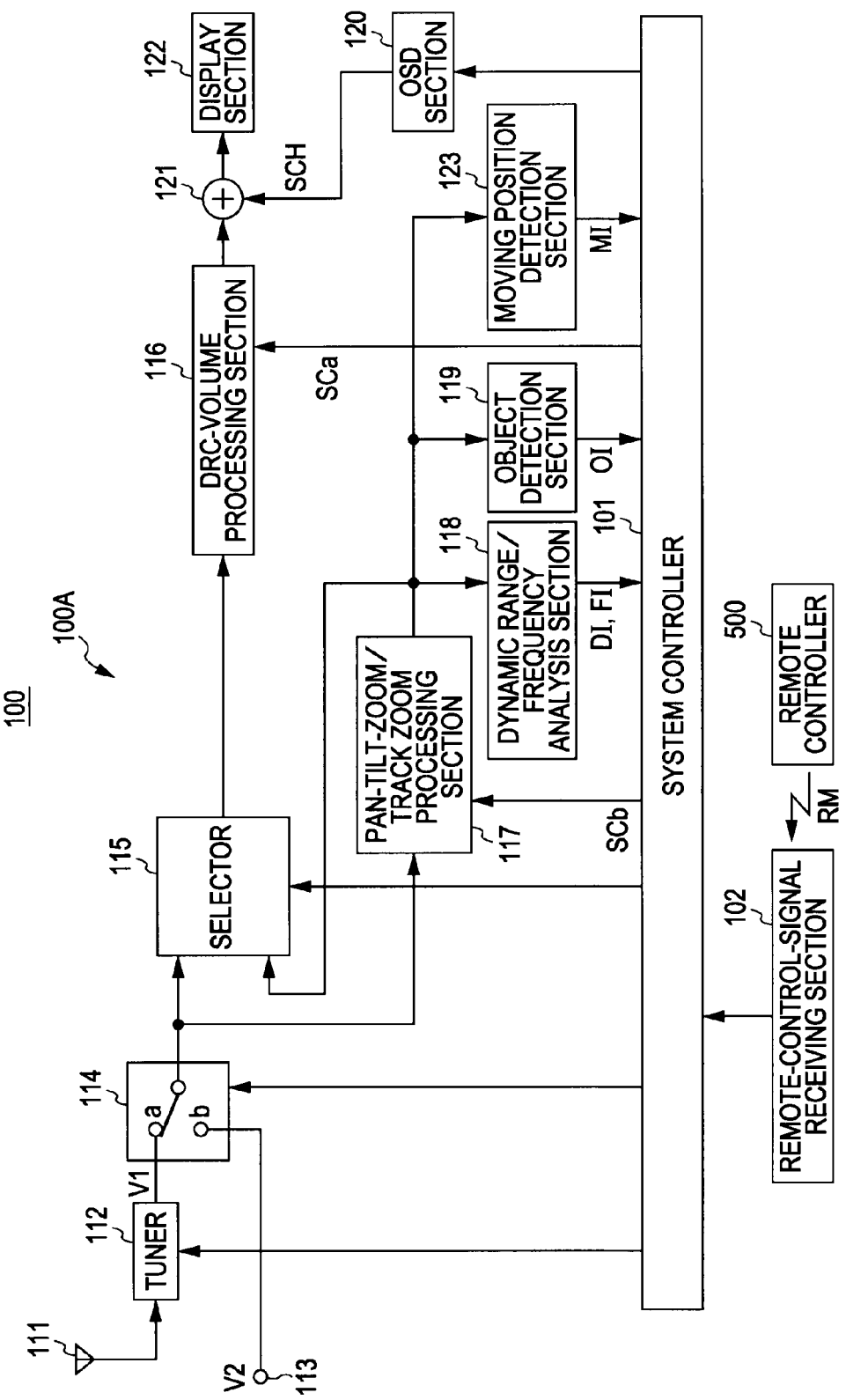
FIG. 1 is a block diagram illustrating an example configuration of a television receiver according to an embodiment of the present invention.

Embodiments of the present invention will be described hereinafter with reference to the drawings. FIG. 1 illustrates an example configuration of a television receiver 100 according to an embodiment of the present invention.

The television receiver 100 includes a system controller 101, a remote-control-signal receiving section 102, and a remote controller 500. The television receiver 100 further includes a receiving antenna 111, a tuner 112, an external input terminal 113, a selector switch 114, a selector 115, a DRC-volume processing section 116, and a pan-tilt-zoom/track zoom processing section 117. The television receiver 100 further includes a dynamic range/frequency analysis section 118, an object detection section 119, a moving position detection section 123, an on-screen display (OSD) section 120, a combining section 121, and a display section 122.

The system controller 101 controls the operation of the individual sections of the television receiver 100. The system controller 101 includes, for example, a micro processing unit (MPU), a read only memory (ROM) having stored therein an operation program of the MPU and the like, and a random access memory (RAM) serving as a working area of the MPU.

The system controller 101 is connected to the remote-control-signal receiving section 102. The remote-control-signal receiving section 102 receives a remote control signal RM that is output from the remote controller 500 in accordance with a user operation, and supplies transmission data included in the remote control signal RM to the system controller 101.

The receiving antenna 111 receives a television broadcast signal. The tuner 112 performs a channel selection process or the like on the broadcast signal received by the receiving antenna 111 to obtain a standard definition (SD) signal V1 (525i signal). The external input terminal 113 is a terminal to which an SD signal V2 (525i signal) is input from outside. The selector switch 114 receives the SD signal V1 obtained by the tuner 112 and the SD signal V2 input from the external input terminal 113, and selectively outputs one of the SD signals V1 and V2.

The selector 115 selectively takes out and outputs one of the SD signal output from the selector switch 114 and an SD signal output from the pan-tilt-zoom/track zoom processing section 117.

The DRC-volume processing section 116 may serve as an image signal processing section (image quality adjustment function section). The DRC-volume processing section 116 performs a process so as to convert an input image signal into an image signal having an image quality corresponding to the value of an image quality parameter. A control signal SCa sent from the system controller 101 to the DRC-volume processing section 116 includes the value of an image quality parameter r that indicates the resolution and the value of an image quality parameter z that indicates the noise removal level (noise suppression level). The image quality parameters r and z may be set by a user or may be set automatically. The DRC-volume processing section 116 will be described in detail below.

The pan-tilt-zoom/track zoom processing section 117 may serve as an image signal processing section (a pan-tilt-zoom function section and a track-zoom function section). The pan-tilt-zoom/track zoom processing section 117 performs a zoom process so that the center of the zoom process can be placed on an object at a position specified by a user within an image based on the input image signal. In this case, the user moves the center of the zoom process along the horizontal direction, thereby achieving panning in which the center of a zoomed image sequentially moves along the horizontal direction. The user moves the center of the zoom process along the vertical direction, thereby achieving tilting in which the center of a zoomed image sequentially moves along the vertical direction.

Further, the pan-tilt-zoom/track zoom processing section 117 obtains object information that indicates a given object included in the image based on the input image signal, and performs a track-zoom process on the input image signal on the basis of the object information.

A control signal SCb sent from the system controller 101 to the pan-tilt-zoom/track zoom processing section 117 includes zoom position information specified by the user, zoom ratio information set automatically or by the user, and object information regarding an object to be tracked which is specified by the user. The pan-tilt-zoom/track zoom processing section 117 will be described in detail below.

The dynamic range/frequency analysis section 118 analyzes an image signal obtained by the pan-tilt-zoom/track zoom processing section 117 to obtain dynamic range information DI and frequency information FI, and supplies the dynamic range information DI and frequency information FI to the system controller 101.

For example, the dynamic range/frequency analysis section 118 cuts a frame image signal (luminance signal) into blocks of eight pixels by eight pixels, and determines the average value of differences between minimum values and maximum values of pixel signals in the resulting blocks. The determined average value may be used as the dynamic range information DI.

Further, for example, the dynamic range/frequency analysis section 118 cuts a frame image signal (luminance signal) into blocks of eight pixels by eight pixels, and performs a discrete cosine transform (DCT) process on each block. Then, the dynamic range/frequency analysis section 118 sums the absolute values of, for example, 16 DCT coefficients in an area corresponding to one-quarter of the high-frequency range of the resulting blocks, and thereafter determines the average value of the 16 sum values. The determined average value may be used as the frequency information FI.

The object detection section 119 detects an object included in an image based on the image signal obtained by the pan-tilt-zoom/track zoom processing section 117 to obtain object information OI, and supplies the object information OI to the system controller 101. For example, the object detection section 119 determines adjacent pixel differences in the frame image signal to detect a contour on the screen, thereby detecting an object included in the image.

The moving position detection section 123 detects a moving position of the image based on the image signal obtained by the pan-tilt-zoom/track zoom processing section 117, and supplies moving-position information MI to the system controller 101. For example, the moving position detection section 123 determines a motion vector for each block of eight pixels by eight pixels using a block-matching method or the like, and detects a portion with a large motion vector as a moving position.

The OSD section 120 generates a display signal SCH for providing a user interface screen that is displayed on the display section 122 so as to be superimposed on an image. The combining section 121 combines the display signal SCH with a high definition (HD) signal that is output from the DRC-volume processing section 116, and supplies a combined signal to the display section 122. The display section 122 may be constructed using, for example, a cathode-ray tube (CRT) display or a flat panel display such as an liquid crystal display (LCD).

Figure 2:
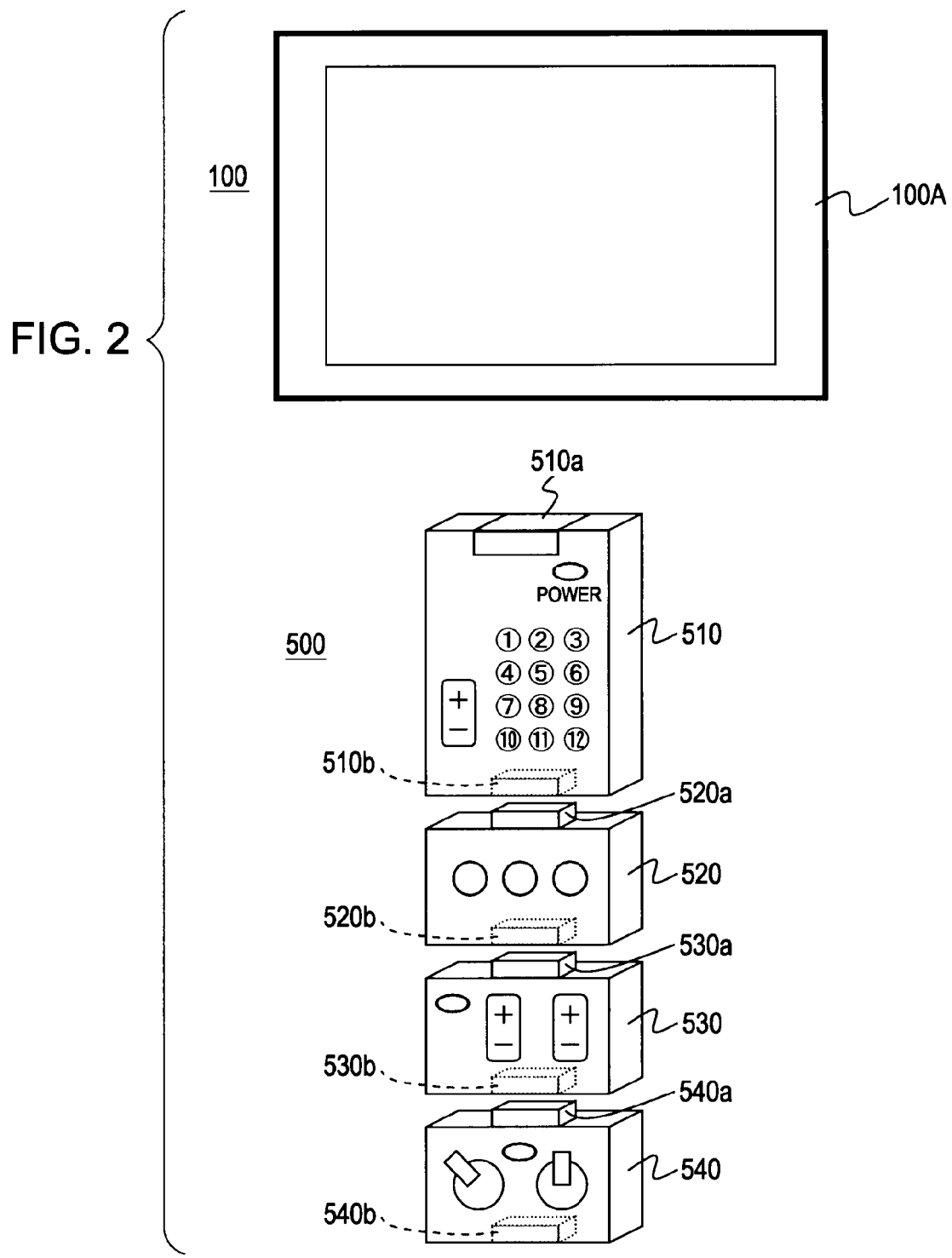
FIG. 2 is a diagram for illustrating a remote controller in the television receiver.

The remote controller 500 in the television receiver 100 will now be described. As illustrated in FIG. 2, the television receiver 100 is constituted by the remote controller 500 and a receiver main body section 100A. The receiver main body section 100A may serve as a device to operate. The remote controller 500 includes a base unit 510 having a transmission section 510a for transmitting a remote control signal SM, a track-zoom unit 520, a resolution/noise level adjustment unit 530 which may serve as an image quality adjustment unit, and a pan-tilt-zoom unit 540. The units 520, 530, and 540 may serve as function operation units.

The base unit 510 collects operation data from the above units, and outputs the remote control signal SM from the transmission section 510a via, for example, infrared transmission. The track-zoom unit 520 operates the track-zoom function in the pan-tilt-zoom/track zoom processing section 117 described above. When a left button is pressed, the track-zoom function is explicitly turned on. Center and right buttons are used to switch track-zoom parameters.

The resolution/noise level adjustment unit 530 operates the image quality adjustment function in the DRC-volume processing section 116 described above. When a left button is pressed, the image quality adjustment function is explicitly turned on. Up-down keys located in the center and on the right side on the resolution/noise level adjustment unit 530 allow a user to adjust the resolution level and the noise level, respectively.

The pan-tilt-zoom unit 540 operates the pan-tilt-zoom function in the pan-tilt-zoom/track zoom processing section 117 described above. When a push button located in the center on the pan-tilt-zoom unit 540 is pressed, the pan-tilt-zoom function is explicitly turned on. A left stick allows a user to adjust panning and tilting, and a right stick allows a user to adjust the zoom ratio.

In the remote controller 500, the base unit 510 is located uppermost, and the other units (520, 530, and 540) are configured to be exchangeable with one another as desired. Specifically, the base unit 510 is provided with a joint recess 510b disposed in a lower face thereof. The units 520, 530, and 540 are provided with joint projections 520a, 530a, and 540a disposed on upper faces thereof, respectively. The units 520, 530, and 540 are further provided with joint recesses 520b, 530b, and 540b in lower faces thereof, respectively. The joint recesses 510b, 520b, 530b, and 540b and the joint projections 520a, 530a, and 540a are used for electrical and mechanical connections between the units 510, 520, 530, and 540.

Figure 3:
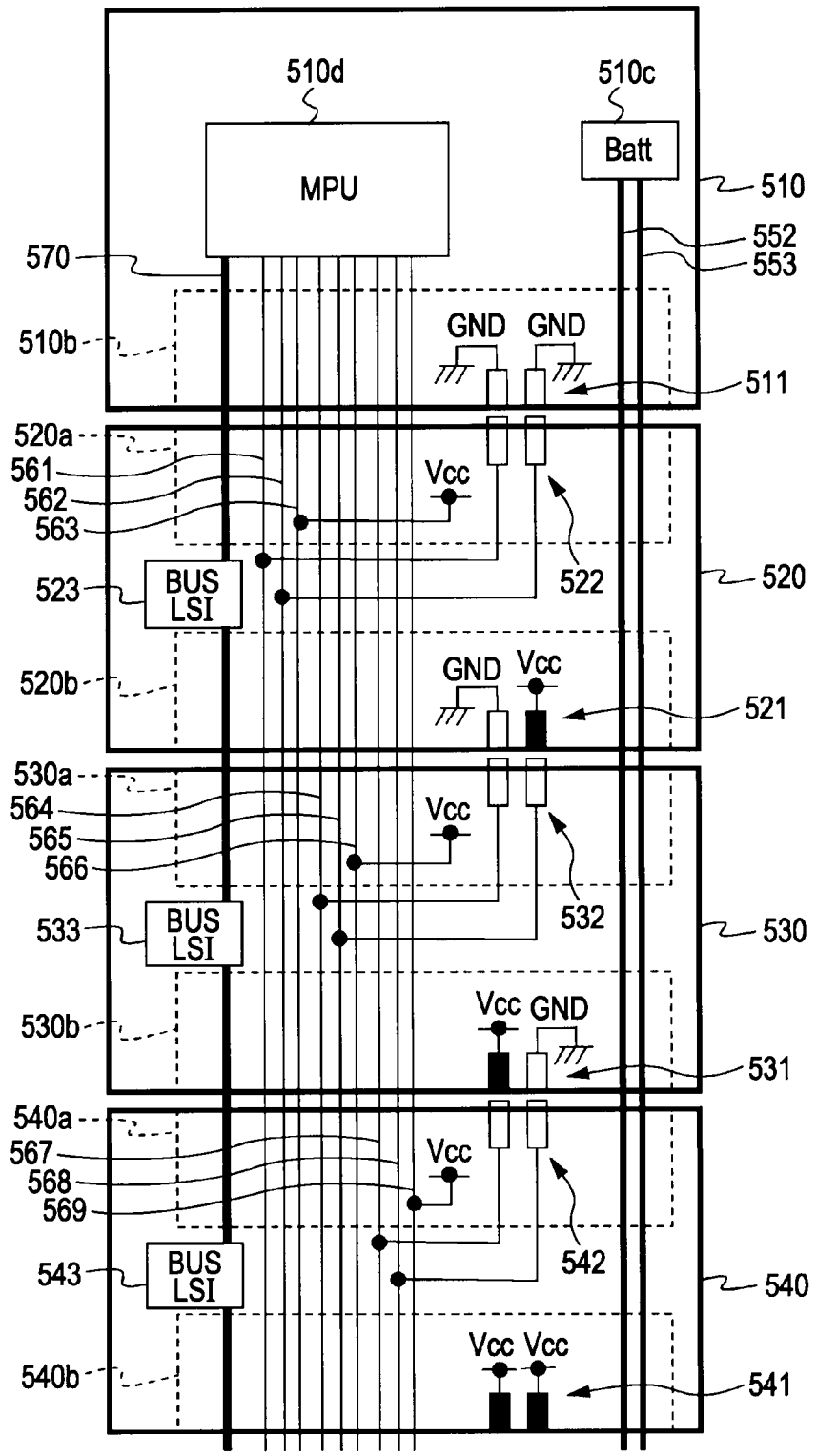
FIG. 3 is a schematic wiring diagram illustrating the connection between units of the remote controller.

FIG. 3 is a schematic wiring diagram illustrating the connection between the units of the remote controller 500. The base unit 510 includes a battery (power supply) 510c. A power supply Vcc and a ground GND of the base unit 510 are supplied to the units 520, 530, and 540 through a power supply line 552 and a ground line 553, respectively.

The joint recesses 510b, 520b, 530b, and 540b disposed in the lower faces of the units 510, 520, 530, and 540 are provided with electrode sections 511, 521, 531, and 541, respectively. The electrode sections 511 to 541 supply data (unique IDs) for identifying the units 510 to 540, respectively. Each of the electrode sections 511 to 541 may serve as a data supply section. Here, each electrode section has two electrodes and supplies 2-bit data.

In this embodiment, the electrode section 511 of the base unit 510 is designed such that both electrodes are connected to the ground GND, and supplies 2-bit data "00". The electrode section 521 of the track-zoom unit 520 is designed such that one of the electrodes is connected to the ground GND and the other electrode is connected to the power supply Vcc, and supplies 2-bit data "01". The electrode section 531 of the resolution/noise level adjustment unit 530 is designed such that one of the electrodes is connected to the power supply Vcc and the other electrode is connected to the ground GND, and supplies 2-bit data "10". The electrode section 541 of the pan-tilt-zoom unit 540 is designed such that both electrodes are connected to the power supply Vcc, and supplies 2-bit data "11".

In this embodiment, the remote controller 500 is used in such a manner that selected some or all of the track-zoom unit 520, the resolution/noise level adjustment unit 530, and the pan-tilt-zoom unit 540 are connected to the base unit 510. For this reason, it is sufficient that the four units 510 to 540 be identifiable. Thus, each electrode section has two electrodes and is configured to supply 2-bit data.

The joint projections 520a, 530a, and 540a disposed on the upper faces of the units 520, 530, and 540 are provided with electrode sections 522, 532, and 542, respectively. Each of the electrode sections 522 to 542 of the units 520 to 540 obtains data (unique ID) for identifying the unit located thereabove at the time of connection. Each of the electrode sections 522 to 542 may serve as a data obtaining section. Here, each electrode section has two electrodes and obtains 2-bit data.

The track-zoom unit 520 supplies the data obtained by the electrode section 522 to an MPU 510d of the base unit 510 through data lines 561 and 562. In this case, since the 2-bit data (unique ID) supplied through the data lines 561 and 562 is data that is obtained by the electrode section 522 of the track-zoom unit 520, the MPU 510d can identify the unit located above the track-zoom unit 520 on the basis of this 2-bit data.

The resolution/noise level adjustment unit 530 supplies the data obtained by the electrode section 532 to the MPU 510d of the base unit 510 through data lines 564 and 565. In this case, since the 2-bit data (unique ID) supplied through the data lines 564 and 565 is data that is obtained by the electrode section 532 of the resolution/noise level adjustment unit 530, the MPU 510d can identify the unit located above the resolution/noise level adjustment unit 530 on the basis of this 2-bit data.

The pan-tilt-zoom unit 540 supplies the data obtained by the electrode section 542 to the MPU 510d of the base unit 510 through data lines 567 and 568. In this case, since the 2-bit data (unique ID) supplied through the data lines 567 and 568 is data that is obtained by the electrode section 542 of the pan-tilt-zoom unit 540, the MPU 510d can identify the unit located above the pan-tilt-zoom unit 540 on the basis of this 2-bit data.

The remote controller 500 is used in such a manner that selected some or all of the track-zoom unit 520, the resolution/noise level adjustment unit 530, and the pan-tilt-zoom unit 540 are connected to the base unit 510. Assuming that the base unit 510 is on the upper side, the lower a unit is located, the higher the priority is.

As described above, the data items supplied from the units 520, 530, and 540 through the sets of data lines (561 and 562), (564 and 565), and (567 and 568) can identify the units located thereabove. Therefore, these data items may serve as data that indicates the connection order of the units 520, 530, and 540, and also serve as priority data that indicates the priorities of the units 520, 530, and 540.

The power supplies Vcc of the units 520, 530, and 540 are connected to the MPU 510d of the base unit 510 through data lines 563, 566, and 569, respectively. In the MPU 510d, ports connected to the data lines 563, 566, and 569 are pull down to the ground GND.

For example, when the track-zoom unit 520 is connected and is used as a constituent unit of the remote controller 500, the power supply (battery) 510c of the base unit 510 is transmitted from the track-zoom unit 520 to the MPU 510d through the data line 563. This allows the MPU 510d to recognize that the track-zoom unit 520 is being connected. Conversely, when the track-zoom unit 520 is not being connected, the power supply (battery) 510c of the base unit 510 is not transmitted to the MPU 510d through the data line 563. The MPU 510d recognizes that the track-zoom unit 520 is not being connected.

In this manner, the MPU 510d of the base unit 510 can readily recognize whether or not the track-zoom unit 520 is being connected. Although not described in detail, similarly, the MPU 510d of the base unit 510 can also readily recognize whether or not the other units (i.e., the resolution/noise level adjustment unit 530 and the pan-tilt-zoom unit 540) are being connected.

The units 520 to 540 are connected to the MPU 510d of the base unit 510 through a bus line 570. The bus line 570 is a bus line for sending operation data supplied from the units 520 to 540, such as button-pressed data and stick operation data, to the MPU 510d of the base unit 510. The units 520, 530, and 540 are provided with large scale integrated circuits (LSIs) 523, 533, and 543, respectively, for converting operation data into inter-integrated circuit (I2C) data.

Note that in the units 520 to 540, as illustrated in FIG. 3, the power supply line 552, the ground line 553, the data lines 561 to 569, and the bus line 570 are provided so as to extend through the individual units from the upper side to the lower side. Further, in FIG. 3, the above lines are illustrated so as to be continuously provided across the units. However, it can be understood that the above lines are not connected between the units until the units are connected.

Next, the transmission data included in the remote control signal SM sent from the transmission section 510a of the base unit 510 of the remote controller 500 will be described. FIG. 4 illustrates an example structure of the transmission data. The transmission data is composed of, for example, 8-bit category data, 10-bit connection state data, data items 1 to 4 each having 8 bits, and an 8-bit checksum.

The category data is a data item that indicates a device to operate such as a television receiver or a video recorder. The connection state data is a data item that indicates which function operation unit is being connected to the base unit 510 of the remote controller 500 and that indicates the connection order of the function operation units. The connection state data is configured such that 9 data bits supplied from the data lines 561 to 569 to the MPU 510d of the base unit 510 are arranged as, for example, the lower or upper 9 data bits of the connection state data.

As described above, the data items supplied from the units 520, 530, and 540 through the sets of data lines (561 and 562), (564 and 565), and (567 and 568) may be data that indicates the connection order of the function operation units 520, 530, and 540, and also serve as priority data that indicates the priorities of the function operation units 520, 530, and 540. Therefore, the transmission data has a structure that includes priority data that indicates the priorities of the function operation units as well as operation data of each unit.

The data items 1 to 4 are operation data items that are based on the operations of the units 510 to 540, respectively. When a user operates the base unit 510, the operation data thereof is placed in the data 1. In this case, the data items 2 to 4 are set to "NULL". When a user operates the track-zoom unit 520, the operation data thereof is placed in the data item 2. In this case, the data items 1, 3, and 4 are set to "NULL".

Further, when a user operates the resolution/noise level adjustment unit 530, the operation data thereof is placed in the data item 3. In this case, the data items 1, 2, and 4 are set to "NULL". When a user operates the pan-tilt-zoom unit 540, the operation data thereof is placed in the data item 4. In this case, the data items 1 to 3 are set to "NULL".

Figure 5:
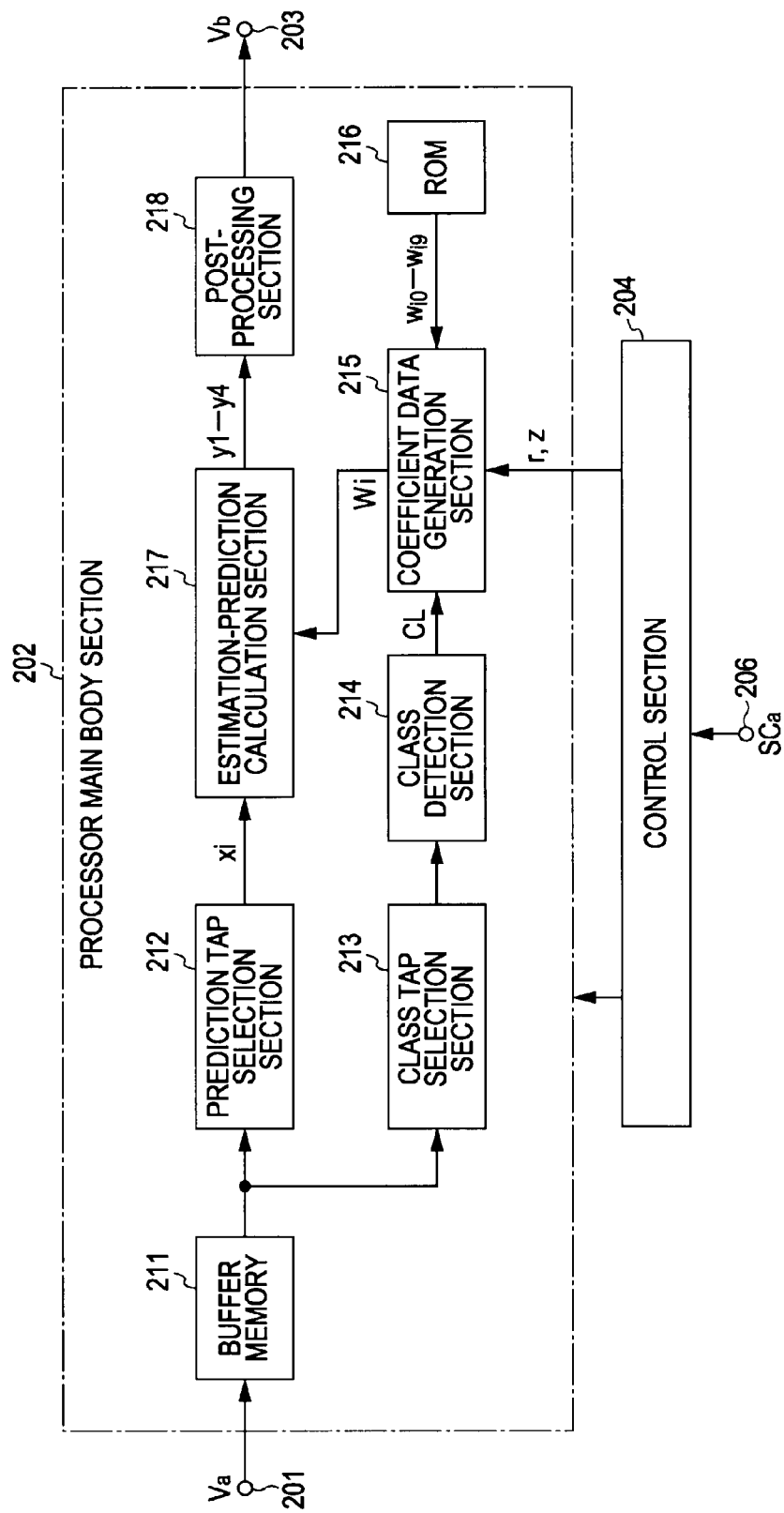
FIG. 5 is a block diagram illustrating an example configuration of a DRC-volume processing section in a receiver main body section of the television receiver.

Next, the DRC-volume processing section 116 of the television receiver 100 will be described in detail. FIG. 5 illustrates an example configuration of the DRC-volume processing section 116.

The DRC-volume processing section 116 includes an input terminal 201 to which an image signal Va is input, a processor main body section 202 that processes the image signal Va input to the input terminal 201, an output terminal 203 from which an image signal Vb obtained by the processor main body section 202 is output, a control section 204 that controls the operation of the processor main body section 202, and an input terminal 206 to which a control signal SCa is input.

The control section 204 controls the operation of the processor main body section 202 on the basis of the control signal SCa input to the input terminal 206. For example, the control section 204 includes an MPU, a ROM having stored therein an operation program of the MPU and the like, and a RAM serving as a working area of the MPU.

The processor main body section 202 converts the image signal Va which is an SD signal called a 525i signal into the image signal Vb which is an HD signal called a 1050i signal. The 525i signal is an interlaced image signal having 525 lines per frame. The 1050i signal is an interlaced image signal having 1050 lines per frame.

Figure 6:
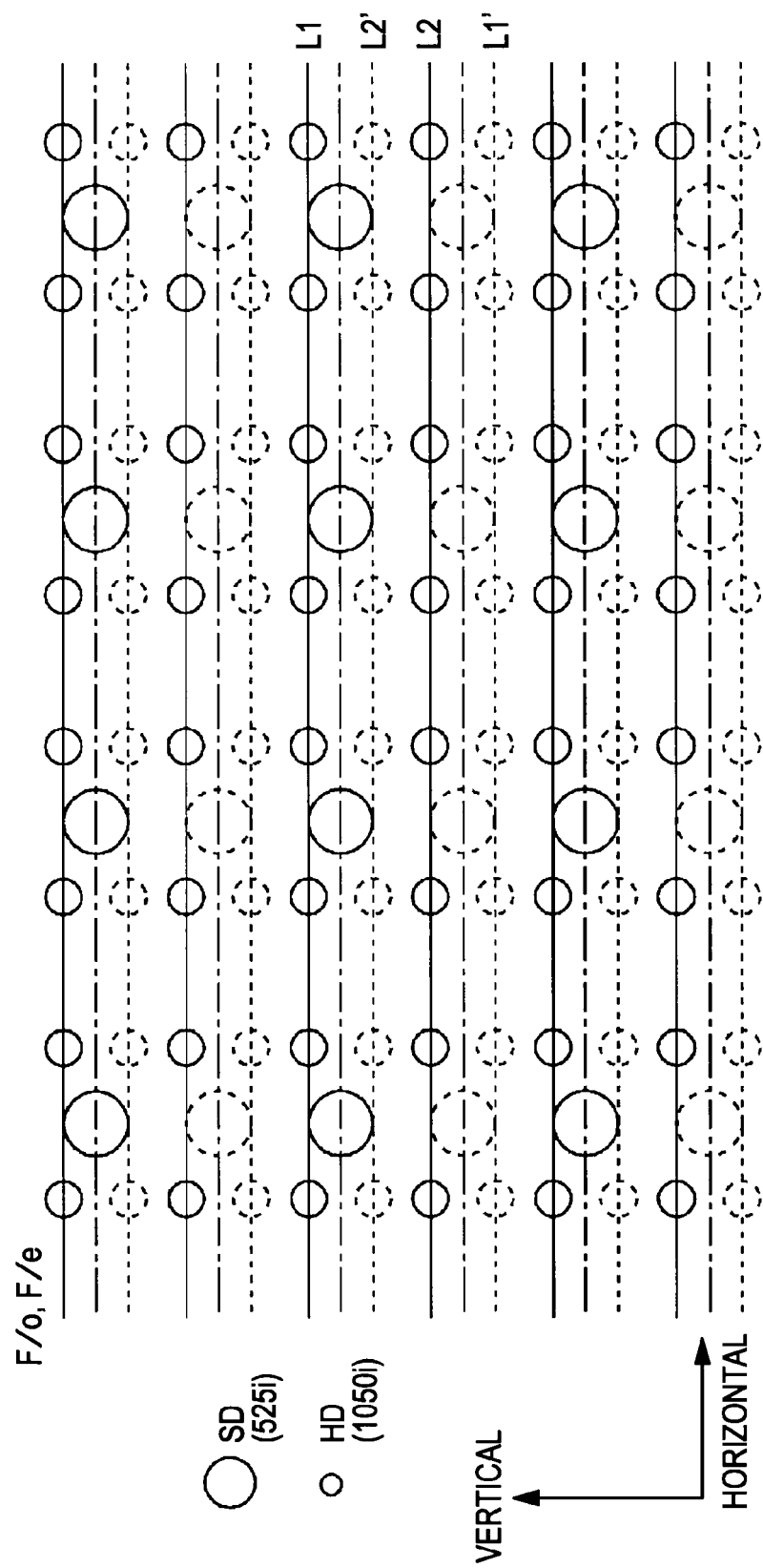
FIG. 6 is a diagram illustrating a pixel position relationship between an SD signal (525i signal) and an HD signal (1050i signal)

FIG. 6 illustrates a pixel position relationship in a certain frame (F) between the 525i signal and the 1050i signal. In FIG. 6, pixel positions in odd (o) fields are indicated by solid-line representations and pixel positions in even (e) fields are indicated by broken-line representations. In FIG. 6, further, large dots represent pixels of the 525i signal, and small dots represent pixels of the 1050i signal. As can be seen from FIG. 6, pixel data of the 1050i signal includes line data L1 and L1' that are positioned close to the lines of the 525i signal, and line data L2 and L2' that are positioned far from the lines of the 525i signal. The line data L1 and L2 are line data items in the odd fields, and the line data L1' and L2' are line data items in the even fields. Further, the number of pixels per line of the 1050i signal is two times the number of pixels per line of the 525i signal.

Referring back to FIG. 5, the processor main body section 202 includes a buffer memory 211, a prediction tap selection section 212, and a class tap selection section 213. The buffer memory 211 temporarily stores the image signal Va input to the input terminal 201. The tap selection sections 212 and 213 selectively extract a plurality of pixel data items located around a position of interest in the image signal Vb as data items of prediction taps and data items of class taps, respectively, on the basis of the image signal Va stored in the buffer memory 211.

Figure 7A:
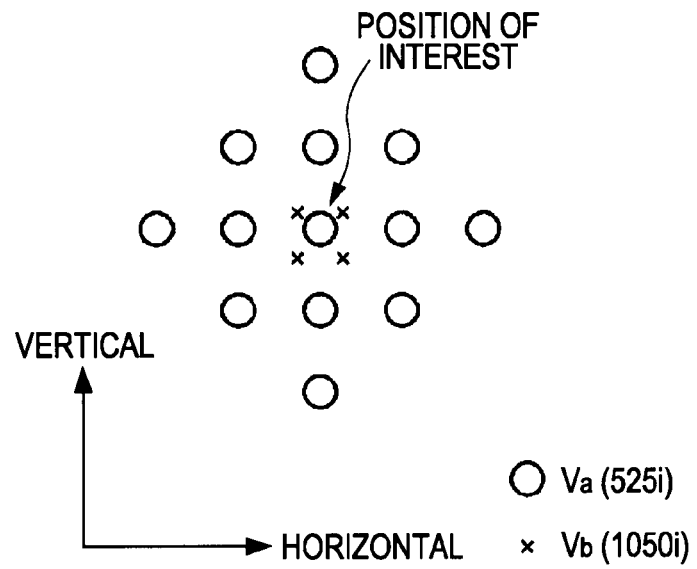
FIGS. 7A and 7B are diagrams illustrating an example of a pattern of prediction taps and an example of a pattern of class taps, respectively.
Figure 7B:
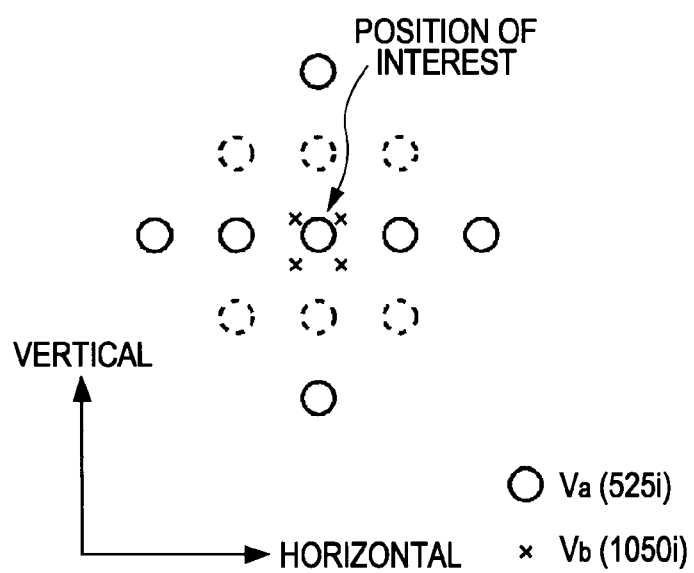

FIG. 7A illustrates an example of a pattern of pixel data items extracted as data items of prediction taps. FIG. 7B illustrates an example of a pattern of pixel data items (indicated by solid-line circles) extracted as data items of class taps. In FIGS. 7A and 7B, a plurality of pixel data items are extracted as data items of prediction taps and data items of class taps from a current field including the position of interest. Alternatively, a plurality of pixel data items may be extracted from a predetermined number of temporally previous and subsequent fields.

The processor main body section 202 further includes a class detection section 214. The class detection section 214 performs a data compression process on the plurality of pixel data items extracted as data items of class taps by the class tap selection section 213 to obtain a class code CL that indicates a class to which the pixel data item at the position of interest in the image signal Vb belongs. Examples of the data compression process that can be used include adaptive dynamic range coding (ADRC), differential pulse code modulation (DPCM) (predictive coding), or vector quantization (VQ). In the present embodiment, ADRC, for example, 1-bit ADRC is used.

First, the use of K-bit ADRC will be described. In this scheme, a dynamic range DR (=MAX−MIN) that is the difference between a maximum value MAX and a minimum value MIN of the pixel data items included in the class taps is detected. Further, for each of the pixel data items included in the class taps, the minimum value MIN is subtracted from this pixel data item, and the resulting subtracted value is divided (quantized) by $DR/2^K$. Each of the pixel data items that constitute the class taps is requantized into K bits. A bit sequence in which the K-bit data items are arranged in a predetermined order is used as the class code CL.

In 1-bit ADRC, therefore, for each of the pixel data items included in the class taps, the minimum value MIN is subtracted from this pixel data item, and the resulting subtracted value is divided by DR/2. Each of the pixel data items included in the class taps is requantized into 1 bit. A bit sequence in which the 1-bit data items are arranged in a predetermined order is output as the class code CL.

The processor main body section 202 further includes a coefficient data generation section 215 and a ROM 216 serving as a storage section. The ROM 216 stores coefficient seed data items of individual classes. In an estimation-prediction calculation section 217 which will be described below, a pixel data item y at a position of interest in the image signal Vb is determined according to an estimated equation corresponding to Equation (1) using a plurality of pixel data items xi serving as prediction taps and coefficient data items $W_i$:

$$y = \sum_{i=1}^{n} W_i \cdot x_i \qquad (1)$$

where n denotes the number of pixel data items xi serving as prediction taps.

The coefficient seed data items stored in the ROM 216 are coefficient data items given in a generation equation including the image quality parameters r and z. The generation equation is used to generate the coefficient data items $W_i$ in the estimated equation above. Equation (2) is an example of the generation equation:

$$W_i = w_{i0} + w_{i1}r + w_{i2}z + w_{i3}r^2 + \\ w_{i4}rz + w_{i5}z^2 + w_{i6}r^3 + w_{i7}r^2z + w_{i8}rz^2 + w_{i9}z^3 \qquad (2)$$

where $w_{i0}$ to $w_{i9}$ denote the coefficient seed data items. Here, the image quality parameter r is a parameter for determining the resolution, and the image quality parameter z is a parameter for determining the noise removal level (noise suppression level). The coefficient seed data items $w_{i0}$ to $w_{i9}$ are information for converting the image signal Va (525i signal) into the image signal Vb (1050i signal).

As illustrated in FIG. 6, when a 525i signal is converted into a 1050i signal, it is necessary to obtain, for each of the odd and even fields, four pixels in the 1050i signal with respect to one pixel in the 525i signal.

Figure 8:
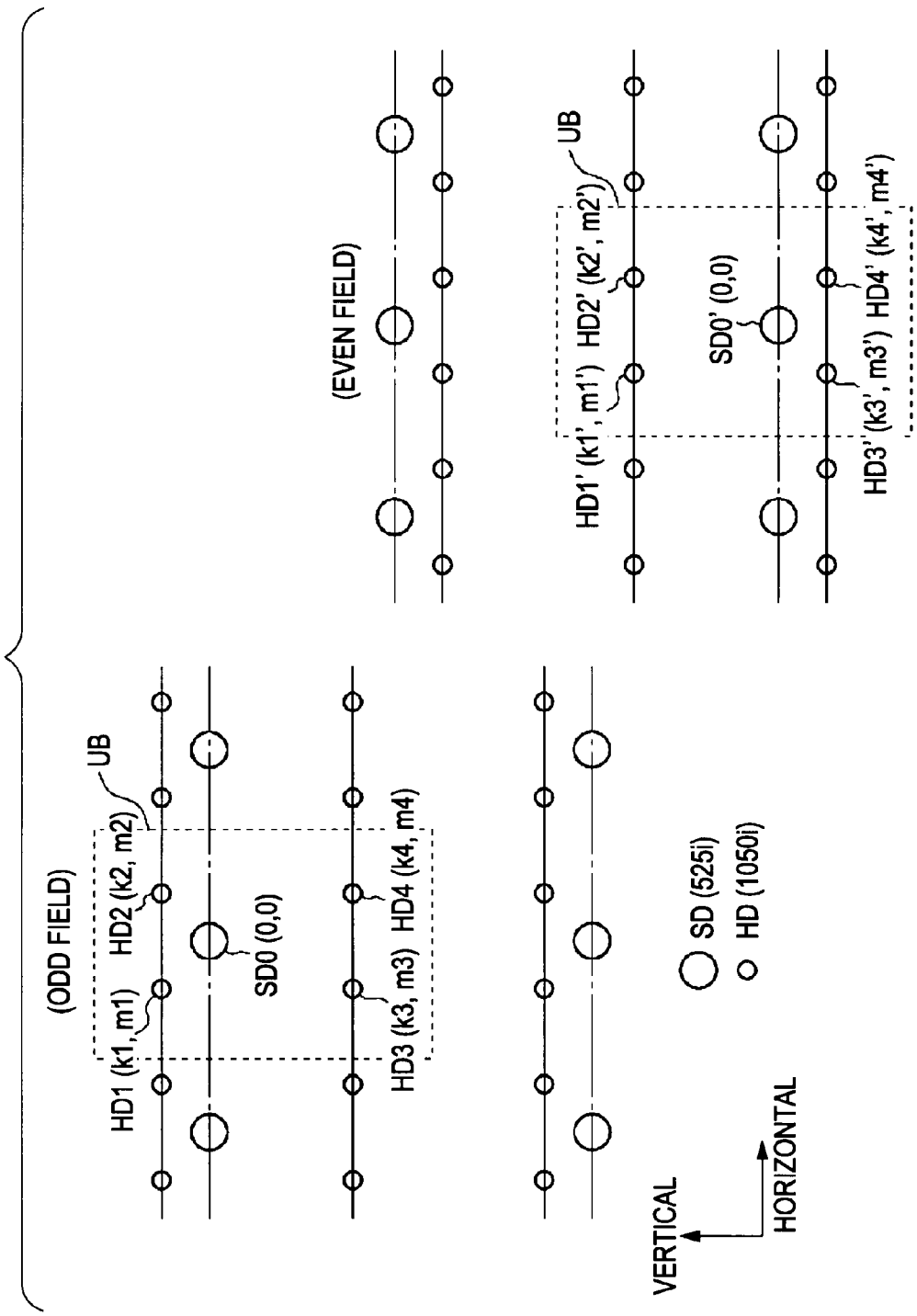
FIG. 8 is a diagram illustrating phase shifts of four pixels in a unit pixel block of the HD signal with respect to a center prediction tap.

FIG. 8 illustrates phase shifts of four pixels in a 2×2 unit pixel block UB constituting a 1050i signal in odd and even fields with respect to a center prediction tap. In an odd field, the positions of four pixels HD1 to HD4 in the unit pixel block UB are shifted by values k1 to k4 in the horizontal direction and by values m1 to m4 in the vertical direction, respectively, with respect to the position of a center prediction tap SD0. In an even field, the positions of four pixels HD1' to HD4' in the unit pixel block UB are shifted by values k1' to k4' in the horizontal direction and by values m1' to m4' in the vertical direction, respectively, with respect to the position of a center prediction tap SD0'.

Thus, the coefficient seed data items $w_{i0}$ to $w_{i9}$ of the individual classes described above are formed of coefficient seed data items $w_{i0}$ to $w_{i9}$ corresponding to the eight output pixels (HD1 to HD4 and HD1' to HD4'). Consequently, the ROM 216 stores the coefficient seed data items $w_{i0}$ to $w_{i9}$ for each combination of class and output pixel.

The coefficient seed data items $w_{i0}$ to $w_{i9}$ are generated in advance by learning using an image signal Vb' serving as a teacher signal corresponding to the image signal Vb, and an image signal Va' serving as a student signal corresponding to the image signal Va. A method for generating the coefficient seed data items $w_{i0}$ to $w_{i9}$ will be described in detail below.

The coefficient data generation section 215 obtains, from the ROM 216, in each odd or even field, coefficient seed data items $w_{i0}$ to $w_{i9}$ for four pixels corresponding to four output pixels (in FIG. 8, the pixels HD1 to HD4 or HD1' to HD4') in the class indicated by the class code CL obtained by the class detection section 214. The coefficient data generation section 215 further generates coefficient data items $W_i$ for the four pixels according to the generation equation corresponding to Equation (2) using the values of the image quality parameters r and z supplied from the control section 204.

Here, the image quality parameter r indicates the resolution, and the image quality parameter z indicates the noise suppression level. The image quality parameters r and z may be set by a user or may be set automatically by the system controller 101.

The processor main body section 202 further includes the estimation-prediction calculation section 217. The estimation-prediction calculation section 217 determines pixel data items for each unit pixel block UB that is located at a position of interest in the image signal Vb. Specifically, the estimation-prediction calculation section 217 individually calculates pixel data items y1 to y4 for four pixels (pixels of interest) that constitute a unit pixel block UB according to the estimated equation corresponding to Equation (1) using the data items xi of prediction taps for the four pixels in the unit pixel block UB, which are extracted by the prediction tap selection section 212, and the coefficient data items $W_i$ for the four pixels in the unit pixel block UB, which are generated by the coefficient data generation section 215.

The processor main body section 202 further includes a post-processing section 218. The post-processing section 218 converts the pixel data items y1 to y4 for the four pixels in the unit pixel block UB, which are sequentially output from the estimation-prediction calculation section 217, into line sequential data items, and outputs the resulting data items in the format of a 1050i signal.

The operation of the DRC-volume processing section 116 illustrated in FIG. 5 will now be described. An image signal Va which is an SD signal is input to the input terminal 201, and is temporarily stored in the buffer memory 211. Then, a class classification adaptive process based on the image signal Va is performed to generate pixel data items that constitute the image signal Vb.

Specifically, in the class tap selection section 213, a plurality of pixel data items located around a position of interest in the image signal Vb are selectively extracted as data items of class taps on the basis of the image signal Va stored in the buffer memory 211. The plurality of pixel data items are supplied to the class detection section 214.

In the class detection section 214, the plurality of pixel data items serving as data items of class taps are subjected to, for example, a 1-bit ADRC data compression process to obtain a class code CL that indicates a class to which the pixel data item at the position of interest in the image signal Vb belongs. The class code CL is supplied to the coefficient data generation section 215.

In the coefficient data generation section 215, in each odd or even field, coefficient seed data items $w_{i0}$ to $w_{i9}$ for four pixels corresponding to four output pixels (in FIG. 8, the pixels HD1 to HD4 or HD1' to HD4') in the class indicated by the class code CL are obtained from the ROM 216. Further, the values of the image quality parameters r and z are supplied to the coefficient data generation section 215 from the control section 204. Then, in the coefficient data generation section 215, in each field, coefficient data items $W_i$ for the four output pixels are generated according to the generation equation corresponding to Equation (2) using the coefficient seed data items $w_{i0}$ to $w_{i9}$ for the four pixels and the values of the image quality parameters r and z. The coefficient data items $W_i$ are supplied to the estimation-prediction calculation section 217.

In the prediction tap selection section 212, further, a plurality of pixel data items xi located around the position of interest in the image signal Vb are selectively extracted as data items of prediction taps on the basis of the image signal Va stored in the buffer memory 211. The plurality of pixel data items xi are supplied to the estimation-prediction calculation section 217. In the estimation-prediction calculation section 217, pixel data items y1 to y4 for four pixels (pixel of interest) in a unit pixel block UB that includes a position of interest in the image signal Vb are individually calculated according to the estimated equation corresponding to Equation (1) using the plurality of pixel data items xi serving as data items of prediction taps, which are extracted by the prediction tap selection section 212 and the coefficient data items $W_i$ for the four output pixels, which are generated by the coefficient data generation section 215.

The pixel data items y1 to y4 for four pixels in the individual unit pixel blocks UB that constitute the image signal Vb, which are sequentially output from the estimation-prediction calculation section 217, are supplied to the post-processing section 218. In the post-processing section 218, the data items y1 to y4 for four pixels in the individual unit pixel blocks UB, which are sequentially supplied from the estimation-prediction calculation section 217, are converted into line sequential data items, and are output in the format of a 1050i signal. That is, the image signal Vb (1050i signal) is obtained from the post-processing section 218. The image signal Vb is output to the output terminal 203.

Next, a method for generating coefficient seed data items, which are stored in the ROM 216 of the processor main body section 202 described above, will be described. The coefficient seed data items are generated by learning. Here, by way of example, it is assumed that the coefficient seed data items $w_{i0}$ to $w_{i9}$ in the generation equation corresponding to Equation (2) are determined.

For the convenience of the following description, $t_j$ (j=0 to 9) is defined as in Equation (3):

$$t_0 = 1$$

$$t_1 = r$$

$$t_2 = z$$

$$t_3 = r2$$

$$t_4 = rz$$

$$t_5 = z2$$

$$t_6 = r3$$

$$t_7 = r2z$$

$$t_8 = rz2$$

$$t_9 = z \quad (3)$$

If Equation (3) is used, Equation (2) can be rewritten as:

$$W_i = \sum_{j=0}^{9} w_{ij} \times t_j \quad (4)$$

Finally, an undetermined coefficient $w_{ij}$ is determined by learning. Specifically, a coefficient value that minimizes the squared errors is determined for each combination of class and output pixel using a plurality of learning data items. This is the so-called solution based on the least square method. If the number of learning data items is denoted by m, the residual for the k-th ($1 \leq k \leq m$) learning data item is denoted by ek, and the sum of squared errors is denoted by E, the sum of squared errors E is expressed by Equation (5) using Equations (1) and (2):

$$E = \sum_{k=1}^{m} e_k^2$$

$$= \sum_{k=1}^{m} [y_k - (W_1 x_{1k} + W_2 x_{2K} + \ldots + W_n x_{nk})]^2$$

$$= \sum_{k=1}^{m} \{y_k - [(t_0 w_{10} + t_1 w_{11} + \ldots + t_9 w_{19}) x_{1k} + \ldots + (t_0 w_{n0} + t_1 w_{n1} + \ldots + t_9 w_{n9}) x_{nk}]\}^2 \quad (5)$$

where $x_{ik}$ denotes the k-th pixel data item at the i-th prediction tap position in the SD signal, and $y_k$ denotes the k-th pixel data item in the corresponding HD signal.

In the solution based on the least square method, $w_{ij}$ is determined so that a partial differential value of Equation (5) for $w_{ij}$ is zero. This is expressed in Equation (6):

$$\frac{\partial E}{\partial w_{ij}} = \sum_{k=1}^{m} 2\left(\frac{\partial e_k}{\partial w_{ij}}\right) e_k = -\sum_{k=1}^{m} 2 t_j x_{ik} e_k = 0 \quad (6)$$

If $X_{ipjq}$ and $Y_{ip}$ are defined as in Equations (7) and (8) respectively, Equation (6) can be rewritten as Equation (9) in matrix form:

$$X_{ipjq} = \sum_{k=1}^{m} x_{ik} t_p x_{jk} t_q \quad (7)$$

$$Y_{ip} = \sum_{k=1}^{m} x_{ik} t_p y_k \quad (8)$$

$$\begin{bmatrix} x_{1010} & x_{1011} & x_{1012} & \cdots & x_{1019} & x_{1020} & \cdots & x_{10n9} \\ x_{1110} & x_{1111} & x_{1112} & \cdots & x_{1119} & x_{1120} & \cdots & x_{11n9} \\ x_{1210} & x_{1211} & x_{1212} & \cdots & x_{1219} & x_{1220} & \cdots & x_{12n9} \\ \vdots & \vdots & \vdots & \ddots & \vdots & \vdots & \ddots & \vdots \\ x_{1910} & x_{1911} & x_{1912} & \cdots & x_{1919} & x_{1920} & \cdots & x_{19n9} \\ x_{2010} & x_{2011} & x_{2012} & \cdots & x_{2019} & x_{2020} & \cdots & x_{20n9} \\ \vdots & \vdots & \vdots & \ddots & \vdots & \vdots & \ddots & \vdots \\ x_{n910} & x_{n911} & x_{n912} & \cdots & x_{n919} & x_{n920} & \cdots & x_{n9n9} \end{bmatrix} \begin{bmatrix} w_{10} \\ w_{11} \\ w_{12} \\ \vdots \\ w_{19} \\ w_{20} \\ \vdots \\ w_{n9} \end{bmatrix} = \begin{bmatrix} Y_{10} \\ Y_{11} \\ Y_{12} \\ \vdots \\ Y_{19} \\ Y_{20} \\ \vdots \\ Y_{n9} \end{bmatrix} \quad (9)$$

Equation (9) represents the normal equations for calculating the coefficient seed data items $w_{i0}$ to $w_{i9}$. The normal equations are solved by a general solution such as a sweep-out method (Gauss-Jordan elimination) to determine the coefficient seed data items $w_{i0}$ to $w_{i9}$.

Figure 9:
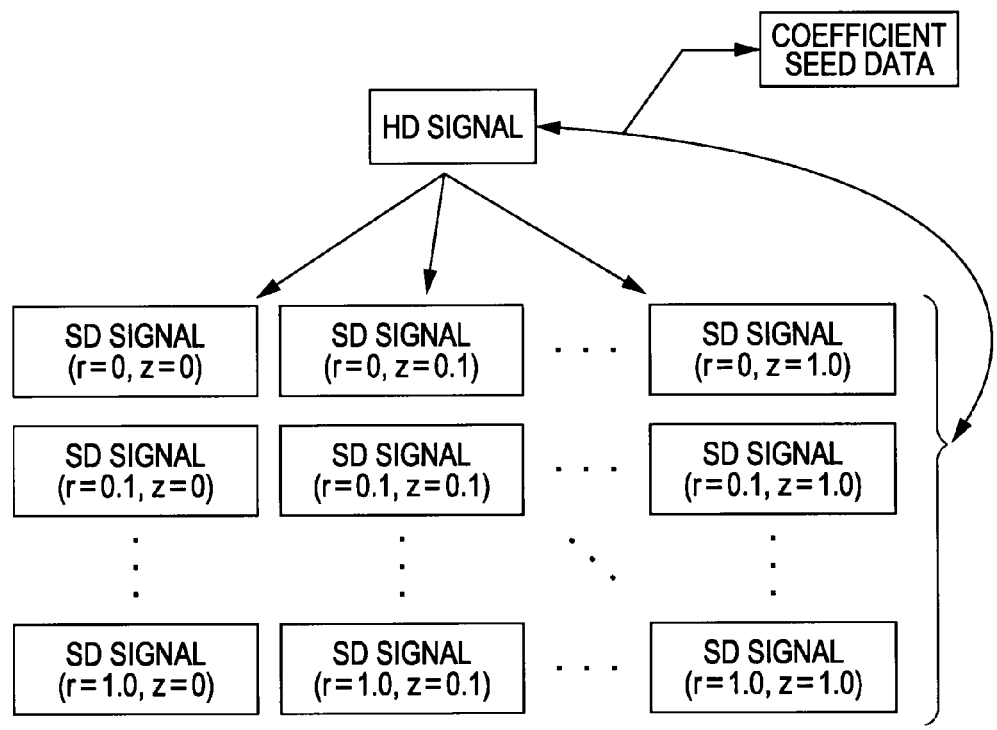
FIG. 9 is a diagram for illustrating a method for generating coefficient seed data which is used in the DRC-volume processing section.

FIG. 9 illustrates a concept of the method for generating coefficient seed data items described above. A plurality of SD signals serving as student signals are generated from an HD signal serving as a teacher signal. In this case, the frequency characteristics of a decimation filter used for generating SD signals from an HD signal is changed, thereby generating SD signals having different resolutions.

SD signals having different resolutions can be used to generate coefficient seed data items having different effects of increasing the resolution. For example, it is assumed that an SD signal that results in an image with a large degree of blurring and an SD signal that results in an image with a small degree of blurring are provided. In this case, learning based on the SD signal that results in an image with a large degree of blurring can be used to generate a coefficient seed data item having a high effect of increasing the resolution, and learning based on the SD signal that results in a small degree of blurring can be used to generate a coefficient seed data item having a low effect of increasing the resolution.

Further, noise is added to each of the SD signals having different resolutions to generate noise-added SD signals. By varying the amount of noise added, SD signals having different amounts of noise are generated. Therefore, coefficient seed data items having different noise removal effects are generated. For example, it is assumed that an SD signal with a large amount of noise added and an SD signal with a small amount of noise added are provided. In this case, learning based on the SD signal with a large amount of noise added can be used to generate a coefficient seed data item having a high noise removal effect, and learning based on the SD signal with a small amount of noise added can be used to generate a coefficient seed data item having a low noise removal effect.

The amount of noise added can be adjusted. For example, as in Equation (10), when noise n is added to a pixel value x of an SD signal to generate a pixel value x' of the noise-added SD signal, the amount of noise can be adjusted by varying the value G:

$$x' = x + G \cdot n \quad (10)$$

For example, the value of an image quality parameter r that can vary the frequency characteristics can be varied within a range of 11 levels from 0 to 1.0 in steps of 0.1, and the value of an image quality parameter z that can vary the amount of noise added can be varied within a range of 11 levels from 0 to 1.0 in steps of 0.1. Then, a total of 121 SD signals are generated. Learning is performed between the plurality of SD signals generated in this manner and an HD signal to generate coefficient seed data items. The image quality parameters r and z correspond to the image quality parameters r and z supplied to the coefficient data generation section 215 illustrated in FIG. 5, respectively.

Figure 10:
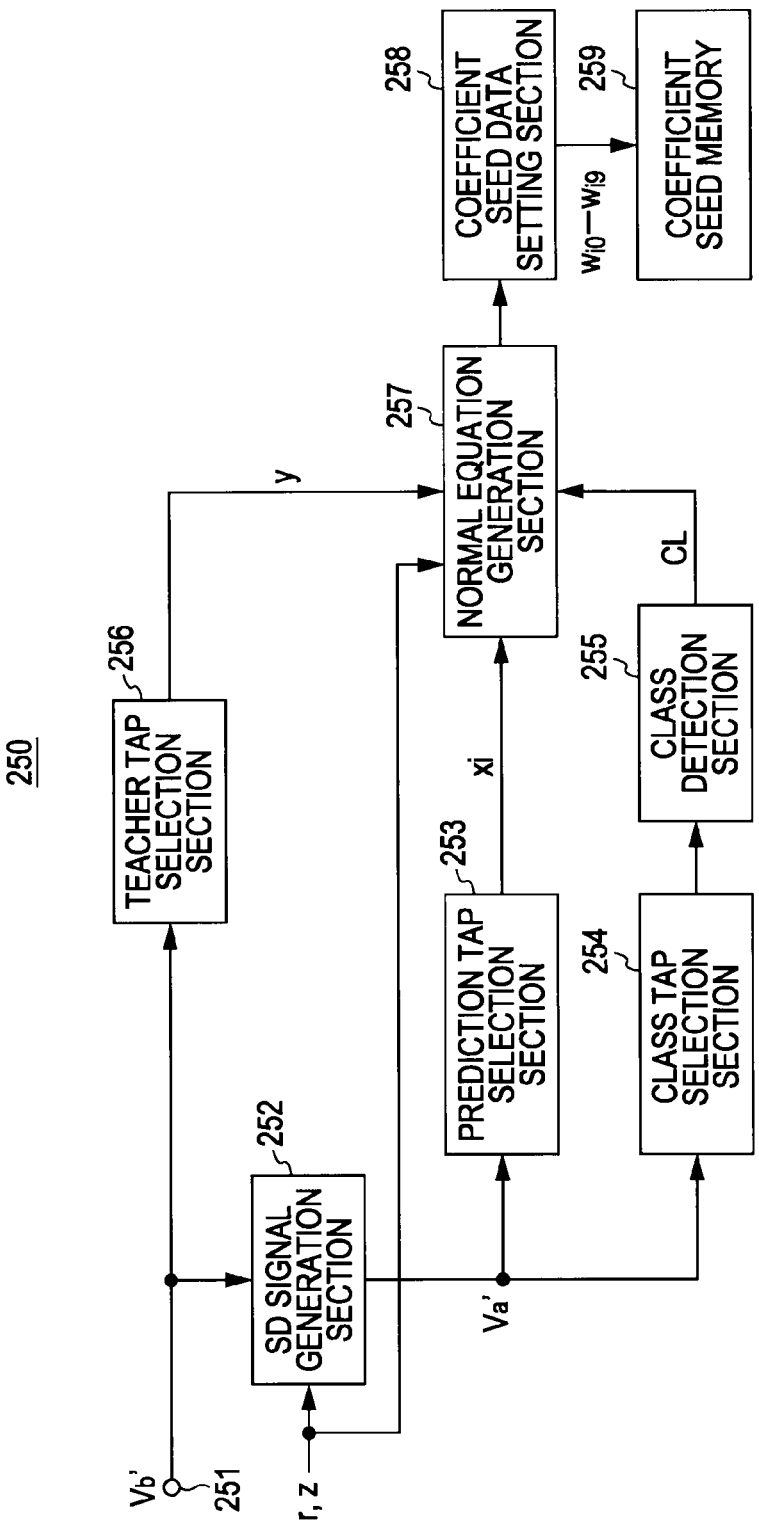
FIG. 10 is a block diagram illustrating an example configuration of a device for generating coefficient seed data which is stored in an internal ROM of the DRC-volume processing section.

Next, a coefficient seed data generating device 250 for generating the coefficient seed data items $w_{i0}$ to $w_{i9}$ described above will be described. FIG. 10 illustrates the configuration of the coefficient seed data generating device 250.

The coefficient seed data generating device 250 includes an input terminal 251 and an SD signal generation section 252. The input terminal 251 is a terminal to which an image signal Vb' serving as a teacher signal, which corresponds to the image signal Vb described above, is input. The SD signal generation section 252 performs horizontal and vertical decimation processes on the image signal Vb' to generate an image signal Va' serving as a student signal, which corresponds to the image signal Va described above. The image quality parameters r and z are supplied to the SD signal generation section 252. In accordance with the value of the image quality parameter r, the frequency characteristics of a decimation filter used for generating the image signal Va' from the image signal Vb' can be varied. Further, in accordance with the value of the image quality parameter z, the amount of noise to be added to the image signal Va' can be varied.

The coefficient seed data generating device 250 further includes a prediction tap selection section 253 and a class tap selection section 254. The tap selection sections 253 and 254 selectively extract a plurality of pixel data items located around a position of interest in the image signal Vb' as data items of prediction taps and data items of class taps, respectively, on the basis of the image signal Va' generated by the SD signal generation section 252. The tap selection sections 253 and 254 correspond to the tap selection sections 212 and 213 of the processor main body section 202 described above, respectively.

The coefficient seed data generating device 250 further includes a class detection section 255. The class detection section 255 processes the plurality of pixel data items selectively extracted as data items of class taps by the class tap selection section 254 to generate a class code CL that indicates a class to which the pixel data item at the position of interest in the image signal Vb' belongs. The class detection section 255 corresponds to the class detection section 214 of the processor main body section 202 described above.

The coefficient seed data generating device 250 further includes a teacher tap selection section 256. The teacher tap selection section 256 selectively extracts the pixel data item at the position of interest in the image signal Vb' on the basis of the image signal Vb'.

The coefficient seed data generating device 250 further includes a normal equation generation section 257. The normal equation generation section 257 generates normal equations (see Equation (9)) for obtaining coefficient seed data items $w_{i0}$ to $w_{i9}$ for each class on the basis of pixel data items y at individual positions of interest in the image signal Vb', which are selectively extracted by the teacher tap selection section 256, a plurality of pixel data items xi serving as data items of prediction taps, which are selectively extracted by the prediction tap selection section 253 in correspondence with the pixel data items y at the individual positions of interest, the class code CL generated by the class detection section 255 in correspondence with the pixel data items y at the individual positions of interest, and the values of the image quality parameters r and z.

In this case, a single learning data item is generated using the combination of one pixel data item y and a plurality of corresponding pixel data items xi. Multiple learning data items are generated for each class between the image signal Vb' serving as a teacher signal and the image signal Va' serving as a student signal corresponding to the teacher signal. In the normal equation generation section 257, therefore, normal equations for obtaining coefficient seed data items $w_{i0}$ to $w_{i9}$ for each class are generated.

Also in this case, in the normal equation generation section 257, a normal equation is generated for each of the output pixels (in FIG. 8, the pixels HD1 to HD4 and HD1' to HD4'). Specifically, normal equations corresponding to the pixels HD1 to HD4 and HD1' to HD4' are generated using learning data items including pixel data items y whose shift values from the center prediction taps SD0 and SD0' have the same relationship as or a similar relationship to those of the pixels HD1 to HD4 and HD1' to HD4'. In the normal equation generation section 257, consequently, normal equations for obtaining the coefficient seed data items $w_{i0}$ to $w_{i9}$ are generated for each combination of class and output pixel.

The coefficient seed data generating device 250 further includes a coefficient seed data setting section 258 and a coefficient seed memory 259. The coefficient seed data setting section 258 receives data of the normal equations from the normal equation generation section 257, and solves the normal equations using the sweep-out method or the like to determine coefficient seed data items $w_{i0}$ to $w_{i9}$ for each combination of class and output pixel. The coefficient seed memory 259 stores the coefficient seed data items $w_{i0}$ to $w_{i9}$ determined by the coefficient seed data setting section 258.

The operation of the coefficient seed data generating device 250 illustrated in FIG. 10 will now be described.

An image signal Vb' serving as a teacher signal is input to the input terminal 251. The image signal Vb' is subjected to horizontal and vertical decimation processes using the SD signal generation section 252, and an image signal Va' serving as a student signal is generated. In this case, the image quality parameters r and z are supplied as control signals to the SD signal generation section 252, and a plurality of image signals Va' in which the frequency characteristics and the amount of noise added are changed stepwise are sequentially generated.

In the class tap selection section 254, a plurality of pixel data items located around a position of interest in the image signal Vb' are selectively extracted as data items of class taps on the basis of the image signal Va'. The plurality of pixel data items are supplied to the class detection section 255. Then, in the class detection section 255, each of the pixel data items is subjected to a data compression process such as ADRC to generate a class code CL that indicates a class to which the pixel data item at the position of interest in the image signal Vb' belongs. The class code CL is supplied to the normal equation generation section 257.

In the prediction tap selection section 253, a plurality of pixel data items xi located around the position of interest in the image signal Vb' are selectively extracted as data items of prediction taps on the basis of the image signal Va'. The plurality of pixel data items xi are supplied to the normal equation generation section 257. Further, in the teacher tap selection section 256, a pixel data item y at the position of interest in the image signal Vb' is selectively extracted on the basis of the image signal Vb'. The pixel data item y is supplied to the normal equation generation section 257.

In the normal equation generation section 257, for individual positions of interest in the image signal Vb', normal equations (see Equation (9)) for obtaining coefficient seed data items $w_{i0}$ to $w_{i9}$ are generated for each combination of class and output pixel on the basis of pixel data items y at the individual positions of interest, a plurality of pixel data items xi serving as data items of prediction taps, which correspond to the pixel data items y at the individual positions of interest, a class code CL that indicates a class to which each of the pixel data items y at the individual positions of interest belongs, and the values of the image quality parameters r and z supplied to the SD signal generation section 252.

Then, the data of the normal equations is supplied to the coefficient seed data setting section 258 from the normal equation generation section 257. The normal equations are solved using the sweep-out method or the like to determine coefficient seed data items $w_{i0}$ to $w_{i9}$ for each combination of class and output pixel. The coefficient seed data items $w_{i0}$ to $w_{i9}$ are stored in the coefficient seed memory 259.

In the coefficient seed data generating device 250 illustrated in FIG. 10, therefore, coefficient seed data items $w_{i0}$ to $w_{i9}$ for each combination of class and output pixel, which are stored in the ROM 216 of the processor main body section 202 described above, can be generated.

Figure 11:
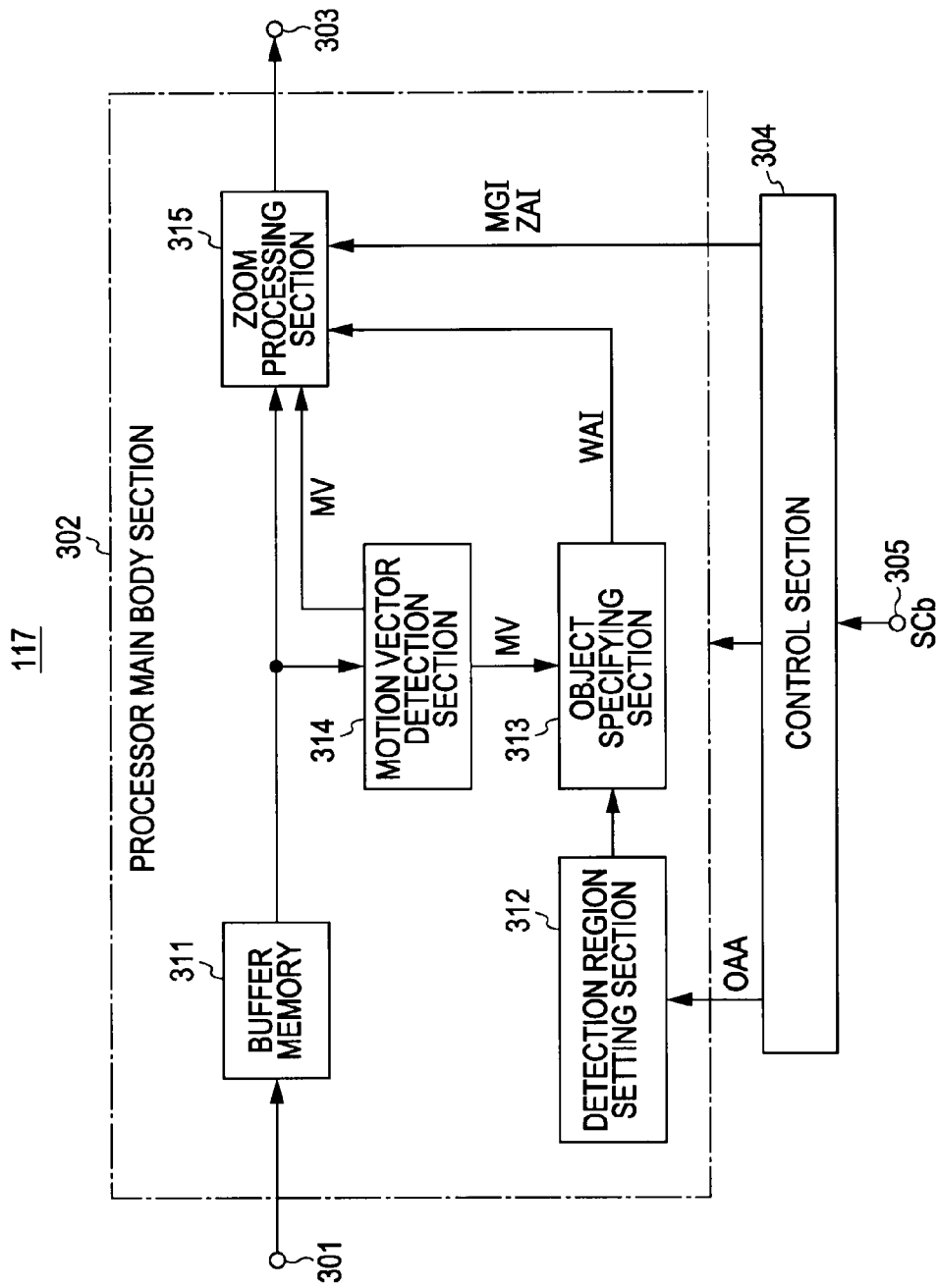
FIG. 11 is a block diagram illustrating an example configuration of a pan-tilt-zoom/track zoom processing section in the receiver main body section of the television receiver.

Next, the pan-tilt-zoom/track zoom processing section 117 will be described in detail. FIG. 11 illustrates an example configuration of the pan-tilt-zoom/track zoom processing section 117.

The pan-tilt-zoom/track zoom processing section 117 includes an input terminal 301 to which an image signal is input, a processor main body section 302 that processes the image signal input to the input terminal 301, an output terminal 303 from which an image signal obtained by the processor main body section 302 is output, a control section 304 that controls the operation of the processor main body section 302, and an input terminal 305 to which a control signal SCb is input.

The control section 304 controls the operation of the processor main body section 302 on the basis of the control signal SCb input to the input terminal 305. For example, the control section 304 includes an MPU, a ROM having stored therein an operation program of the MPU and the like, and a RAM serving as a working area of the MPU. The processor main body section 302 includes a buffer memory 311, a detection region setting section 312, an object specifying section 313, a motion vector detection section 314, and a zoom processing section 315.

The buffer memory 311 temporarily stores the image signal input to the input terminal 301. The detection region setting section 312 generates object region information, either solely or in cooperation with the object specifying section 313, on the basis of object region specifying information OAA. The object region specifying information OAA is included in the control signal SCb supplied from the control section 304. The object region information may be flag information configured such that, for example, a flag is set at a pixel position corresponding to an object region.

Figure 12:
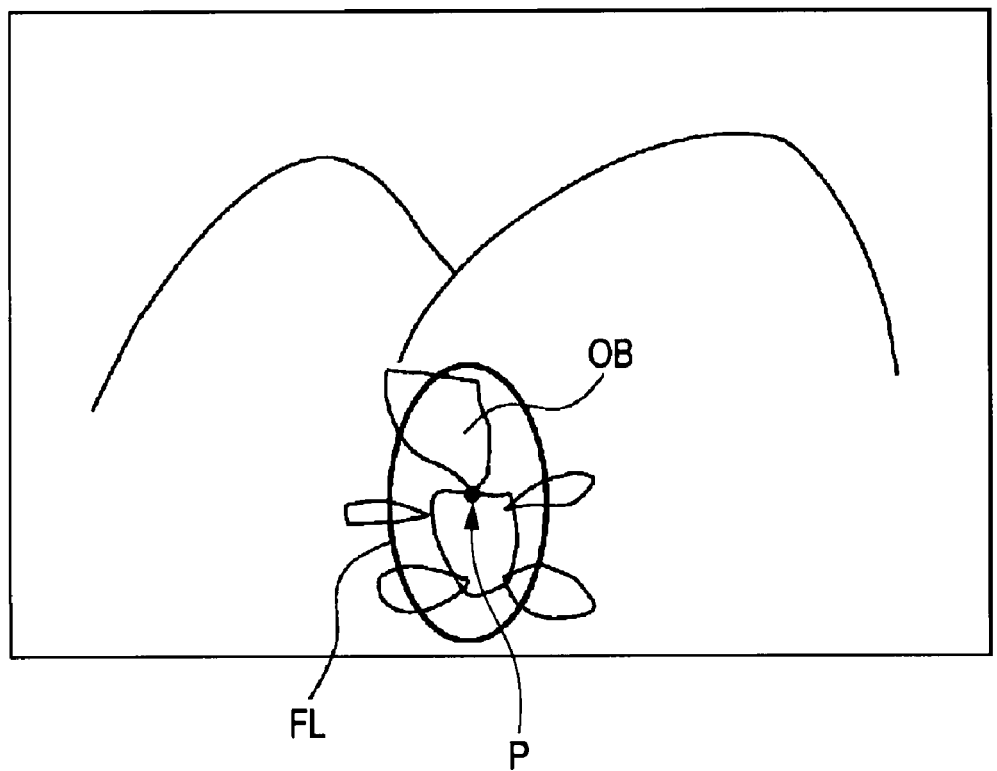
FIG. 12 is a diagram for illustrating the operation of specifying an object region in a track-zoom process.

Here, the operation of specifying an object region by a user will be described. When a user performs an operation for specifying an object region, the image signal stored in the buffer memory 311 is output to the output terminal 303, and an image based on this image signal is displayed on a screen of the display section 122. In this state, the user specifies a predetermined point P corresponding to an object OB by operating the remote controller 500. Accordingly, as illustrated in FIG. 12, a circle or ellipse frame FL that is centered on the predetermined point P is displayed. Although not illustrated, a display signal for displaying the frame FL is superimposed on the image signal using, for example, the zoom processing section 315. The user can adjust the size of the frame FL in advance. The shape of the frame FL may not necessarily be circle or ellipse and may be any other shape.

For example, the display of the frame FL in correspondence with the object OB in this manner allows the user to fix the specification of the object region. Then, frame position information obtained when the specification is fixed is supplied as the object region specifying information OAA described above from the system controller 101 to the pan-tilt-zoom/track zoom processing section 117. The detection region setting section 312 sets an inner frame region as an object region on the basis of the frame position information.

The motion vector detection section 314 detects a motion vector on a pixel-by-pixel basis for each frame on the basis of the image signal stored in the buffer memory 311. The detection of motion vectors may be performed using an existing block-matching method, gradient method, or the like, the detail of which is not described herein. The object specifying section 313 generates center-of-gravity position information WAI of the object region on the basis of the object region information generated by the detection region setting section 312 and motion vectors MV detected by the motion vector detection section 314.

Specifically, the object specifying section 313 determines, in an initial frame that is a frame in which the object region has been determined by the detection region setting section 312, the position of the center of gravity of the object region in the initial frame on the basis of the object region information generated by the detection region setting section 312, and generates center-of-gravity position information WAI of the object region in the initial frame. The object specifying section 313 further obtains motion information of the object OB, which is used in a next frame, on the basis of the individual motion vectors detected by the motion vector detection section 314 in correspondence with the individual pixels within the object region. For example, the motion information of the object OB may be an average motion vector obtained by averaging the individual motion vectors. Alternatively, for example, the motion information of the object OB may be a motion vector with the highest frequency of occurrence among the individual motion vectors.

In a frame subsequent to the initial frame, the object specifying section 313 determines the position of the center of gravity of the object region in this frame by moving the position of the center of gravity of the object region, which is determined in the initial frame, using the motion information of the object OB obtained in the initial frame, and generates center-of-gravity position information WAI. In the frame subsequent to the initial frame, further, the object specifying section 313 sets an object region in this frame by moving the object region, which is determined in the initial frame, using the motion information of the object OB obtained in the initial frame, and obtains motion information of the object OB, which is used in a next frame, on the basis of the individual motion vectors detected by the motion vector detection section 314 in correspondence with the individual pixels within the object region.

In each of the subsequent frames, similarly, the object specifying section 313 generates center-of-gravity position information WAI of an object region using the motion information of the object OB obtained in the preceding frame. In addition, the object specifying section 313 sets an object region in this frame, and obtains motion information of the object OB which is used in a next frame.

The detection region setting section 312, the object specifying section 313, and the motion vector detection section 314 operate when the track-zoom function is turned on. The center-of-gravity position information WAI of the object region generated by the object specifying section 313 is supplied to the zoom processing section 315. Accordingly, a track-zoom process is performed.

The zoom processing section 315 performs a zoom process (pan-tilt-zoom function) or a track-zoom process (track-zoom function) on the image signal stored in the buffer memory 311 on the basis of the center-of-gravity position information WAI of the object region generated by the object specifying section 313 or zoom position information ZAI supplied from the control section 304 and magnification information MGI supplied from the control section 304.

Specifically, in the track-zoom process, the zoom processing section 315 performs a process of magnifying an image region by a magnification indicated by the magnification information MGI supplied from the control section 304. The image region is centered on the position of the center of gravity of the object region that is indicated by the center-of-gravity position information WAI supplied from the object specifying section 313. This provides track zooming in which the center of a zoomed image sequentially moves in accordance with a movement of the position of the center of gravity of the object region indicated by the center-of-gravity position information WAI.

In this track-zoom process, in the object specifying section 313, as described above, center-of-gravity position information WAI of an object region in each of frames starting with the initial frame is sequentially obtained. In the zoom processing section 315, the image signals of the individual frames are sequentially read from the buffer memory 311 and are processed on the basis of the pieces of center-of-gravity position information WAI of the corresponding frames which are sequentially obtained by the object specifying section 313.

In the zoom process, the zoom processing section 315 performs a process of magnifying an image region by a magnification indicated by the magnification information MGI supplied from the control section 304. The image region is centered on the position of the center of the zoom process, which is specified by the zoom position information ZAI supplied from the control section 304. In this case, a user moves the center of the zoom process along the horizontal direction, thereby achieving panning in which the center of a zoomed image sequentially moves along the horizontal direction. Similarly, a user moves the center of the zoom process along the vertical direction, thereby achieving tilting in which the center of a zoomed image sequentially moves along the vertical direction.

The operation of the pan-tilt-zoom/track zoom processing section 117 illustrated in FIG. 11 will now be described. First, the operation of the zoom process in the pan-tilt-zoom function will be described. An image signal input to the input terminal 301 is supplied to the buffer memory 311 and is temporarily stored therein. When a user specifies a zoom position, zoom position information ZAI that indicates the position of the center of the zoom process is supplied from the control section 304 to the zoom processing section 315. Magnification information MGI is also supplied to the zoom processing section 315 from the control section 304.

In the zoom processing section 315, a process of magnifying an image region centered on the position of the center of the zoom process, which is indicated by the zoom position information ZAI supplied from the control section 304, by a magnification indicated by the magnification information MGI supplied from the control section 304 is performed. An image signal obtained by the zoom processing section 315 is supplied to the output terminal 303.

Next, the operation of the track-zoom process in the track-zoom function will be described. An image signal input to the input terminal 301 is supplied to the buffer memory 311 and is temporarily stored therein. When a user specifies a predetermined point P corresponding to an object OB, a circle or ellipse frame FL centered on the predetermined point P is displayed (see FIG. 12). Frame position information of the frame FL is supplied as object region specifying information OAA from the control section 304 to the detection region setting section 312. In the detection region setting section 312, an inner frame region is set as an object region on the basis of the frame position information. This object region information is supplied to the object specifying section 313.

In the motion vector detection section 314, a motion vector is detected on a pixel-by-pixel basis for each frame on the basis of the image signal stored in the buffer memory 311. The motion vector detected on a pixel-by-pixel basis for each frame in this manner is supplied to the object specifying section 313.

In the object specifying section 313, in an initial frame that is a frame in which the object region has been determined by the detection region setting section 312, the position of the center of gravity of the object region in the initial frame is determined on the basis of the object region information generated by the detection region setting section 312, and center-of-gravity position information WAI of the object region in the initial frame is generated. In addition, motion information of the object OB, which is used in a next frame, is obtained on the basis of the individual motion vectors detected by the motion vector detection section 314 in correspondence with the individual pixels within the object region.

Further, in the object specifying section 313, in a frame subsequent to the initial frame, center-of-gravity position information WAI of an object region in this frame is generated by moving the position of the center of gravity of the object region, which is determined in the initial frame, using the motion information of the object OB obtained in the initial frame. In addition, an object region in this frame is determined by moving the object region in the initial frame using the motion information of the object OB which is obtained in the initial frame, and motion information of an object OB, which is used in a next frame, is obtained on the basis of the individual motion vectors detected by the motion vector detection section 314 in correspondence with the individual pixels within the object region in this frame.

Further, in the object specifying section 313, in each of the subsequent frames, similarly, center-of-gravity position information WAI of an object region in this frame is generated using the motion information of the object OB obtained in the preceding frame. In addition, motion information of the object OB which is used in a next frame is obtained.

In the object specifying section 313, therefore, center-of-gravity position information WAI of an object region in each of frames starting with the initial frame is sequentially obtained. The center-of-gravity position information WAI of the object region obtained in each frame is supplied to the zoom processing section 315. Magnification information MGI is also supplied to the zoom processing section 315 from the control section 304.

In the zoom processing section 315, a zoom process for magnifying a predetermined region including the position of the center of gravity of an object region is performed on the basis of the center-of-gravity position information WAI of the object region and the magnification information MGI. In this case, the position of the center of gravity of an object region in each frame moves along with a movement of the object OB. Thus, a track-zoom process in which the predetermined region to be magnified is shifted in accordance with a movement of the object OB is performed. An image signal obtained by the zoom processing section 315 is supplied to the output terminal 303.

Next, the zoom processing section 315 in the pan-tilt-zoom/track zoom processing section 117 will be described.

Figure 13:
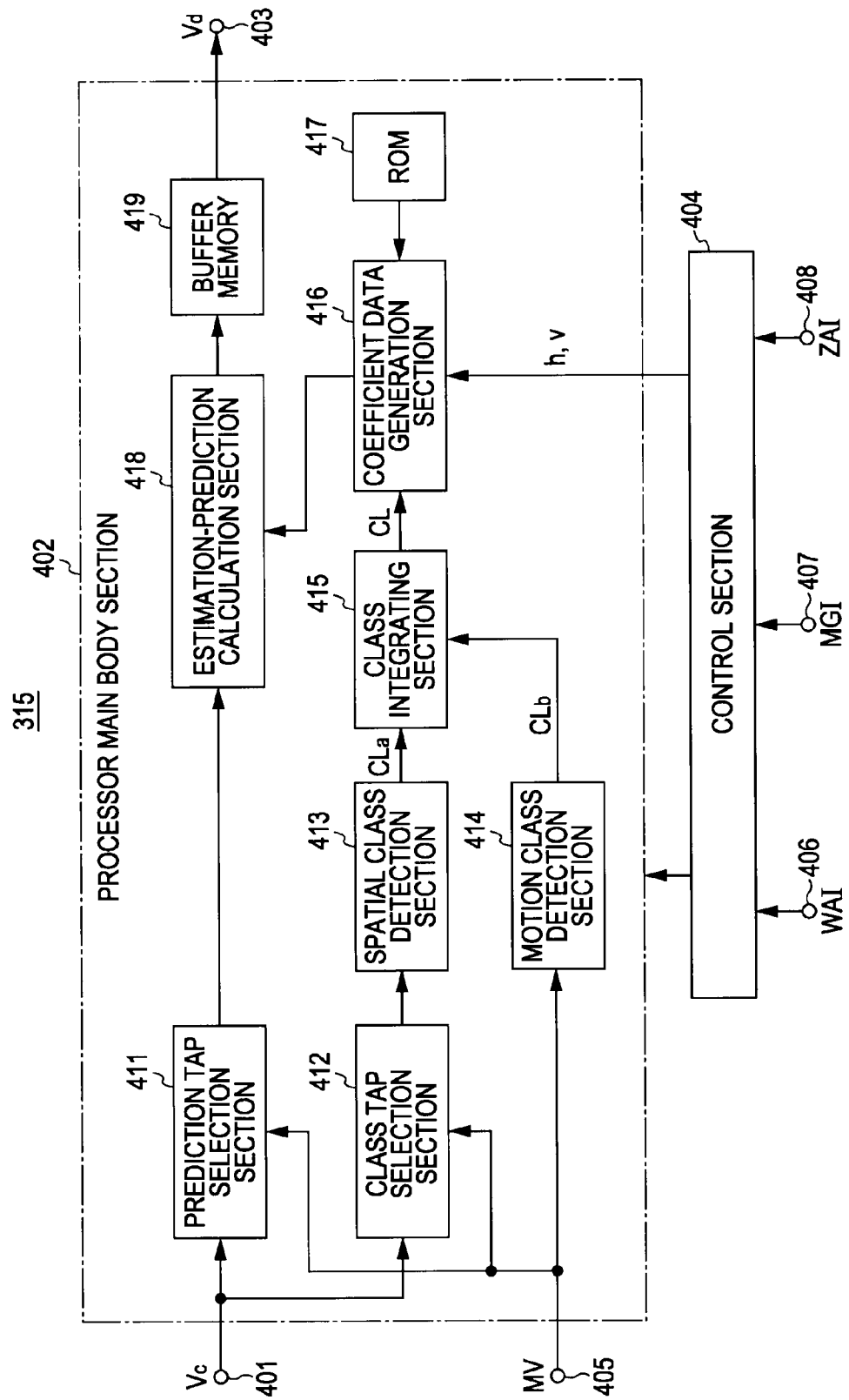
FIG. 13 is a block diagram illustrating an example configuration of a zoom processing section in the pan-tilt-zoom/track zoom processing section.

FIG. 13 illustrates the configuration of the zoom processing section 315. The zoom processing section 315 includes an input terminal 401 to which an image signal Vc is input, a processor main body section 402 that processes the image signal Vc input to the input terminal 401, an output terminal 403 from which an image signal Vd obtained by the processor main body section 402 is output, and a control section 404 that controls the operation of the processor main body section 402. The zoom processing section 315 further includes an input terminal 405 to which a motion vector MV detected by the motion vector detection section 314 is input, an input terminal 406 to which center-of-gravity position information WAI of an object region is input, an input terminal 407 to which magnification information MGI is input, and an input terminal 408 to which zoom position information ZAI is input.

The control section 404 controls the operation of the processor main body section 402 on the basis of the center-of-gravity position information WAI of the object region input to the input terminal 406 or the zoom position information ZAI input to the input terminal 408 and the magnification information MGI input to the input terminal 407. For example, the control section 404 includes an MPU, a ROM having stored therein an operation program of the MPU and the like, and a RAM serving as a working area of the MPU.

The processor main body section 402 includes a prediction tap selection section 411, a class tap selection section 412, a spatial class detection section 413, a motion class detection section 414, a class integrating section 415, a coefficient data generation section 416, a ROM 417, an estimation-prediction calculation section 418, and a buffer memory 419.

The prediction tap selection section 411 and the class tap selection section 412 selectively extract a plurality of pixel data items located around a position of interest in the image signal Vd from the image signal Vc as data items of prediction taps and data items of class taps, respectively. The patterns of the prediction taps and the class taps are changed in accordance with, for example, the magnitude of a motion vector of a pixel at a center prediction tap, which is input to the input terminal 405. For example, when the motion vector is small in magnitude, the prediction taps and the class taps are applied not only in the spatial direction (horizontal and vertical directions) of the current frame but also to the current frame in the temporal direction. When the motion vector is large in magnitude, however, the prediction taps and the class taps are applied only in the spatial direction of the current frame.

The spatial class detection section 413 performs a data compression process on the plurality of pixel data items serving as data items of class taps, which are selectively extracted by the class tap selection section 412, to obtain a class code CLa that indicates a spatial class to which the pixel data item at the position of interest in the image signal Vd belongs. The spatial class detection section 413 is configured to adopt, for example, 1-bit ADRC, which is similar to the class detection section 214 in the processor main body section 202 of the DRC-volume processing section 116 illustrated in FIG. 5.

The motion class detection section 414 classifies, for example, the magnitude of the motion vector MV of the pixel at the center prediction tap, which is input to the input terminal 405, and obtains a class code CLb that indicates a motion class to which the pixel data item at the position of interest in the image signal Vd belongs. The class integrating section 415 integrates the class code CLa obtained by the spatial class detection section 413 and the class code CLb obtained by the motion class detection section 414 to obtain a class code CL that indicates a class to which the pixel data item at the position of interest in the image signal Vd belongs.

The ROM 417 stores coefficient seed data items of individual classes. In an estimation-prediction calculation section 418, which will be described below, a pixel data item y at a position of interest in the image signal Vd is determined according to an estimated equation corresponding to Equation (11) using a plurality of pixel data items xi serving as prediction taps and coefficient data items $W_i$:

$$y = \sum_{i=1}^{n} w_i \cdot x_i \tag{11}$$

where n denotes the number of pixel data items xi serving as prediction taps.

The coefficient seed data items stored in the ROM 417 are coefficient data items given in a generation equation for generating the coefficient data items $W_i$ (i=1 to n) in the estimated equation above, where phase information, h and v, are used as parameters. Equation (12) represents an example of this generation equation:

$$W_i = w_{i0} + w_{i1}v + w_{i2}h + w_{i3}v^2 + \\ w_{i4}vh + w_{i5}h^2 + w_{i6}v^3 + w_{i7}v^2h + w_{i8}vh^2 + w_{i9}h^3 \tag{12}$$

In Equation (12), the phase information h represents horizontal phase information and the phase information v represents vertical phase information.

The ROM 417 stores, for each class, for example, coefficient seed data items $w_{i0}$ to $w_{i9}$ (i=1 to n) that are coefficient data items in the generation equation corresponding to Equation (12). A method for generating the coefficient seed data items will be described below.

The coefficient data generation section 416 reads from the ROM 417 the coefficient seed data items $w_{i0}$ to $w_{i9}$ of the class indicated by the class code CL obtained by the class integrating section 415, and generates coefficient data items $W_i$ according to the generation equation corresponding to Equation (12) using the values of the phase information, h and v, of the position of interest in the image signal Vd, which are supplied from the control section 404. In this case, the positions of the individual pixels in the processed image signal Vd with respect to the unprocessed image signal Vc are changed in accordance with the magnification information MGI.

Figure 14:
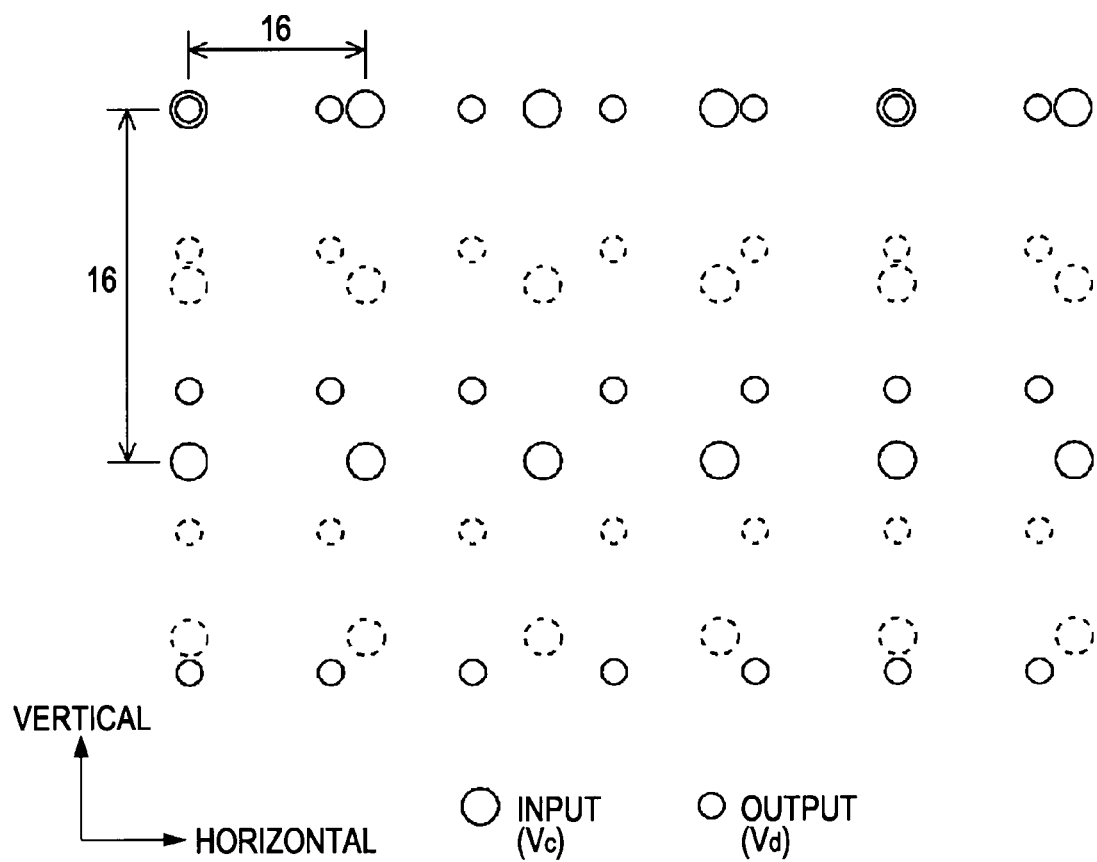
FIG. 14 is a diagram illustrating a pixel position relationship between an input (image signal Vc) and an output (image signal Vd) when the magnification indicated by magnification information is 1.25×.

For example, FIG. 14 illustrates a pixel position relationship between the input (image signal Vc) and the output (image signal Vd) when the magnification indicated by the magnification information MGI is 1.25×. In FIG. 14, large dots represent pixels of the input, and small dots represent pixels of the output. In FIG. 14, further, pixel positions in odd fields are indicated by solid-line representations and pixel positions in even fields are indicated by broken-line representations.

The control section 404 generates the phase information, h and v, of the position of interest in the image signal Vd in correspondence with each of the odd and even fields on the basis of the magnification information MGI. In this case, for example, the horizontal and vertical pixel pitches of the image signal Vc are set to 16. The distances from the position of interest in the image signal Vd to the pixel (nearest pixel) in the image signal Vc, which is at the closest position, in the horizontal and vertical directions are used as the phase information, h and v, respectively.

Here, the phase information h is set to a negative value when the position of interest is located to the left of the nearest pixel, and is set to a positive value when the position of interest is located to the right of the nearest pixel. Similarly, the phase information v is set to a negative value when the position of interest is located upward of the nearest pixel, and is set to a positive value when the position of interest is located downward of the nearest pixel.

The estimation-prediction calculation section 418 calculates a pixel data item y at the position of interest in the image signal Vd according to the estimated equation corresponding to Equation (11) using the plurality of pixel data items xi serving as data items of prediction taps, which are selectively extracted by the prediction tap selection section 411, and the coefficient data items $W_i$ generated by the coefficient data generation section 416. The buffer memory 419 temporarily stores the pixel data items that constitute the image signal Vd, which are calculated by the estimation-prediction calculation section 418, and outputs the pixel data items to the output terminal 403 at an appropriate timing.

A processing region for the image signal Vc for obtaining a pixel data item at each position of interest in the image signal Vd described above is changed in accordance with the magnification. FIG. 15 illustrates the relationship between magnifications and processing regions of the image signal Vc. The higher the magnification is, the smaller the processing region for the image signal Vc becomes. When an entire region for the image signal Vc is represented by 1 in the horizontal and vertical directions, for example, the processing region for the image signal Vc is 1 for a magnification of 1, and the processing region for the image signal Vc is ½ for a magnification of 2. In general, when the magnification ratio of an image is T, the processing region for the image signal Vc is 1/T.

In the track-zoom process, the processing region typically includes the position of the center of gravity of an object region, and is set so that the internal ratio of this position of the center of gravity in the horizontal and vertical directions can be equal to the internal ratio of this position of the center of gravity in the horizontal and vertical directions in the entire region for the image signal Vc.

Figure 16A:
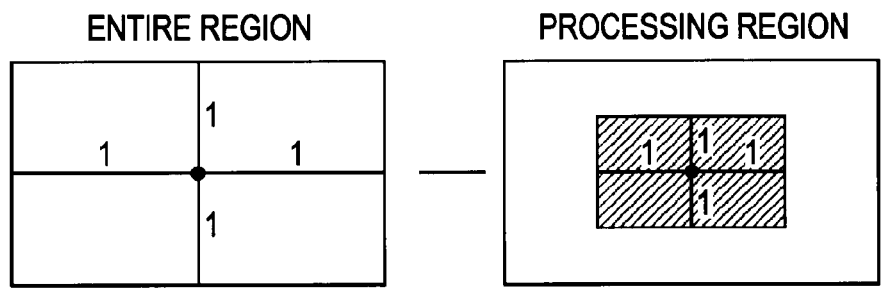
FIGS. 16A to 16C are diagrams illustrating examples of the relationship between the position of the center of gravity of an object region and a processing region when a zoom magnification of 2 is set.
Figure 16B:
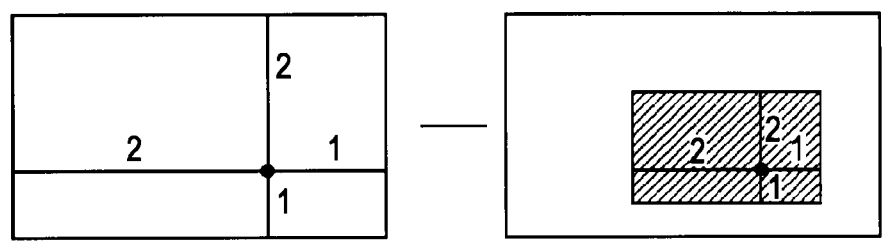
Figure 16C:
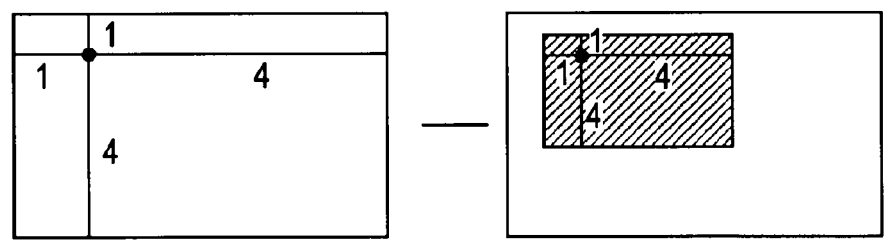

FIGS. 16A to 16C illustrate examples of the relationship between the position of the center of gravity of the object region and the processing region when a magnification of 2 is set. In FIGS. 16A to 16C, numerals represent the internal ratio. The setting of the processing region for the image signal Vc in the illustrated manner prevents an output image from including a missing portion due to the lack of a sufficient processing region for the image signal Vc when the position of the center of gravity of the object region is shifted to an end of the screen.

Also in the zoom process, similarly to the track-zoom process described above, the processing region typically includes the center of the zoom process, and is set so that the internal ratio of this position of the center in the horizontal and vertical directions can be equal to the internal ratio of this position of the center in the horizontal and vertical directions in the entire region for the image signal Vc.

The operation of the zoom processing section 315 illustrated in FIG. 13 will now be described. The image signal Vc to be processed is input to the input terminal 401. In the processor main body section 402, a zoom process is performed on a predetermined region for the image signal Vc. The predetermined region corresponds to the position of the center of gravity of an object region or the center of the zoom process, and has a size corresponding to the magnification. Thus, individual pixel data items that constitute the image signal Vd are generated.

In the class tap selection section 412, a plurality of pixel data items located around a position of interest in the image signal Vd are selectively extracted as data items of class taps on the basis of the image signal Vc. The plurality of pixel data items are supplied to the spatial class detection section 413. In the spatial class detection section 413, the plurality of pixel data items serving as data items of class taps are subjected to, for example, a 1-bit ADRC data compression process to obtain a class code CLa that indicates a spatial class to which the pixel data item at the position of interest in the image signal Vd belongs.

The motion class detection section 414 is also supplied with, for example, the motion vector MV of the pixel at the center prediction tap from the input terminal 405. In the motion class detection section 414, the magnitude of the motion vector MV is classified, and a class code CLb that indicates a motion class to which the pixel data at the position of interest belongs is obtained.

The class code CLa obtained by the spatial class detection section 413 and the class code CLb obtained by the motion class detection section 414 are supplied to the class integrating section 415. In the class integrating section 415, the class codes CLa and CLb are integrated, and a class code CL that indicates a class to which the pixel data at the position of interest in the image signal Vd belongs is obtained. The class code CL is supplied to the coefficient data generation section 416.

The coefficient data generation section 416 is also supplied with the phase information, h and v, of the position of interest in the image signal Vd from the control section 404. Accordingly, in the coefficient data generation section 416, coefficient seed data items $w_{i0}$ to $w_{i9}$ in the class indicated by the class code CL are read from the ROM 417 in correspondence with the position of interest in the image signal Vd, and coefficient data items $W_i$ is generated according to the generation equation corresponding to Equation (12) using the values of the phase information, h and v. The coefficient data items $W_i$ are supplied to the estimation-prediction calculation section 418.

In the prediction tap selection section 411, a plurality of pixel data items xi located around the position of interest in the image signal Vd are selectively extracted as data items of prediction taps on the basis of the image signal Vc. The plurality of pixel data items are supplied to the estimation-prediction calculation section 418.

In the estimation-prediction calculation section 418, a pixel data item y at the position of interest in the image signal Vd is calculated according to the estimated equation corresponding to Equation (11) using the plurality of pixel data items xi serving as data items of prediction taps and the coefficient data items $W_i$. In this case, the position of interest is sequentially shifted to all pixel positions in the image signal Vd. Accordingly, the pixel data items y at all the pixel positions of the image signal Vd can be determined.

The pixel data items y at all the pixel positions of the image signal Vd, which are determined by the estimation-prediction calculation section 418, are supplied to the buffer memory 419 and are temporarily stored therein. The individual pixel data items constituting the image signal Vd, which are stored in the buffer memory 419, are then read at an appropriate timing and are output to the output terminal 403.

Next, a method for generating coefficient seed data items, which are stored in the ROM 417 of the processor main body section 402 described above, will be described. The coefficient seed data items are generated by learning. Here, by way of example, it is assumed that the coefficient seed data items $w_{i0}$ to $w_{i9}$ in the generation equation corresponding to Equation (12) are determined. For the convenience of the following description, $t_j$ (j=0 to 9) is defined as in Equation (13):

$t_0 = 1$ $t_1 = v$ $t_2 = h$ $t_3 = v2$ $t_4 = vh$ $t_5 = h2$ $t_6 = v3$ $t_7 = v2h$ $t_8 = vh2$ $t_9 = h3$ (13)

If Equation (13) is used, Equation (12) can be rewritten as:

$$W_i = \sum_{j=0}^{9} w_{ij} \times t_j \tag{14}$$

Finally, an undetermined coefficient $w_{ij}$ is determined by learning. Specifically, a coefficient value that minimizes the squared error is determined for each class using a pixel data item of a student signal and a pixel data item of a teacher signal. This is the so-called solution based on the least square method. If the number of learning data items is denoted by m, the residual for the k-th ($1 \leq k \leq m$) learning data item is denoted by $e_k$, and the sum of squared errors is denoted by E, the sum of squared errors E is expressed by Equation (15) using Equations (11) and (12):

$$\begin{aligned} E &= \sum_{k=1}^{m} e_k^2 \\ &= \sum_{k=1}^{m} [y_k - (W_1 x_{1K} + W_2 x_{2K} + \ldots + W_n x_{nK})]^2 \\ &= \sum_{k=1}^{m} \{y_k - [(t_0 w_{10} + t_1 w_{11} + \ldots + t_9 w_{19}) x_{1k} + \ldots + \\ &\quad (t_0 w_{n0} + t_1 w_{n1} + \ldots + t_9 w_{n9}) x_{nk}]\}^2 \end{aligned} \tag{15}$$

where $x_{ik}$ denotes the k-th pixel data item at the i-th prediction tap position in the student signal, and $y_k$ denotes the k-th pixel data item in the corresponding teacher signal.

In the solution based on the least square method, $w_{ij}$ is determined so that the partial differential value of Equation (15) for $w_{ij}$ is zero. This is expressed in Equation (16):

$$\frac{\partial E}{\partial w_{ij}} = \sum_{k=1}^{m} 2 \left( \frac{\partial e_k}{\partial w_{ij}} \right) e_k = -\sum_{k=1}^{m} 2 t_j x_{ik} e_k = 0 \tag{16}$$

If $X_{ipjq}$ and $Y_{ip}$ are defined as in Equations (17) and (18), respectively, Equation (16) can be rewritten as Equation (19) in matrix form:

$$X_{ipjq} = \sum_{k=1}^{m} x_{ik} t_p x_{jk} t_q \tag{17}$$

$$Y_{ip} = \sum_{k=1}^{m} x_{ik} t_p y_k \tag{18}$$

$$\begin{bmatrix} x_{1010} & x_{1011} & x_{1012} & \cdots & x_{1019} & x_{1020} & \cdots & x_{10n9} \\ x_{1110} & x_{1111} & x_{1112} & \cdots & x_{1119} & x_{1120} & \cdots & x_{11n9} \\ x_{1210} & x_{1211} & x_{1212} & \cdots & x_{1219} & x_{1220} & \cdots & x_{12n9} \\ \vdots & \vdots & \vdots & \ddots & \vdots & \vdots & \ddots & \vdots \\ x_{1910} & x_{1911} & x_{1912} & \cdots & x_{1919} & x_{1920} & \cdots & x_{19n9} \\ x_{2010} & x_{2011} & x_{2012} & \cdots & x_{2019} & x_{2020} & \cdots & x_{20n9} \\ \vdots & \vdots & \vdots & \ddots & \vdots & \vdots & \ddots & \vdots \\ x_{n910} & x_{n911} & x_{n912} & \cdots & x_{n919} & x_{n920} & \cdots & x_{n9n9} \end{bmatrix} \begin{bmatrix} w_{10} \\ w_{11} \\ w_{12} \\ \vdots \\ w_{19} \\ w_{20} \\ \vdots \\ w_{n9} \end{bmatrix} = \begin{bmatrix} Y_{10} \\ Y_{11} \\ Y_{12} \\ \vdots \\ Y_{19} \\ Y_{20} \\ \vdots \\ Y_{n9} \end{bmatrix} \tag{19}$$

The above equations are generally called normal equations. The normal equations are solved for $w_{ij}$ using a sweep-out method (Gauss-Jordan elimination) or the like to calculate coefficient seed data items.

Figure 17:
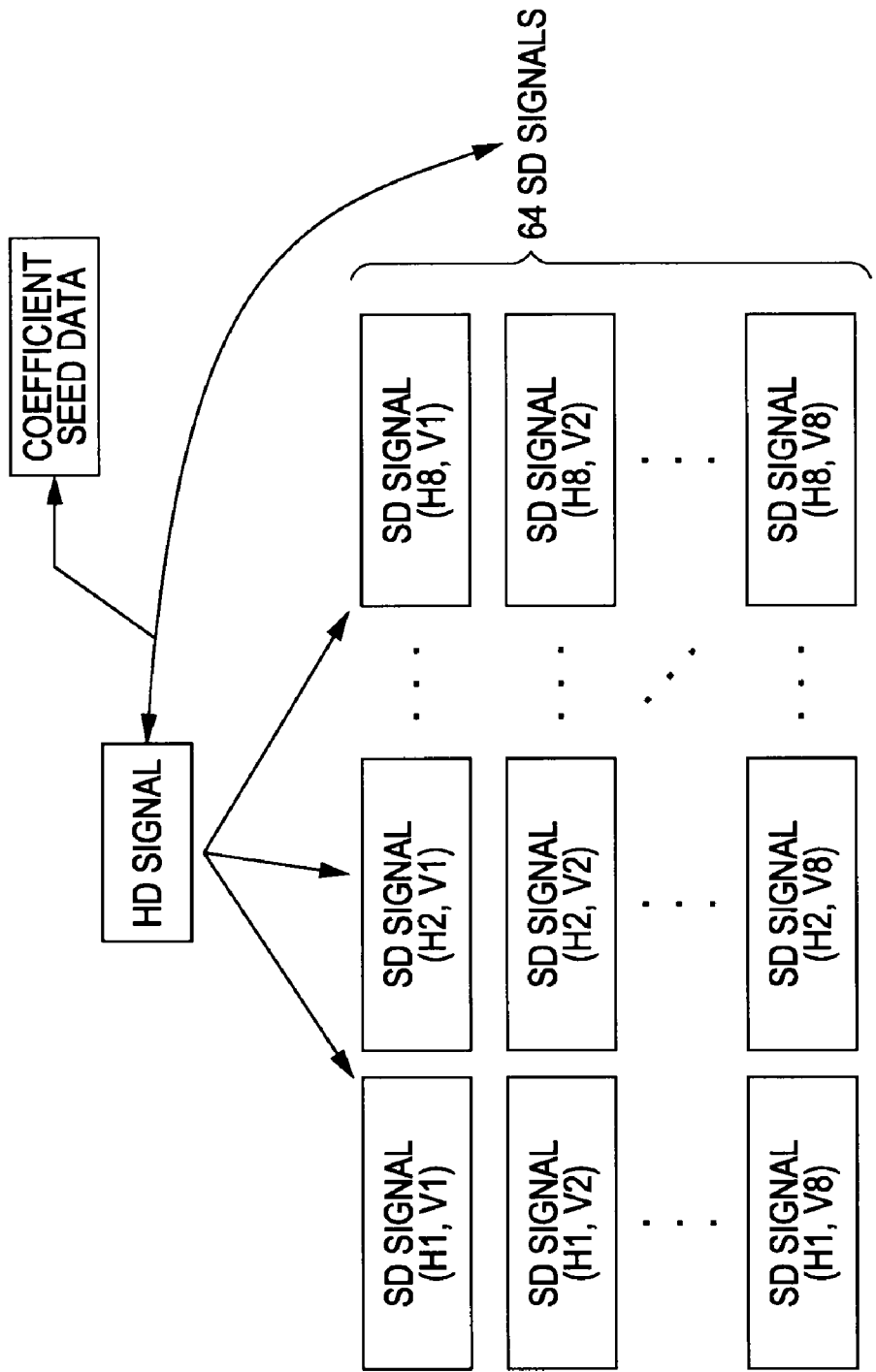
FIG. 17 is a diagram for illustrating a method for generating coefficient seed data which is used in the zoom processing section.

FIG. 17 illustrates a concept of the method for generating coefficient seed data items described above. An SD signal (525i signal) serving as a student signal is generated from an HD signal (1050i signal) serving as a teacher signal. The 525i signal refers to an interlaced image signal having 525 lines. The 1050i signal refers to an interlaced image signal having 1050 lines.

Figure 18:
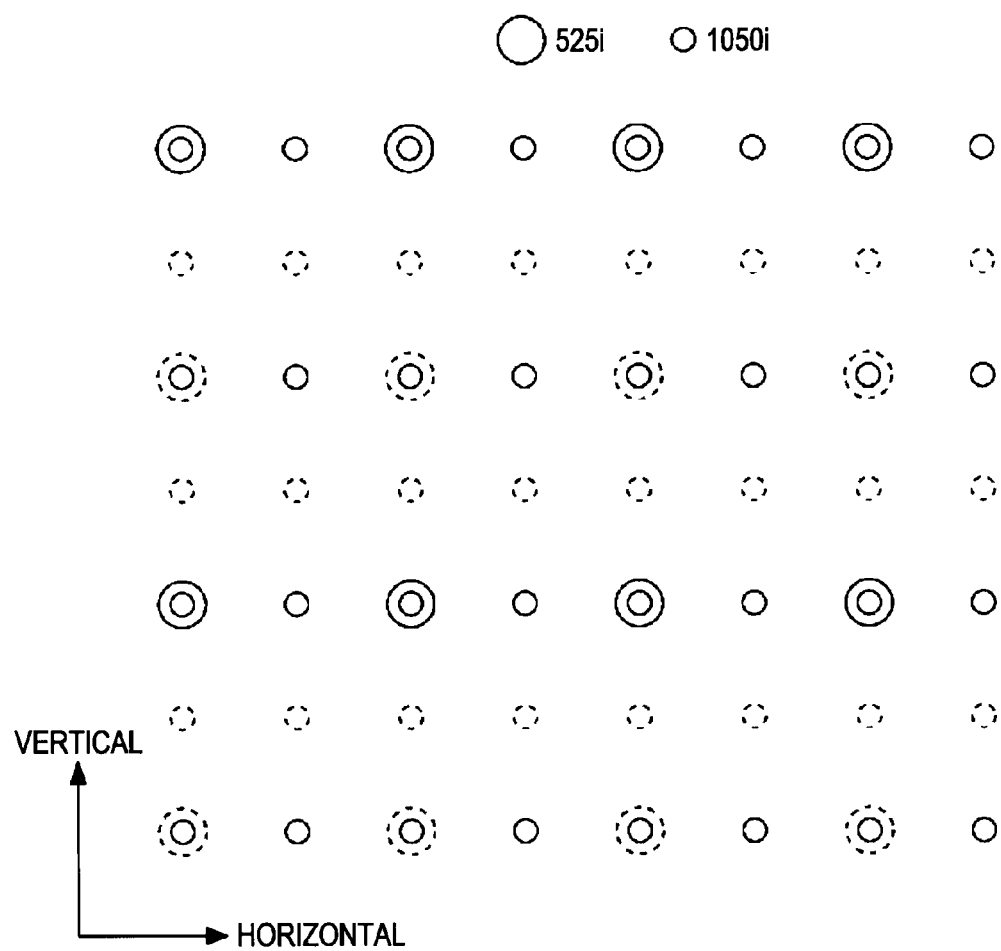
FIG. 18 is a diagram illustrating a pixel position relationship between an SD signal (525i signal) and an HD signal (1050i signal)

FIG. 18 illustrates a pixel position relationship between the SD signal (525i signal) and the HD signal (1050i signal). In FIG. 18, large dots represent pixels of the 525i signal, and small dots represent pixels of the 1050i signal. In FIG. 18, further, pixel positions in odd fields are indicated by solid-line representations and pixel positions in even fields are indicated by broken-line representations.

The SD signal is shifted in phase at eight levels in the vertical direction and eight levels in the horizontal direction to generate eight by eight, i.e., 64, SD signals SD1 to SD64. In an example of the phase shift method, for example, only a desired phase is extracted from an oversampling filter.

Figure 19:
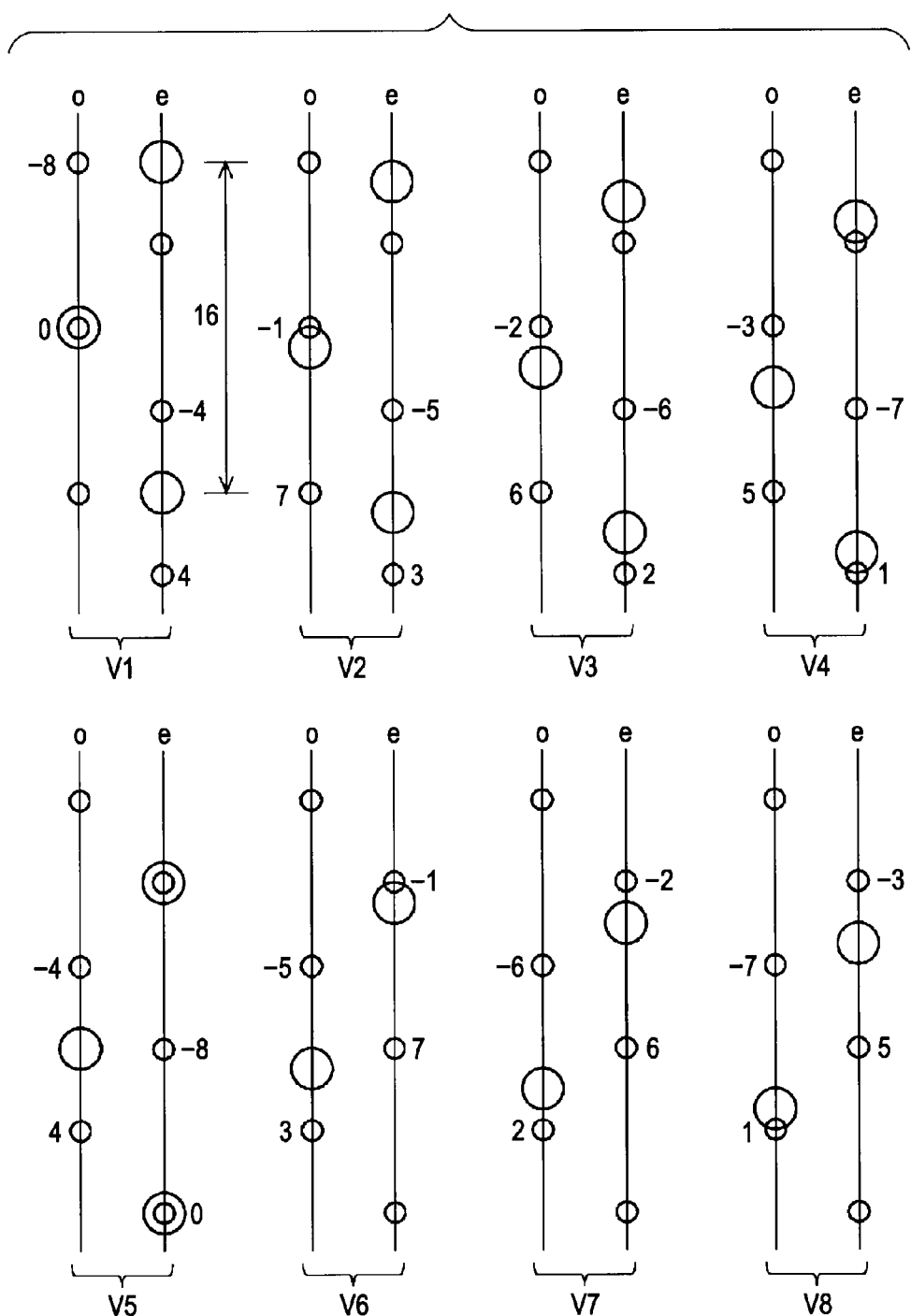
FIG. 19 is a diagram illustrating eight phase shift states in the vertical direction of the SD signal.

FIG. 19 illustrates eight phase shift states V1 to V8 in the vertical direction. In FIG. 19, the vertical pixel pitch of the SD signal is 16, where the down direction is positive. In FIG. 19, further, "o" represents an odd field and "e" represents an even field.

In the phase shift state V1, the shift amount of the SD signal is 0, and the pixels of the HD signal have phases of 4, 0, −4, and −8 with respect to the pixels of the SD signal. In the phase shift state V2, the shift amount of the SD signal is 1, and the pixels of the HD signal have phases of 7, 3, −1, and −5 with respect to the pixels of the SD signal. In the phase shift state V3, the shift amount of the SD signal is 2, and the pixels of the HD signal have phases of 6, 2, −2, and −6 with respect to the pixels of the SD signal. In the phase shift state V4, the shift amount of the SD signal is 3, and the pixels of the HD signal have phases of 5, 1, −3, and −7 with respect to the pixels of the SD signal.

In the phase shift state V5, the shift amount of the SD signal is 4, and the pixels of the HD signal have phases of 4, 0, −4, and −8 with respect to the pixels of the SD signal. In the phase shift state V6, the shift amount of the SD signal is 5, and the pixels of the HD signal have phases of 7, 3, −1, and −5 with respect to the pixels of the SD signal. In the phase shift state V7, the shift amount of the SD signal is 6, and the pixels of the HD signal have phases of 6, 2, −2, and −6 with respect to the pixels of the SD signal. In the phase shift state V8, the shift amount of the SD signal is 7, and the pixels of the HD signal have phases of 5, 1, −3, and −7 with respect to the pixels of the SD signal.

Figure 20:
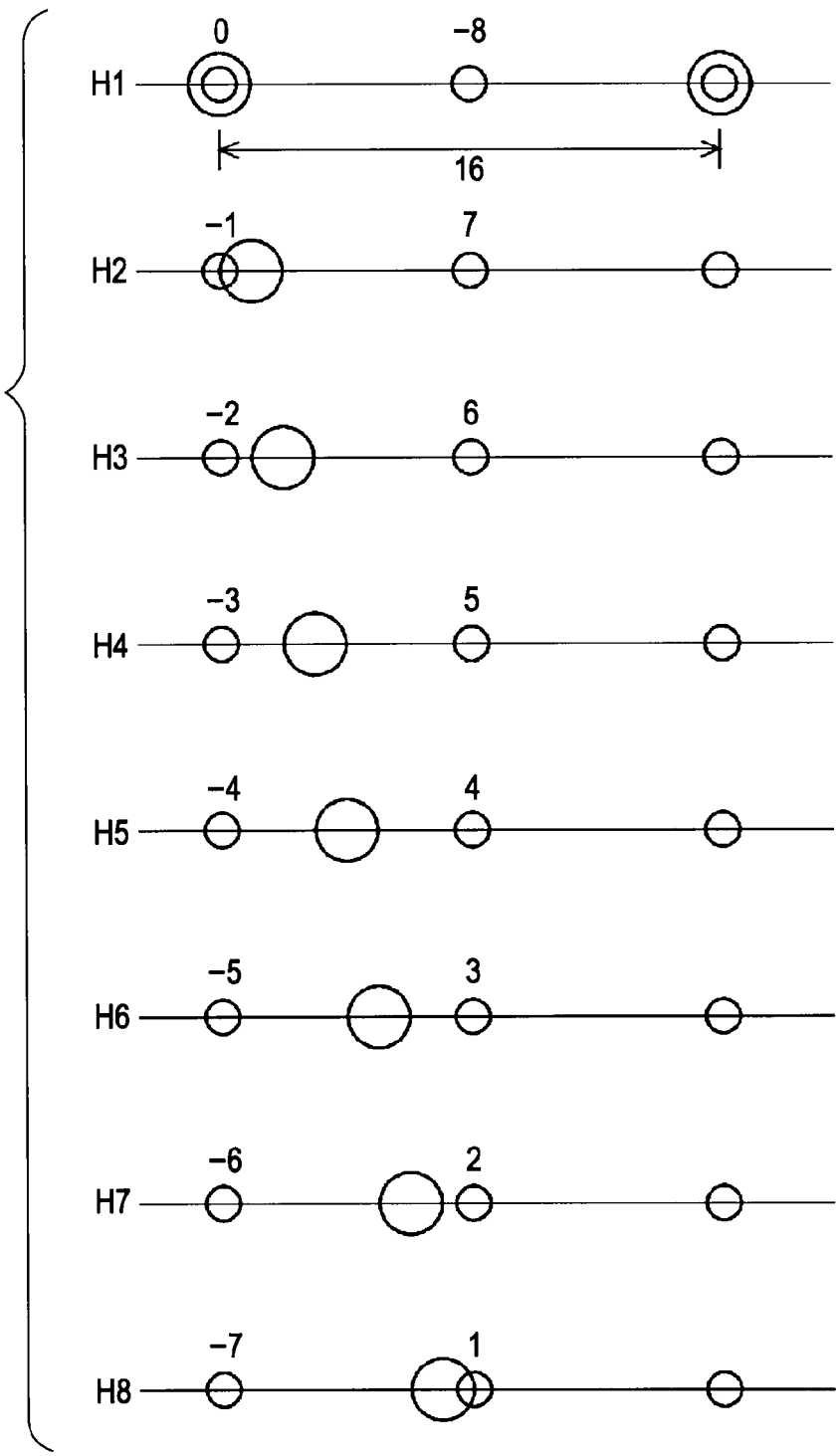
FIG. 20 is a diagram illustrating eight phase shift states in the horizontal direction of the SD signal.

FIG. 20 illustrates eight phase shift states H1 to H8 in the horizontal direction. In FIG. 20, the horizontal pixel pitch of the SD signal is 16, where the right direction is positive.

In the phase shift state H1, the shift amount of the SD signal is 0, and the pixels of the HD signal have phases of 0 and −8 with respect to the pixels of the SD signal. In the phase shift state H2, the shift amount of the SD signal is 1, and the pixels of the HD signal have phases of 7 and −1 with respect to the pixels of the SD signal. In the phase shift state H3, the shift amount of the SD signal is 2, and the pixels of the HD signal have phases of 6 and −2 with respect to the pixels of the SD signal. In the phase shift state H4, the shift amount of the SD signal is 3, and the pixels of the HD signal have phases of 5 and −3 with respect to the pixels of the SD signal.

In the phase shift state H5, the shift amount of the SD signal is 4, and the pixels of the HD signal have phases of 4 and −4 with respect to the pixels of the SD signal. In the phase shift state H6, the shift amount of the SD signal is 5, and the pixels of the HD signal have phases of 3 and −5 with respect to the pixels of the SD signal. In the phase shift state H7, the shift amount of the SD signal is 6, and the pixels of the HD signal have phases of 2 and −6 with respect to the pixels of the SD signal. In the phase shift state H8, the shift amount of the SD signal is and the pixels of the HD signal have phases of 1 and −7 with respect to the pixels of the SD signal.

Figure 21:
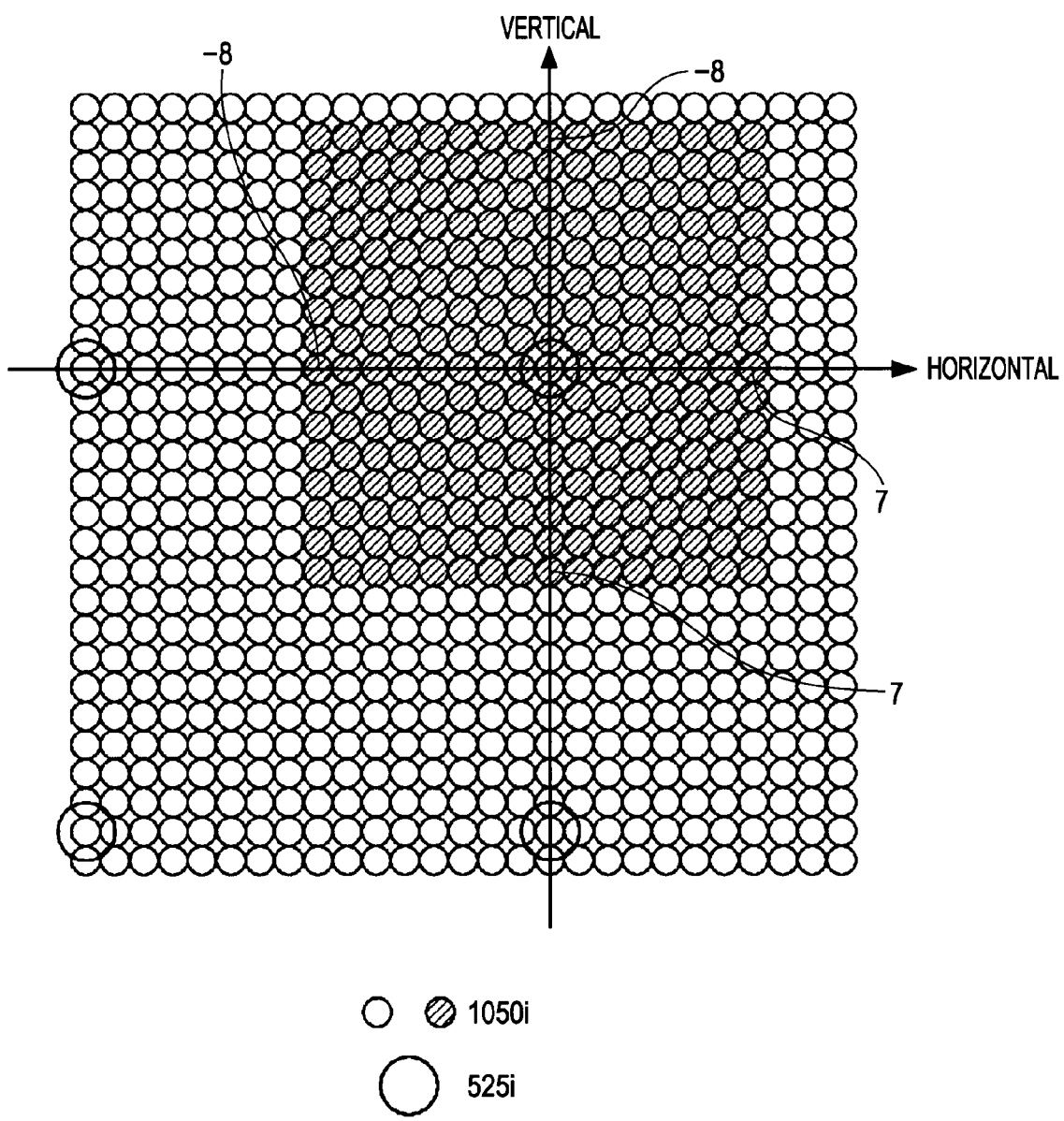
FIG. 21 is a diagram illustrating the phase of an HD signal (1050i signal) with respect to pixels of an SD signal when the SD signal is shifted in phase at eight levels in the vertical direction and eight levels in the horizontal direction to obtain 64 SD signals.

FIG. 21 illustrates the phase of an HD signal with respect to pixels of an SD signal when the SD signal is shifted in phase at eight levels in the vertical direction and eight levels in the horizontal direction in the manner described above to obtain 64 SD signals. That is, pixels of the HD signal have a phase as indicated by shaded dots in FIG. 21 with respect to pixels of the SD signal.

Figure 22:
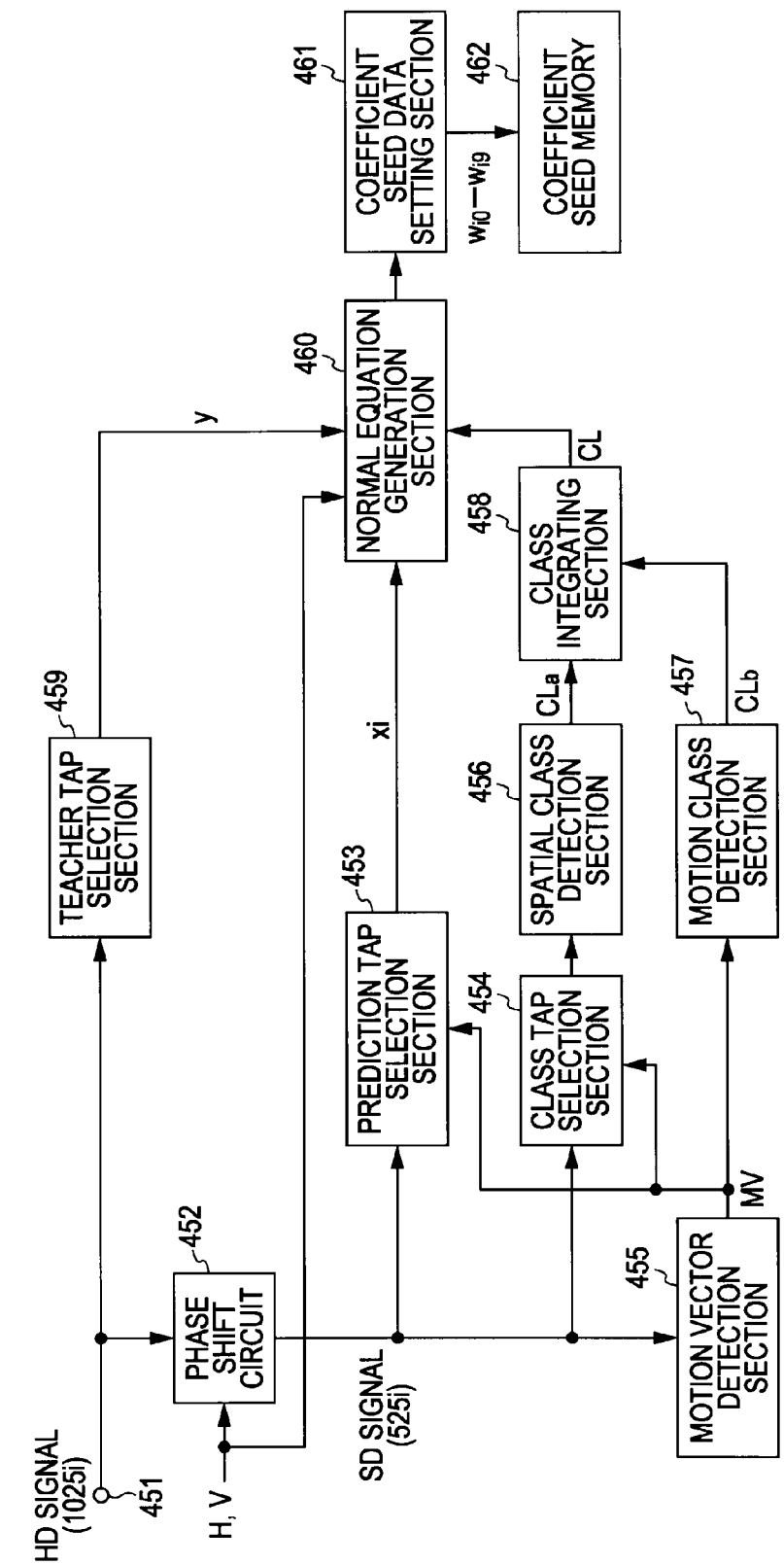
FIG. 22 is a block diagram illustrating an example configuration of a device for generating coefficient seed data which is stored in an internal ROM of the zoom processing section.

FIG. 22 illustrates the configuration of a coefficient seed data generating device 450 that generates coefficient seed data items using the concept described above.

The coefficient seed data generating device 450 includes an input terminal 451 to which an HD signal (1050i signal) serving as a teacher signal is input, and a phase shift circuit 452. The phase shift circuit 452 applies an oversampling filter in the horizontal and vertical directions to the HD signal input to the input terminal 451, and extracts a desired phase to obtain an SD signal (525i signal) serving as a student signal. The phase shift circuit 452 receives parameters H and V for specifying phase shift amounts in the horizontal and vertical directions, respectively. In this case, in the phase shift circuit 452, the SD signal is shifted in phase at eight levels in the vertical direction and eight levels in the horizontal direction, and a total of 64 SD signals are generated (see FIG. 17).

The coefficient seed data generating device 450 further includes a prediction tap selection section 453 and a class tap selection section 454. Each of the prediction tap selection section 453 and the class tap selection section 454 selectively extracts a plurality of pixel data items located around a position of interest in the HD signal on the basis of the SD signals output from the phase shift circuit 452. The prediction tap selection section 453 and the class tap selection section 454 correspond to the prediction tap selection section 411 and the class tap selection section 412 of the processor main body section 402 described above (see FIG. 13), respectively.

The coefficient seed data generating device 450 further includes a motion vector detection section 455. The motion vector detection section 455 detects a motion vector MV of a pixel at a center prediction tap on the basis of the SD signals output from the phase shift circuit 452. The patterns of prediction taps and class taps in the tap selection sections 453 and 454 described above are changed in accordance with the motion vector MV.

The coefficient seed data generating device 450 further includes a spatial class detection section 456. The spatial class detection section 456 processes the plurality of pixel data items serving as data items of class taps, which are selectively extracted by the class tap selection section 454, to obtain a class code CLa that indicates a spatial class to which the pixel data item at the position of interest in the HD signal belongs. The spatial class detection section 456 corresponds to the spatial class detection section 413 of the processor main body section 402 described above.

The coefficient seed data generating device 450 further includes a motion class detection section 457 and a class integrating section 458. The motion class detection section 457 classifies the magnitude of the motion vector MV of the pixel at the center prediction tap, which is detected by the motion vector detection section 455, and obtains a class code CLb that indicates a motion class to which the pixel data item at the position of interest in the HD signal belongs.

The class integrating section 458 integrates the class code CLa obtained by the spatial class detection section 456 and the class code CLb obtained by the motion class detection section 457 to obtain a class code CL that indicates a class to which the pixel data item at the position of interest in the HD signal belongs. The motion class detection section 457 and the class integrating section 458 correspond to the motion class detection section 414 and class integrating section 415 of the processor main body section 402 described above, respectively.

The coefficient seed data generating device 450 further includes a teacher tap selection section 459. The teacher tap selection section 459 selectively extracts the pixel data item at the position of interest from the HD signal.

The coefficient seed data generating device 450 further includes a normal equation generation section 460. The normal equation generation section 460 generates normal equations (see Equation (19)) for obtaining coefficient seed data items $w_{i0}$ to $w_{i9}$ for each class on the basis of pixel data items y at individual positions of interest in the HD signal, which are selectively extracted by the teacher tap selection section 459, a plurality of pixel data items xi serving as data items of prediction taps, which are selectively extracted by the prediction tap selection section 453 in correspondence with the pixel data items y at the individual positions of interest, the class code CL obtained by the class integrating section 458 in correspondence with the pixel data items y at the individual positions of interest, and the horizontal and vertical phases h and v of the pixel data items y at the individual positions of interest.

In this case, a single learning data item is generated using the combination of one pixel data item y and n corresponding pixel data items xi. The parameters H and V to be fed to the phase shift circuit 452 are sequentially changed, and 64 SD signals whose vertical and horizontal phase shift values are changed stepwise are generated. Accordingly, in the normal equation generation section 460, normal equations in which a large number of learning data items are registered are generated. In this manner, SD signals are sequentially generated and learning data items are registered. Thus, coefficient seed data items for obtaining pixel data items having any horizontal and vertical phases can be determined.

The coefficient seed data generating device 450 further includes a coefficient seed data setting section 461 and a coefficient seed memory 462. The coefficient seed data setting section 461 receives data of the normal equations from the normal equation generation section 460, and solves the normal equations using the sweep-out method or the like to determine coefficient seed data items $w_{i0}$ to $w_{i9}$ for each class. The coefficient seed memory 462 stores the coefficient seed data items $w_{i0}$ to $w_{i9}$.

The operation of the coefficient seed data generating device 450 illustrated in FIG. 22 will now be described. An HD signal (1050i signal) serving as a teacher signal is input to the input terminal 451. In the phase shift circuit 452, an oversampling filter is applied to the HD signal in the horizontal and vertical directions, and a desired phase is extracted to obtain an SD signal (525i signal). In this case, SD signals that are shifted at eight levels in the vertical direction and eight levels in the horizontal direction are sequentially generated.

In the class tap selection section 454, a plurality of pixel data items located around a position of interest in the HD signal are selectively extracted as data items of class taps from the SD signals generated by the phase shift circuit 452. The plurality of pixel data items are supplied to the spatial class detection section 456. Then, in the spatial class detection section 456, each of the pixel data items is subjected to a data compression process such as ADRC to generate a class code CLa that indicates a spatial class to which the pixel data item at the position of interest in the HD signal belongs. The class code CLa is supplied to the class integrating section 458.

Further, a motion vector MV of a pixel at a center prediction tap, which is obtained by the motion vector detection section 455, is supplied to the motion class detection section 457. In the motion class detection section 457, the magnitude of the motion vector MV is classified, and a class code CLb that indicates a motion class to which the pixel data item at the position of interest in the HD signal belongs is obtained. The class code CLb is supplied to the class integrating section 458.

In the class integrating section 458, the class codes CLa and CLb are integrated, and a class code CL that indicates a class to which the pixel data item at the position of interest in the HD signal belongs is obtained. The class code CL is supplied to the normal equation generation section 460.

In the prediction tap selection section 453, a plurality of pixel data items xi located around the position of interest in the HD signal are selectively extracted as data items of prediction taps from the SD signals generated by the phase shift circuit 452. The plurality of pixel data items xi are supplied to the normal equation generation section 460. Further, in the teacher tap selection section 459, the pixel data item at the position of interest is selectively extracted from the HD signal. The pixel data item at the position of interest (pixel data item y) is supplied to the normal equation generation section 460.

Then, in the normal equation generation section 460, normal equations (see Equation (19)) for obtaining coefficient seed data items $w_{i0}$ to $w_{i9}$ are generated for each class on the basis of pixel data items y at individual positions of interest in the HD signal, which are selectively extracted by the teacher tap selection section 459, a plurality of pixel data items xi serving as data items of prediction taps, which are selectively extracted by the prediction tap selection section 453 in correspondence with the pixel data items y at the individual positions of interest, the class code CL obtained by the class integrating section 458 in correspondence with the pixel data items y at the individual positions of interest, and the horizontal and vertical phases h and v of the pixel data items y at the individual positions of interest.

Then, in the coefficient seed data setting section 461, the normal equations are solved, and coefficient seed data items $w_{i0}$ to $w_{i9}$ are determined for each class. The coefficient seed data items $w_{i0}$ to $w_{i9}$ are stored in the coefficient seed memory 462 that is divided into addresses for individual classes.

In the coefficient seed data generating device 450 illustrated in FIG. 22, therefore, coefficient seed data items $w_{i0}$ to $w_{i9}$ for each class, which are stored in the ROM 417 in the processor main body section 402 of the zoom processing section 315 illustrated in FIG. 13, can be generated.

Next, examples of the operation of the television receiver 100 illustrated in FIG. 1 will be described.

FIRST EXAMPLE

Figure 23:
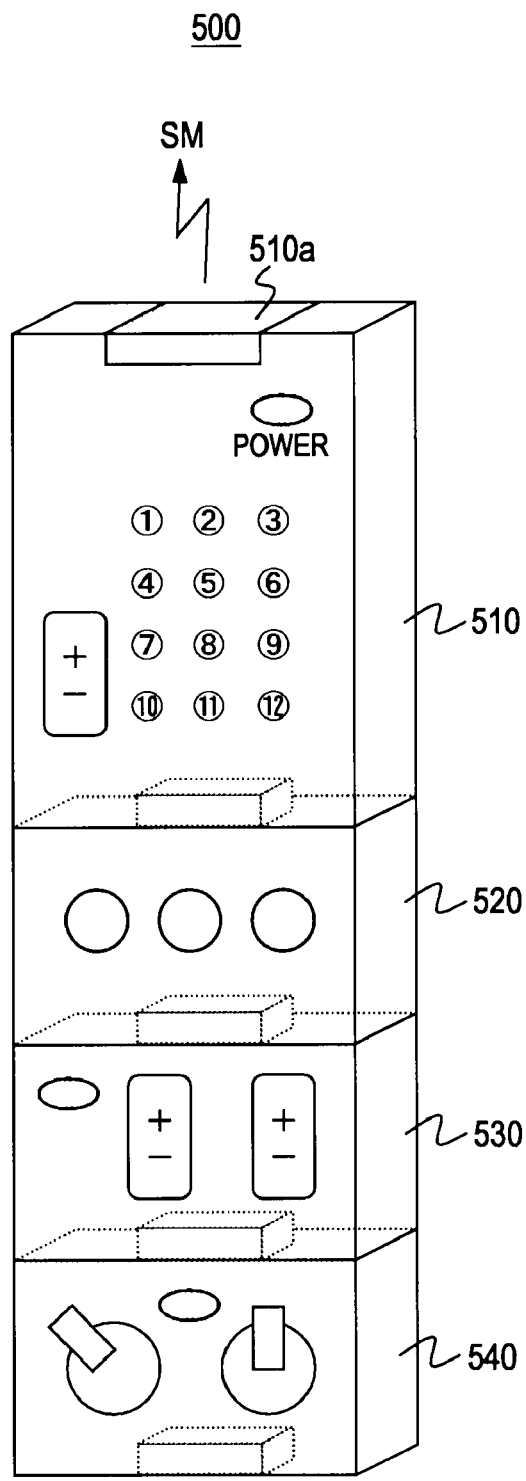
FIG. 23 is a diagram illustrating an example configuration of an assembled remote controller.

FIG. 23 illustrates the configuration of the remote controller 500 according to a first example of the present embodiment. In the first example, the remote controller 500 is configured such that the track-zoom unit 520, the resolution/noise level adjustment unit 530, and the pan-tilt-zoom unit 540 are connected to the base unit 510 in this order. In the first example, the priority rank is higher in the order of the pan-tilt-zoom unit 540, the resolution/noise level adjustment unit 530, and the track-zoom unit 520.

As described above, transmission data (see FIG. 4) included in a remote control signal SM output from the transmission section 510a of the base unit 510 when each unit of the remote controller 500 is operated includes operation data and data that indicates the connection order of the function operation units (i.e., the track-zoom unit 520, the resolution/noise level adjustment unit 530, and the pan-tilt-zoom unit 540). The data that indicates the connection order serves as priority data that indicates the priorities of the function operation units in the receiver main body section 100A.

Now, it is assumed that a pan-tilt-zoom mode has been set by pressing the push button (mode button) on the pan-tilt-zoom unit 540. A user moves the right stick (zoom stick) up and adjusts the left stick (zoom position lever), thereby displaying an object at a desired zoom position on the screen of the display section 122 in zoomed (enlarged) scale. In general, zooming results in reduced resolution, with the tendency to make noise noticeable.

Thus, the user operates the resolution/noise level adjustment unit 530 to perform the operation of improving the resolution and removing (suppressing) noise. All the above operations may be intended by the user. In the present embodiment, however, automatic adjustment of parameters is attempted.

The user, when assembling the remote controller 500, places the resolution/noise level adjustment unit 530 immediately above the pan-tilt-zoom unit 540, and the track-zoom unit 520 above the resolution/noise level adjustment unit 530 in the manner illustrated in FIG. 23. This may imply that the user probably has the highest interest in the pan-tilt-zoom operation, the second highest interest in the adjustment of the resolution and noise level, and the third highest interest in the track-zoom operation.

That is, when the user performs a pan-tilt-zoom operation using the remote controller 500 that has been assembled in the manner illustrated in FIG. 23, an output zoomed image (enlarged image) is automatically subjected to the optimum adjustment of resolution and noise level, followed by the track-zoom process, resulting in a high user satisfaction level.

The first example is an example where a user merely performs a pan-tilt-zoom operation, thereby automatically adjusting the resolution and noise level and further automatically presenting a tracking point. Specifically, when an operation is performed using the pan-tilt-zoom unit 540, the receiver main body section 100A performs processes in accordance with the priorities, starting with the pan-tilt-zoom unit 540 (the highest priority), where the resolution/noise level adjustment unit 530 connected above the pan-tilt-zoom unit 540 is regarded as the second highest priority and the track-zoom unit 520 connected above the resolution/noise level adjustment unit 530 is regarded as the next highest priority.

Figure 24:
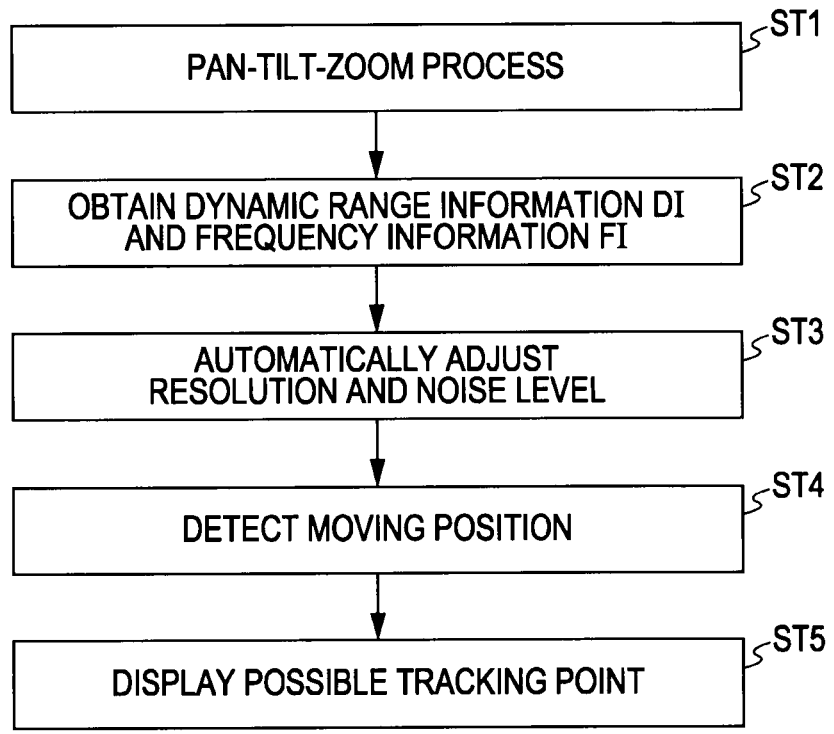
FIG. 24 is a flowchart illustrating a process procedure of the receiver main body section, in a case where the remote controller is configured such that a track-zoom unit, a resolution/noise level adjustment unit, and a pan-tilt-zoom unit are connected to a base unit in this order, when a pan-tilt-zoom operation is performed using the pan-tilt-zoom unit.

FIG. 24 is a flowchart illustrating a process procedure of the receiver main body section 100A when a pan-tilt-zoom operation is performed using the pan-tilt-zoom unit 540 in the remote controller 500 that has been assembled in the manner illustrated in FIG. 23.

First, in step ST1, the receiver main body section 100A, namely, the pan-tilt-zoom/track zoom processing section 117, performs a pan-tilt-zoom process on the basis of operation data of the pan-tilt-zoom unit 540. In this case, an SD signal processed in the pan-tilt-zoom/track zoom processing section 117 is supplied to the DRC-volume processing section 116 through the selector 115, and is converted into an HD signal. Thus, an image based on the image signal subjected to the pan-tilt-zoom process is displayed on the display section 122.

Then, in step ST2, the receiver main body section 100A, namely, the dynamic range/frequency analysis section 118, analyzes the image signal subjected to the pan-tilt-zoom process, and obtains dynamic range information DI and frequency information FI.

Then, in step ST3, the receiver main body section 100A, namely, the system controller 101, changes the image quality parameters r and z to be supplied to the DRC-volume processing section 116 on the basis of the dynamic range information DI and frequency information FI obtained in step ST2, and adjusts the resolution and noise level.

Here, the dynamic range may be an index for measurement of resolution and the frequency may be an index for measurement of noise. When the dynamic range is large, it is determined that the resolution of a displayed image is high, and the image quality parameter r is changed so as to reduce the resolution. When the dynamic range is small, it is determined that the resolution of a displayed image is low, and the image quality parameter r is changed so as to increase the resolution. Further, when the number of high-frequency components is large, it is determined that the noise level is high, and the image quality parameter z is changed so as to suppress noise. When the number of high-frequency components is small, it is determined that the noise level is low, and the image quality parameter z is changed so as not to suppress noise.

Figure 25:
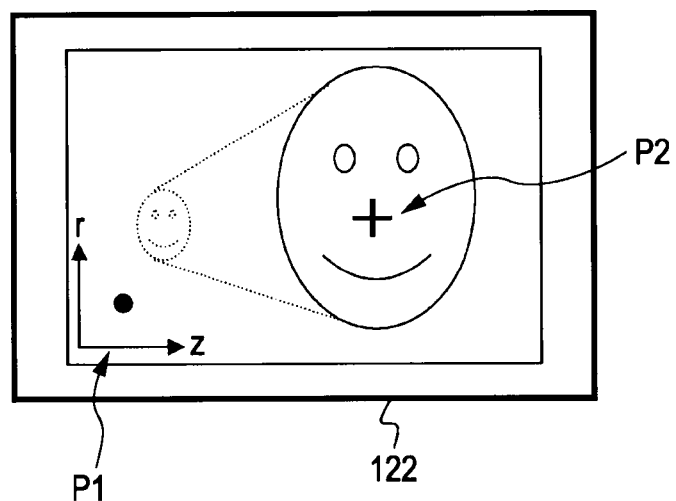
FIG. 25 is a diagram illustrating an example of display on a display section.

The image quality parameters r and z changed by the system controller 101 in the above manner are displayed so as to be superimposed on the image on the screen of the display section 122, as indicated by an arrow P1 illustrated in FIG. 25. In this case, under control of the system controller 101, a display signal SCH for displaying the image quality parameters r and z is generated from the OSD section 120. The display signal SCH is combined with (superimposed on) the image signal by the combining section 121.

Then, in step ST4, the receiver main body section 100A, namely, the moving position detection section 123, detects a moving position from the image signal subjected to the pan-tilt-zoom process, and obtains moving-position information MI. Then, in step ST5, as indicated by an arrow P2 illustrated in FIG. 25, the receiver main body section 100A displays a cursor (in FIG. 25, a plus mark (+)) indicating a possible tracking point so as to be superimposed on the image in correspondence with the moving position on the screen of the display section 122 on the basis of the moving-position information MI obtained in step ST4. In this case, under control of the system controller 101, a display signal SCH for displaying a cursor indicating a possible tracking point is generated from the OSD section 120. The display signal SCH is combined with (superimposed on) the image signal by the combining section 121.

In FIG. 25, only one possible tracking point is illustrated. However, a plurality of possible tracking points may be displayed when the moving-position information MI contains a plurality of pieces of position information. In the state where a possible tracking point or points are being displayed, for example, a user selects a desired possible tracking point using the track-zoom unit 520 and performs a tracking start operation, thereby starting tracking. In other words, the pan-tilt-zoom/track zoom processing section 117 performs a transition from the zoom process in the pan-tilt-zoom function to the track-zoom process in the track-zoom function.

Figure 26:
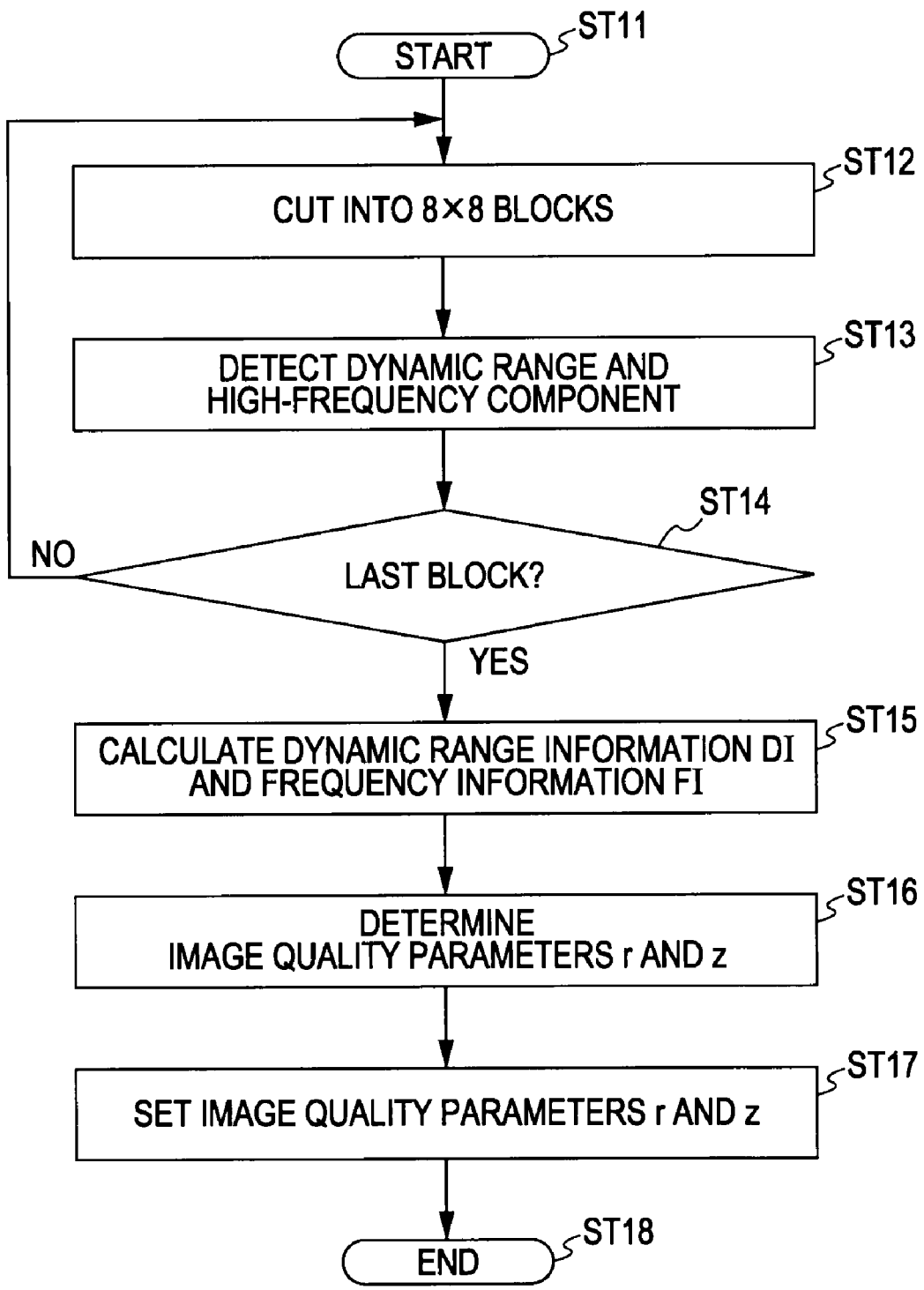
FIG. 26 is a flowchart illustrating a process procedure for obtaining dynamic range information and frequency information and automatically adjusting the resolution and noise level.

FIG. 26 is a flowchart illustrating the details of the process of steps ST2 and ST3 illustrated in the flowchart of FIG. 24.

First, in step ST11, the receiver main body section 100A starts the process, and then proceeds to step ST12. In step ST12, the receiver main body section 100A, namely, the dynamic range/frequency analysis section 118, cuts a frame image signal (luminance signal) to be detected into blocks of eight pixels by eight pixels. In this example, each block has a size of eight pixels by eight pixels. However, the block size may be changed in accordance with the calculation performance of the system.

Then, in step ST13, the receiver main body section 100A, namely, the dynamic range/frequency analysis section 118, detects a dynamic range and high-frequency components in each block, and accumulates the dynamic range and the high-frequency components in a memory. A dynamic range in a block may be, for example, the difference between a minimum value and a maximum value of pixel signals in the block. High-frequency components in a block may be, for example, 16 DCT coefficients in an area corresponding to one-quarter of the high-frequency range of the block which are obtained by performing a DCT process.

Then, in step ST14, the receiver main body section 100A determines whether or not the current block is the last block. When the current block is not the last block, the receiver main body section 100A returns to step ST12, and performs the process on a next block. When it is determined in step ST14 that the current block is the last block, the receiver main body section 100A proceeds to step ST15.

In step ST15, the receiver main body section 100A, namely, the dynamic range/frequency analysis section 118, determines dynamic range information DI and frequency information FI. In this case, the dynamic range/frequency analysis section 118 determines the average value of differences between minimum values and maximum values of pixel signals within the individual blocks accumulated in the memory, and uses the resulting value as the dynamic range information DI. Further, the dynamic range/frequency analysis section 118 sums the absolute values of 16 DCT coefficients in an area corresponding to one-quarter of the high-frequency range of each of the individual blocks accumulated in the memory, and thereafter determines the average value of the 16 sum values. The determined average value is used as the frequency information FI.

Then, in step ST16, the receiver main body section 100A, namely, the system controller 101, determines the values of the image quality parameters r and z on the basis of the dynamic range information DI and frequency information FI determined in step ST15. As described above, the image quality parameter r is a parameter for determining the resolution, and the image quality parameter z is a parameter for determining the noise removal level (noise suppression level). Here, each of the parameters r and z has a value of 0 to 1.

For example, the system controller 101 normalizes the dynamic range information DI determined in step ST15 so that the maximum value is 1, and sets the parameter r to (1−DI'), where DI' denotes the normalized value. Therefore, when the dynamic range is large, the resolution value can be set small, and when the dynamic range is small, the resolution value can be set large.

Further, for example, the system controller 101 normalizes the frequency information FI determined in step ST15 so that the maximum value is 1, and sets the parameter z to FI', where FI' denotes the normalized value. Therefore, when the amount of noise is large, the noise suppression value can be set large, and when the amount of noise is small, the noise suppression value can be set small.

Then, in step ST17, the receiver main body section 100A, namely, the system controller 101, sets the values of the image quality parameters r and z to be supplied to the DRC-volume processing section 116 to the values determined in step ST16. Then, in step ST18, the receiver main body section 100A ends the process.

In the flowchart of FIG. 24, the process of steps ST2 and ST3 is followed by the process of steps ST4 and ST5. Alternatively, for example, the process of steps ST2 and ST3 may be performed in parallel to the process of steps ST4 and ST5. In this case, the process illustrated in the flowchart of FIG. 26 is performed for every predetermined frame such as every frame or every scene change. The values of the image quality parameters r and z supplied from the system controller 101 to the DRC-volume processing section 116 are sequentially updated in accordance with the image.

Figure 27:
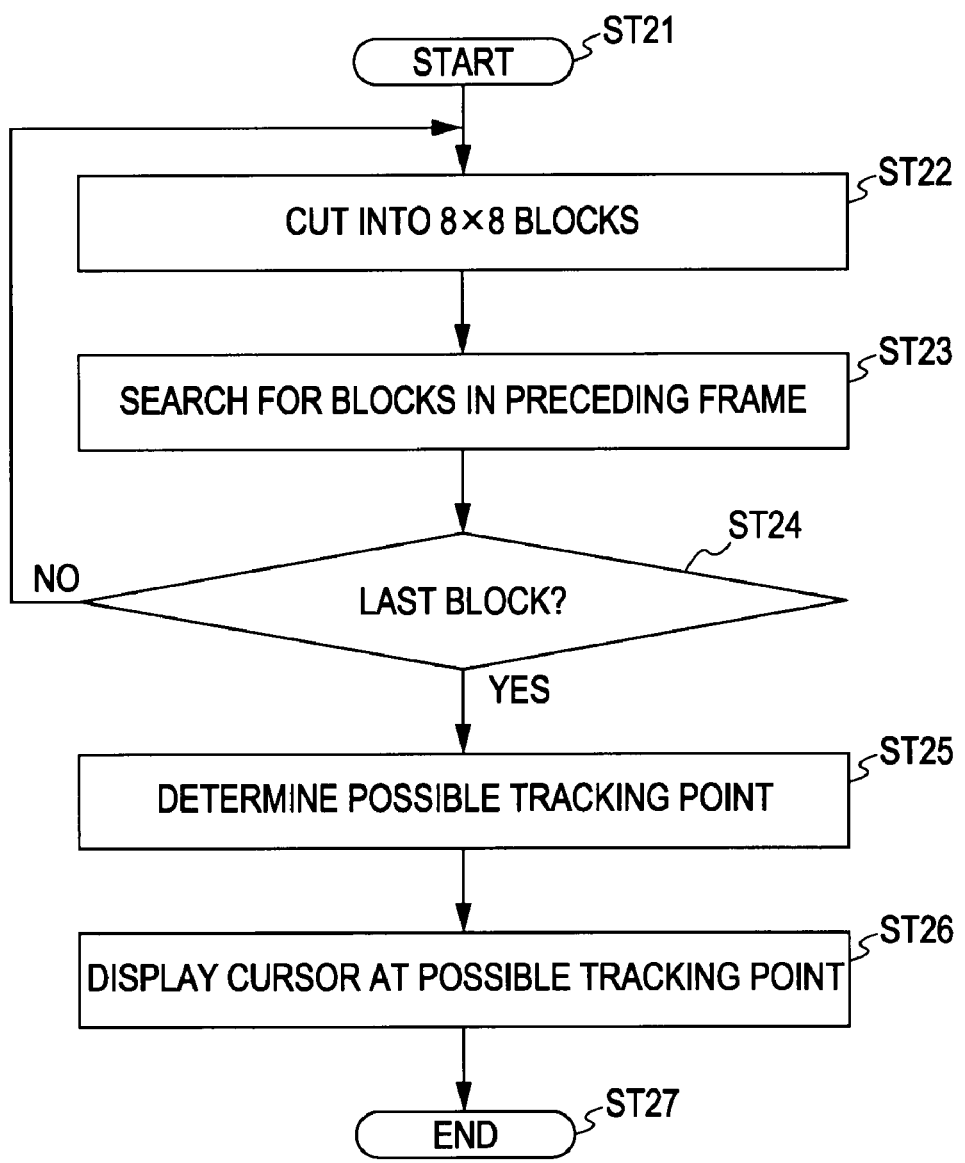
FIG. 27 is a flowchart illustrating a process procedure for detecting a moving position and displaying a possible tracking point.

FIG. 27 is a flowchart illustrating the details of the process of steps ST4 and ST5 illustrated in the flowchart of FIG. 24.

First, in step ST21, the receiver main body section 100A starts the process, and then proceeds to step ST22. In step ST22, the receiver main body section 100A, namely, the dynamic range/frequency analysis section 118, cuts a frame image signal (luminance signal) to be detected into blocks of eight pixels by eight pixels. In this example, each block has a size of eight pixels by eight pixels. However, the block size may be changed in accordance with the calculation performance of the system.

Then, in step ST23, the receiver main body section 100A, namely, the moving position detection section 123, searches for a block in the vicinity of the same portion in the preceding frame as that of each block (block of interest) cut in step ST22. A block search method such as a block difference method may be used. The moving position detection section 123 searches for several blocks in the preceding frame, which are located around the block of interest, and detects a neighboring block for which the difference is equal to or less than a threshold value and for which the difference is minimum to determine a motion vector. Then, the moving position detection section 123 accumulates the position information and motion vector of the block of interest in a memory. If there is no neighboring block for which the difference is equal to or less than the threshold value among the several found blocks in the preceding frame, which are located around the block of interest, the moving position detection section 123 sets the block of interest as invalid.

Then, in step ST24, the receiver main body section 100A determines whether or not the current block is the last block. When the current block is not the last block, the receiver main body section 100A returns to step ST22, and performs the process on a next block. When it is determined in step ST24 that the current block is the last block, the receiver main body section 100A proceeds to step ST25.

In step ST25, the receiver main body section 100A, namely, the moving position detection section 123, determines a possible tracking point from the individual blocks accumulated in the memory. In this case, the moving position detection section 123 determines, for example, the upper 10 blocks having large motion vectors as possible tracking points, and supplies moving-position information MI including position information regarding the possible tracking points to the system controller 101.

Then, in step ST26, the receiver main body section 100A, namely, the system controller 101, displays the possible tracking point so as to be superimposed on the image on the screen of the display section 122 using a cursor. In this case, the system controller 101 causes the OSD section 120 to generate a display signal SCH for displaying the possible tracking point on the basis of the moving-position information MI supplied from the moving position detection section 123, and combines the display signal SCH with (superimposes the display signal SCH on) the image signal.

After the processing of step ST26, in step ST27, the receiver main body section 100A ends the process.

As in the process illustrated in the flowchart of FIG. 26, the process illustrated in the flowchart of FIG. 27 is also performed for every predetermined frame such as every frame or every scene change. The position of a cursor indicating a possible tracking point to be displayed so as to be superimposed on the image on the screen of the display section 122 is sequentially updated.

Figure 28:
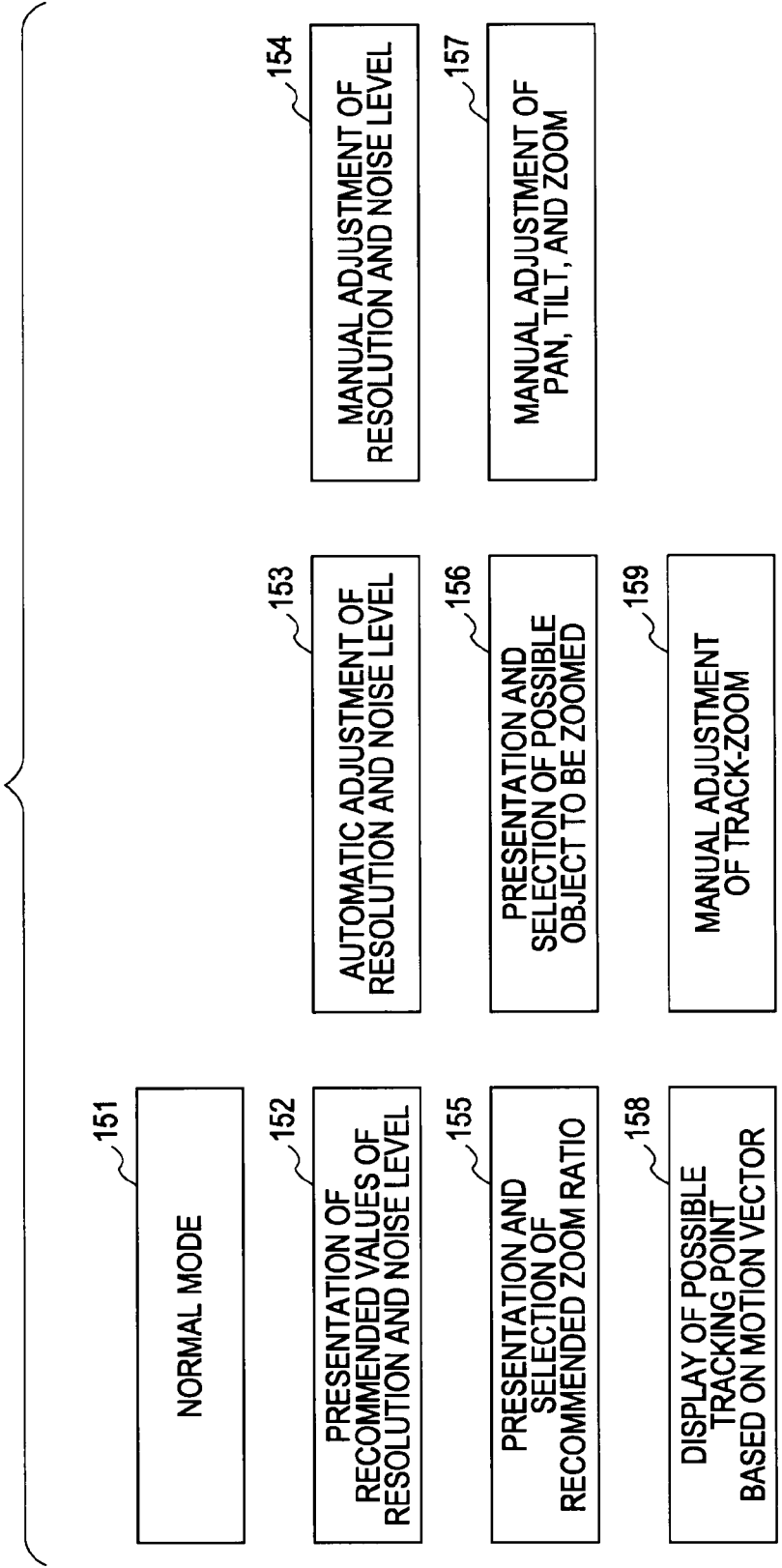
FIG. 28 is a diagram illustrating processes performed in the receiver main body section of the television receiver according to embodiments of the present invention.

FIG. 28 illustrates a list of processes performed in the first example and the following other examples. In the above case, the manual adjustment of pan, tilt, and zoom (157) is performed from the normal mode (151). Thereafter, the automatic adjustment of resolution and noise level (153) is performed, and the display of a possible tracking point based on a motion vector (158) is performed.

When the normal mode (which is a non-track-zoom/resolution and noise level adjustment/pan-tilt-zoom mode) is changed to a resolution and noise level adjustment mode, the receiver main body section 100A does not perform the priority process described above, and performs only a resolution and noise level process. Also, when the normal mode is changed to a track-zoom mode, the receiver main body section 100A performs only a track-zoom process. That is, referring to FIG. 28, the process of manual adjustment of resolution and noise level (154) is performed from the normal mode (151), or the process of manual adjustment of track-zoom (159) is performed from the normal mode (151).

Further, when the user performs a resolution and noise level adjustment operation in the pan-tilt-zoom mode, as in the normal adjustment of resolution and noise level, the receiver main body section 100A reflects the adjusted values as they are. Thereafter, the receiver main body section 100A automatically proceeds to the process of steps ST4 and ST5 illustrated in the flowchart of FIG. 24, and displays the possible tracking point. When the user performs a track-zoom operation in the pan-tilt-zoom mode, as in the normal track-zoom mode, the receiver main body section 100A displays the tracked object in the center of the screen.

SECOND EXAMPLE

Figure 29:
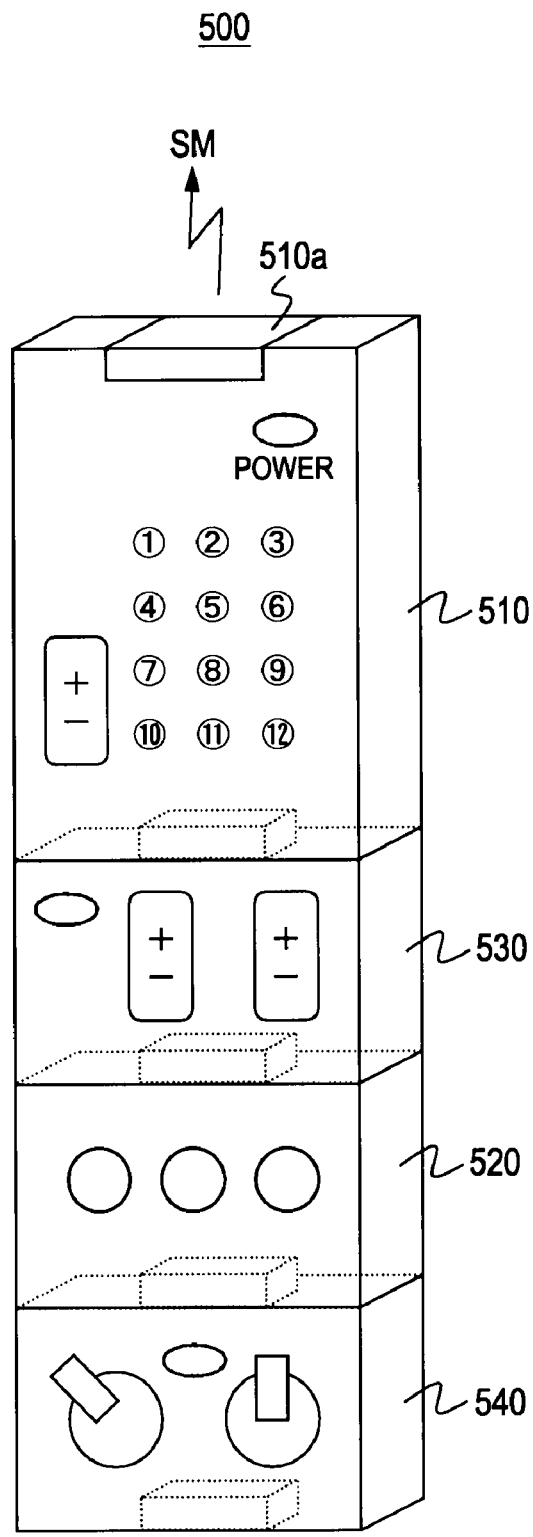
FIG. 29 is a diagram illustrating an example configuration of an assembled remote controller.

FIG. 29 illustrates the configuration of the remote controller 500 according to a second example of the present embodiment. In the second example, the remote controller 500 is configured such that the resolution/noise level adjustment unit 530, the track-zoom unit 520, and the pan-tilt-zoom unit 540 are connected to the base unit 510 in this order. In the second example, the priority rank is higher in the order of the pan-tilt-zoom unit 540, the track-zoom unit 520, and the resolution/noise level adjustment unit 530.

As described above, transmission data (see FIG. 4) included in a remote control signal SM output from the transmission section 510a of the base unit 510 when each unit of the remote controller 500 is operated includes operation data and data that indicates the connection order of the function operation units (i.e., the track-zoom unit 520, the resolution/noise level adjustment unit 530, and the pan-tilt-zoom unit 540). The data that indicates the connection order serves as priority data that indicates the priorities of the function operation units in the receiver main body section 100A.

A user, when assembling the remote controller 500, places the track-zoom unit 520 immediately above the pan-tilt-zoom unit 540, and the resolution/noise level adjustment unit 530 above the track-zoom unit 520 in the manner illustrated in FIG. 29. This may imply that the user probably has the highest interest in the pan-tilt-zoom operation, the second highest interest in the track-zoom, and the third highest interest in the adjustment of the resolution and noise level.

The second example is an example where a user merely performs a pan-tilt-zoom operation, thereby automatically presenting a possible tracking point and recommended values of the image quality parameters r and z. Specifically, when an operation is performed using the pan-tilt-zoom unit 540, the receiver main body section 100A performs processes in accordance with the priorities, starting with the pan-tilt-zoom unit 540 (the highest priority), where the track-zoom unit 520 connected above the pan-tilt-zoom unit 540 is regarded as the second highest priority and the resolution/noise level adjustment unit 530 connected above the track-zoom unit 520 is regarded as the next highest priority.

Figure 30:
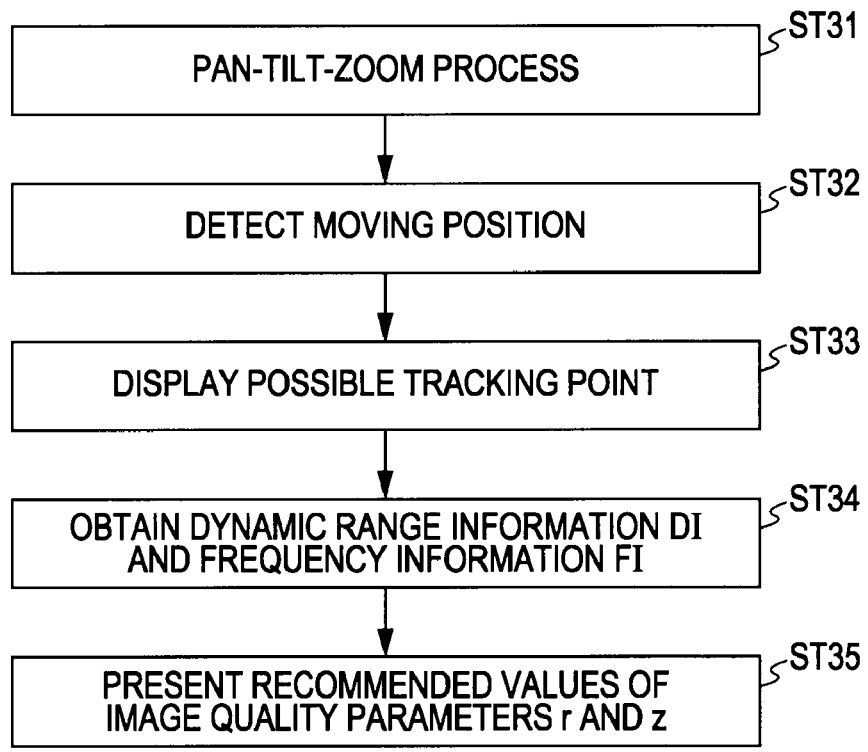
FIG. 30 is a flowchart illustrating a process procedure of the receiver main body section, in a case where the remote controller is configured such that a resolution/noise level adjustment unit, a track-zoom unit, and a pan-tilt-zoom unit are connected to a base unit in this order, when a pan-tilt-zoom operation is performed using the pan-tilt-zoom unit.

FIG. 30 is a flowchart illustrating a process procedure of the receiver main body section 100A when a pan-tilt-zoom operation is performed using the pan-tilt-zoom unit 540 in the remote controller 500 that has been assembled in the manner illustrated in FIG. 29.

First, in step ST31, the receiver main body section 100A, namely, the pan-tilt-zoom/track zoom processing section 117, performs a pan-tilt-zoom process on the basis of operation data of the pan-tilt-zoom unit 540. In this case, an SD signal processed in the pan-tilt-zoom/track zoom processing section 117 is supplied to the DRC-volume processing section 116 through the selector 115, and is converted into an HD signal. Thus, an image based on the image signal subjected to the pan-tilt-zoom process is displayed on the display section 122.

Then, in step ST32, the receiver main body section 100A, namely, the moving position detection section 123, detects a moving position from the image signal subjected to the pan-tilt-zoom process, and obtains moving-position information MI. Then, in step ST33, as indicated by an arrow P3 illustrated in FIG. 31, the receiver main body section 100A displays a cursor (in FIG. 31, a plus mark (+)) indicating a possible tracking point so as to be superimposed on the image in correspondence with the moving position on the screen of the display section 122 on the basis of the moving-position information MI obtained in step ST32. In this case, under control of the system controller 101, a display signal SCH for displaying a cursor indicating a possible tracking point is generated from the OSD section 120. The display signal SCH is combined with (superimposed on) the image signal by the combining section 121.

Figure 31:
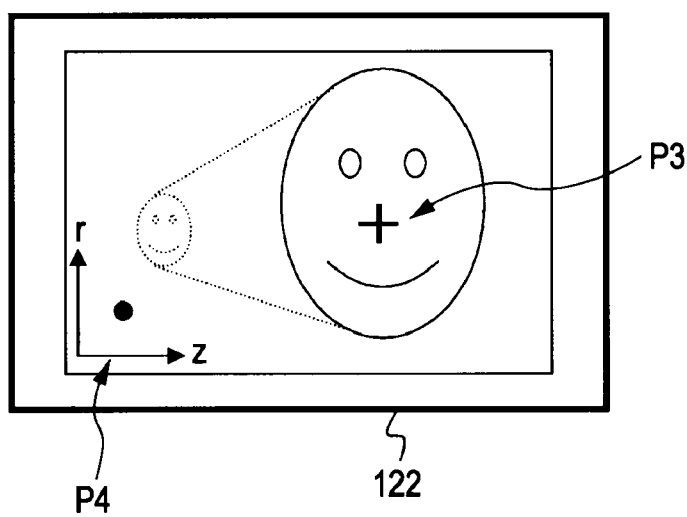
FIG. 31 is a diagram illustrating an example of display on the display section.

In FIG. 31, only one possible tracking point is illustrated. However, a plurality of possible tracking points may be displayed when the moving-position information MI contains a plurality of pieces of position information. In the state where a possible tracking point or points are being displayed, for example, a user selects a desired possible tracking point using the track-zoom unit 520 and performs a tracking start operation, thereby starting tracking. In other words, the pan-tilt-zoom/track zoom processing section 117 performs a transition from the zoom process in the pan-tilt-zoom function to the track-zoom process in the track-zoom function.

The details of the process of steps ST32 and ST33 described above are as illustrated in the flowchart of FIG. 27.

Then, in step ST34, the receiver main body section 100A, namely, the dynamic range/frequency analysis section 118, analyzes the image signal subjected to the pan-tilt-zoom process, and obtains dynamic range information DI and frequency information FI.

Then, in step ST35, the receiver main body section 100A, namely, the system controller 101, presents recommended values of the image quality parameters r and z which are supplied to the DRC-volume processing section 116 in order to adjust the resolution and noise level on the basis of the dynamic range information DI and frequency information FI obtained in step ST34.

Here, the dynamic range may be an index for measurement of resolution and the frequency may be an index for measurement of noise. When the dynamic range is large, it is determined that the resolution of a displayed image is high, and the recommended value of the image quality parameter r is determined so as to reduce the resolution. When the dynamic range is small, it is determined that the resolution of a displayed image is low, and the recommended value of the image quality parameter r is determined so as to increase the resolution. Further, when the number of high-frequency components is large, it is determined that the noise level is high, and the recommended value of the image quality parameter z is determined so as to suppress noise. When the number of high-frequency components is small, it is determined that the noise level is low, and the recommended value of the image quality parameter z is determined so as not to suppress noise.

The recommended values of the image quality parameters r and z determined by the system controller 101 in the above manner are displayed so as to be superimposed on the image on the screen of the display section 122, as indicated by an arrow P4 illustrated in FIG. 31. In this case, under control of the system controller 101, a display signal SCH for displaying the recommended values of the image quality parameters r and z is generated from the OSD section 120. The display signal SCH is combined with (superimposed on) the image signal by the combining section 121.

The details of the process of steps ST34 and ST35 described above are the same as or similar to the process illustrated in the flowchart of FIG. 26, except for the following points: The setting of the image quality parameters r and z in step ST17 is replaced by the presentation of the recommended values of the image quality parameters r and z. In the state where the recommended values of the image quality parameters r and z are being displayed, for example, a user performs an operation of adopting the recommended values of the image quality parameters r and z using the resolution/noise level adjustment unit 530, thereby allowing the system controller 101 to set the recommended values of the image quality parameters r and z in the DRC-volume processing section 116. Thus, the adjustment of the resolution and noise level is performed.

The process described above will now be described with reference to FIG. 28. The manual adjustment of pan, tilt, and zoom (157) is performed from the normal mode (151). Thereafter, the display of a possible tracking point based on a motion vector (158) is performed, and the presentation of the recommended values of resolution and noise level (152) is performed.

When the normal mode (which is a non-track-zoom/resolution and noise level adjustment/pan-tilt-zoom mode) is changed to the resolution and noise level adjustment mode, the receiver main body section 101A does not perform the priority process described above, and performs only a resolution and noise level process. Also, when the normal mode is changed to the track-zoom mode, the receiver main body section 100A performs only a track-zoom process. That is, referring to FIG. 28, the process of manual adjustment of resolution and noise level (154) is performed from the normal mode (151), or the process of manual adjustment of track-zoom (159) is executed from the normal mode (151).

Further, when the user performs a track-zoom operation in the pan-tilt-zoom mode, as in the normal track-zoom mode, the receiver main body section 100A displays the tracked object in the center of the screen in an enlarged manner. Thereafter, the receiver main body section 100A automatically proceeds to the process of steps ST34 and ST35 illustrated in the flowchart of FIG. 30, and presents the recommended values of the resolution and noise level.

Further, when the user performs a resolution and noise level adjustment operation in the pan-tilt-zoom mode, as in the normal adjustment of the resolution and noise level, the receiver main body section 100A reflects the adjusted values as they are.

THIRD EXAMPLE

Figure 32:
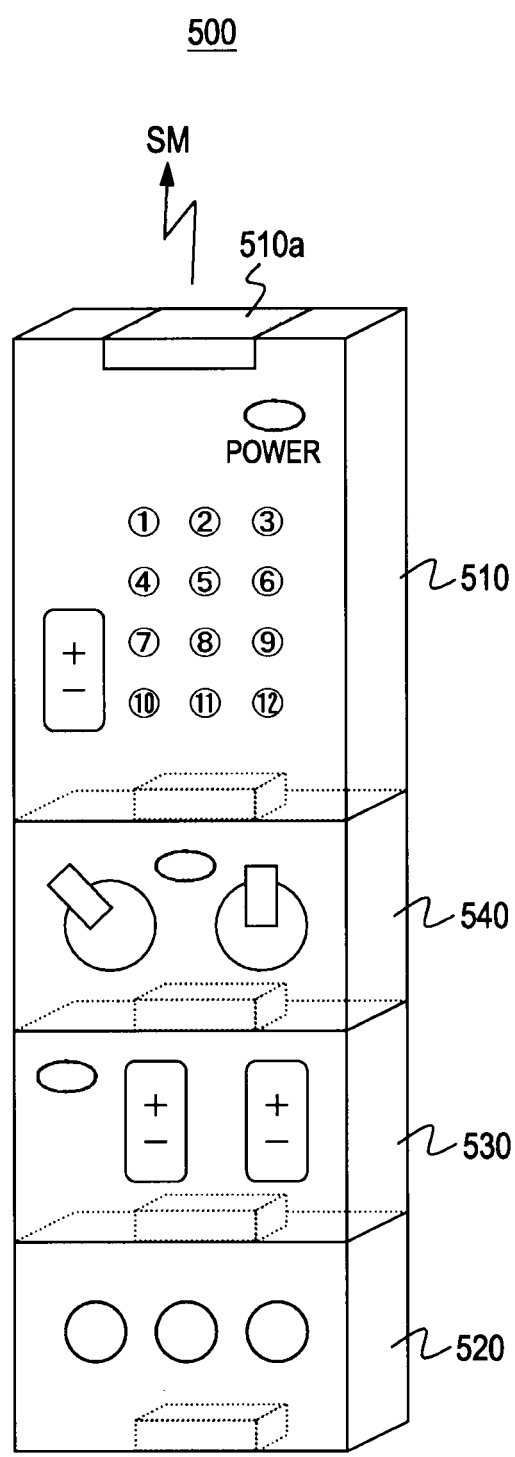
FIG. 32 is a diagram illustrating an example configuration of an assembled remote controller.

FIG. 32 illustrates the configuration of the remote controller 500 according to a third example of the present embodiment. In the third example, the remote controller 500 is configured such that the pan-tilt-zoom unit 540, the resolution/noise level adjustment unit 530, and the track-zoom unit 520 are connected to the base unit 510 in this order. In the third example, the priority rank is higher in the order of the track-zoom unit 520, the resolution/noise level adjustment unit 530, and the pan-tilt-zoom unit 540.

As described above, transmission data (see FIG. 4) included in a remote control signal SM output from the transmission section 510a of the base unit 510 when each unit of the remote controller 500 is operated includes operation data and data that indicates the connection order of the function operation units (i.e., the track-zoom unit 520, the resolution/noise level adjustment unit 530, and the pan-tilt-zoom unit 540). The data that indicates the connection order serves as priority data that indicates the priorities of the function operation units in the receiver main body section 100A.

Now, it is assumed that the track-zoom mode has been set by pressing the left button (mode button) on the track-zoom unit 520. A user specifies a predetermined point corresponding to an object to be tracked, thereby tracking the object and displaying the object on the screen of the display section 122 in zoomed (enlarged) scale. In general, track zooming results in reduced resolution, with the tendency to make noise noticeable.

Thus, the user operates the resolution/noise level adjustment unit 530 to perform the operation of improving the resolution and removing (suppressing) noise. All the above operations may be intended by the user. In the present embodiment, however, automatic adjustment of parameters is attempted.

The user, when assembling the remote controller 500, places the resolution/noise level adjustment unit 530 immediately above the track-zoom unit 520, and the pan-tilt-zoom unit 540 above the resolution/noise level adjustment unit 530 in the manner illustrated in FIG. 32. This may imply that the user probably has the highest interest in the track-zoom operation, the second highest interest in the adjustment of the resolution and noise level, and the third highest interest in the pan-tilt-zoom operation.

That is, when the user performs a track-zoom operation using the remote controller 500 that has been assembled in the manner illustrated in FIG. 32, an output zoomed image (enlarged image) is automatically subjected to the optimum adjustment of resolution and noise level, followed by the pan-tilt-zoom process, resulting in a high user satisfaction level.

The third example is an example where a user merely performs a track-zoom operation, thereby automatically adjusting the resolution and noise level and further automatically presenting a recommended zoom ratio. Specifically, when an operation is performed using the track-zoom unit 520, the receiver main body section 100A performs processes in accordance with the priorities, starting with the track-zoom unit 520 (the highest priority), where the resolution/noise level adjustment unit 530 connected above the track-zoom unit 520 is regarded as the second highest priority and the pan-tilt-zoom unit 540 connected above the resolution/noise level adjustment unit 530 is regarded as the next highest priority.

Figure 33:
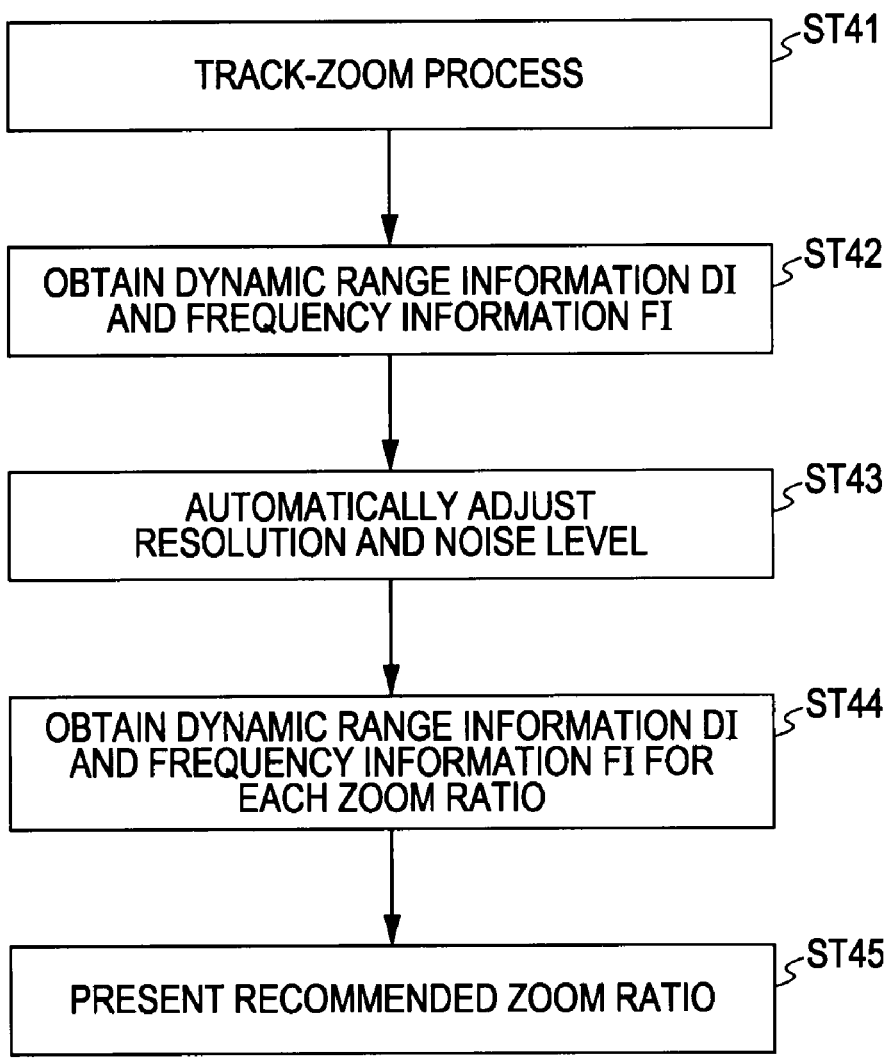
FIG. 33 is a flowchart illustrating a process procedure of the receiver main body section, in a case where the remote controller is configured such that a pan-tilt-zoom unit, a resolution/noise level adjustment unit, and a track-zoom unit are connected to a base unit in this order, when a track-zoom operation is performed using the track-zoom unit.

FIG. 33 is a flowchart illustrating a process procedure of the receiver main body section 100A when a track-zoom operation is performed using the track-zoom unit 520 in the remote controller 500 that has been assembled in the manner illustrated in FIG. 32.

First, in step ST41, the receiver main body section 100A, namely, the pan-tilt-zoom/track zoom processing section 117, performs a track-zoom process on the basis of operation data of the track-zoom unit 520. In this case, an SD signal processed in the pan-tilt-zoom/track zoom processing section 117 is supplied to the DRC-volume processing section 116 through the selector 115, and is converted into an HD signal. Thus, as indicated by an arrow P5 illustrated in FIG. 34A, an object being tracked is displayed all the time in the center of the display section 122.

Then, in step ST42, the receiver main body section 100A, namely, the dynamic range/frequency analysis section 118, analyzes the image signal subjected to the track-zoom process, and obtains dynamic range information DI and frequency information FI.

Then, in step ST43, the receiver main body section 100A, namely, the system controller 101, changes the image quality parameters r and z to be supplied to the DRC-volume processing section 116 on the basis of the dynamic range information DI and frequency information FI obtained in step ST42, and adjusts the resolution and noise level.

Here, the dynamic range may be an index for measurement of resolution and the frequency may be an index for measurement of noise. When the dynamic range is large, it is determined that the resolution of a displayed image is high, and the image quality parameter r is changed so as to reduce the resolution. When the dynamic range is small, it is determined that the resolution of a displayed image is low, and the image quality parameter r is changed so as to increase the resolution. Further, when the number of high-frequency components is large, it is determined that the noise level is high, and the image quality parameter z is changed so as to suppress noise. When the number of high-frequency components is small, it is determined that the noise level is low, and the image quality parameter z is changed so as not to suppress noise.

Figure 34A:
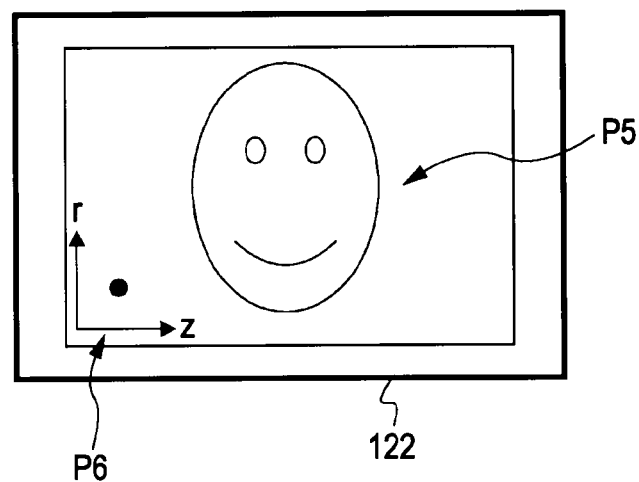
FIGS. 34A to 34C are diagrams illustrating an example of display on the display section.

The image quality parameters r and z changed by the system controller 101 in the above manner are displayed so as to be superimposed on the image on the screen of the display section 122, as indicated by an arrow P6 illustrated in FIG. 34A. In this case, under control of the system controller 101, a display signal SCH for displaying the image quality parameters r and z is generated from the OSD section 120. The display signal SCH is combined with (superimposed on) the image signal by the combining section 121.

The details of the process of steps ST42 and ST43 described above are as illustrated in the flowchart of FIG. 26.

Then, in step ST44, the receiver main body section 100A, namely, the dynamic range/frequency analysis section 118, obtains dynamic range information DI and frequency information FI for each zoom ratio. In this case, the dynamic range/frequency analysis section 118 receives an image signal processed with a plurality of zoom ratios from the pan-tilt-zoom/track zoom processing section 117, and performs an analysis process.

Figure 34B:
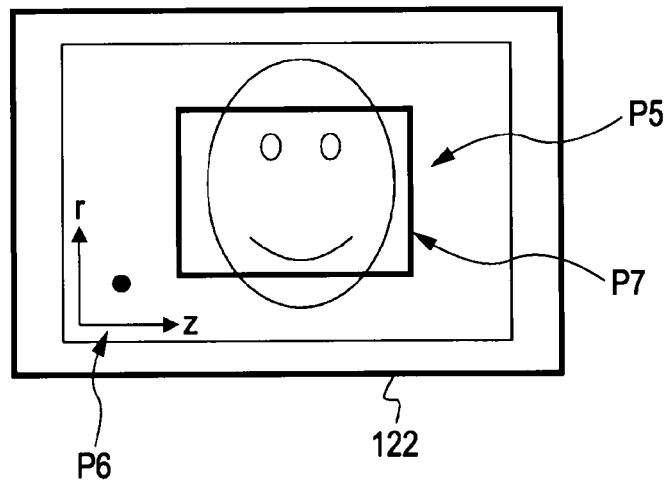

Then, in step ST45, the receiver main body section 100A, namely, the system controller 101, determines a recommended zoom ratio on the basis of the analysis process results obtained in step ST44, and presents the recommended zoom ratio. In this case, for example, the highest zoom ratio is selected from among zoom ratios satisfying the conditions that the dynamic range information DI is equal to or greater than a threshold value and that the frequency information FI is equal to or less than a threshold value, and is set as the recommended zoom ratio. The presentation of the recommended zoom ratio may be performed by, for example, as indicated by an arrow P7 illustrated in FIG. 34B, displaying a zoom frame corresponding to the recommended zoom ratio on the object being tracked. In this case, under control of the system controller 101, a display signal SCH for displaying a zoom frame is generated from the OSD section 120. The display signal SCH is combined with (superimposed on) the image signal by the combining section 121.

Figure 34C:
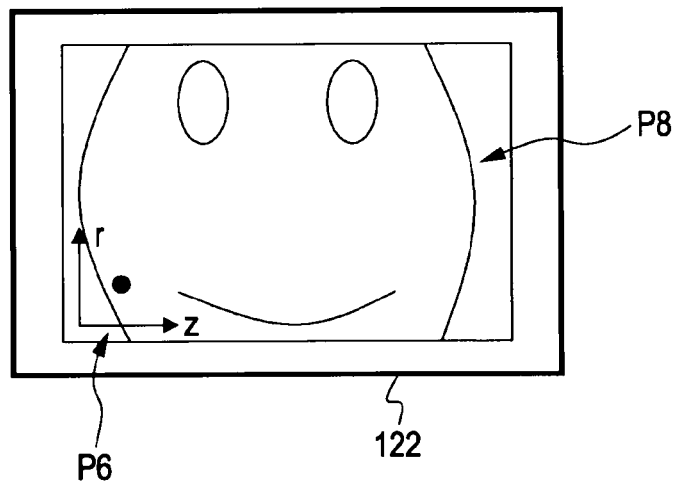

In this state, a user selects the recommended zoom ratio to be adopted, thereby changing the zoom ratio information MGI given from the system controller 101 to the pan-tilt-zoom/track zoom processing section 117 so that the recommended zoom ratio can be designated. Accordingly, as indicated by an arrow P8 illustrated in FIG. 34C, an image within the zoom frame corresponding to the recommended zoom ratio is displayed in enlarged scale on the display section 122 in a full-screen fashion.

Figure 35:
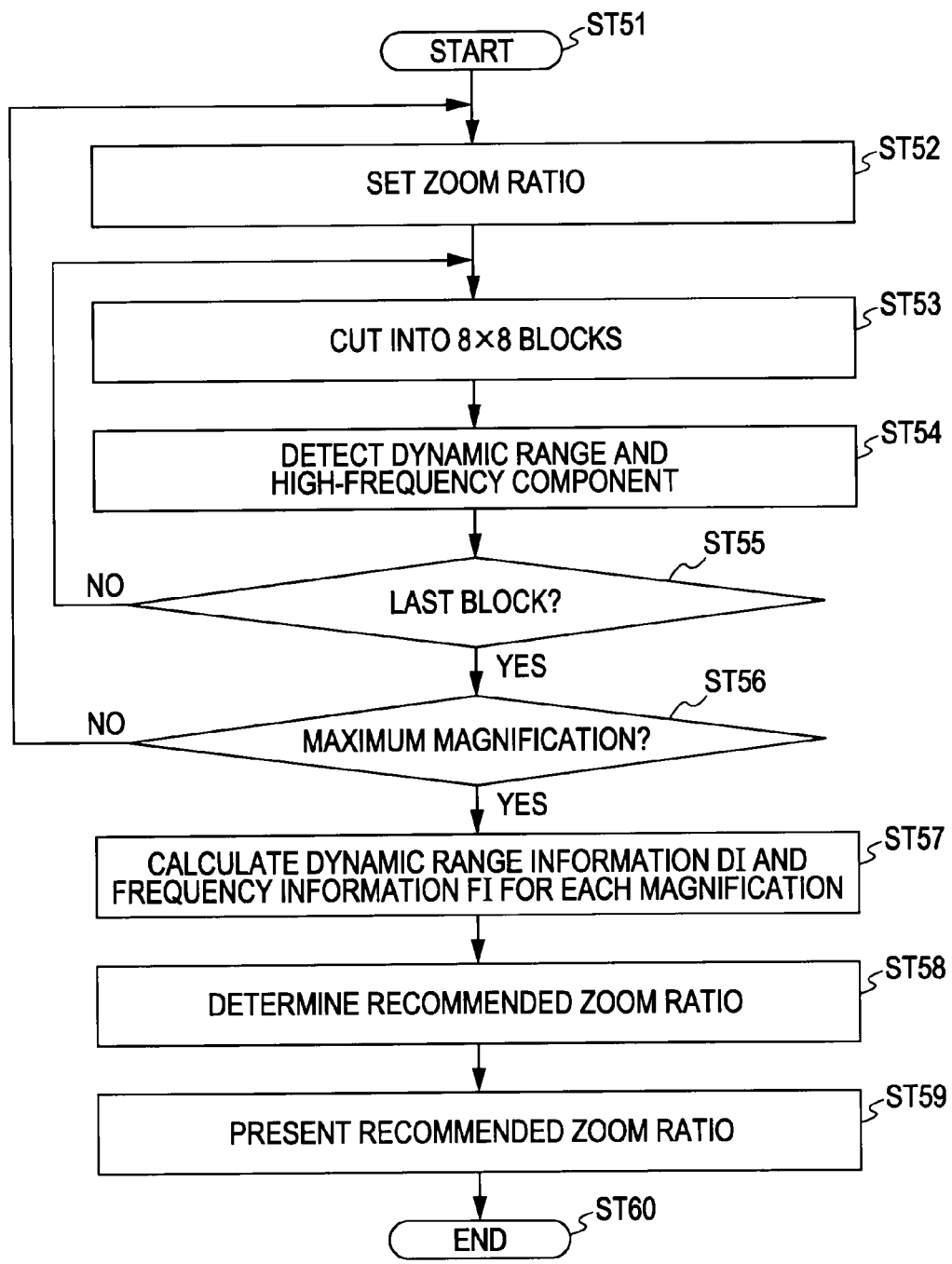
FIG. 35 is a flowchart illustrating a process procedure for obtaining dynamic range information and frequency information for each zoom ratio and presenting a recommended zoom ratio.

FIG. 35 is a flowchart illustrating the details of the process of steps ST44 and ST45 illustrated in the flowchart of FIG. 33.

First, in step ST51, the receiver main body section 100A starts the process, and then proceeds to step ST52. In step ST52, the receiver main body section 100A, namely, the system controller 101, sets a zoom ratio relative to the size of the image subjected to the track-zoom process. Initially, the minimum zoom ratio (zoom ratio of 1, which means the same size) among a plurality of zoom ratios defined in steps of 0.1× is set.

In step ST53, the receiver main body section 100A, namely, the dynamic range/frequency analysis section 118, cuts a frame image signal (luminance signal) to be detected into blocks of eight pixels by eight pixels. In this example, each block has a size of eight pixels by eight pixels. However, the block size may be changed in accordance with the calculation performance of the system.

Then, in step ST54, the receiver main body section 100A, namely, the dynamic range/frequency analysis section 118, detects a dynamic range and high-frequency components in each block, and accumulates the dynamic range and the high-frequency components in a memory. A dynamic range in a block may be, for example, the difference between a minimum value and a maximum value of pixel signals in the block. High-frequency components in a block may be, for example, 16 DCT coefficients in an area corresponding to one-quarter of the high-frequency range of the block which are obtained by performing a DCT process.

Then, in step ST55, the receiver main body section 100A determines whether or not the current block is the last block. When the current block is not the last block, the receiver main body section 100A returns to step ST53, and performs the process on a next block. When it is determined in step ST55 that the current block is the last block, the receiver main body section 100A proceeds to step ST56.

In step ST56, the receiver main body section 100A determines whether or not the current zoom ratio is the maximum magnification (for example, 3×). When the current zoom ratio is not the maximum magnification, the receiver main body section 100A returns to step ST52, and the system controller 101 increases the magnification by 0.1 to set a next zoom ratio. Then, the process similar to that described above is performed.

When it is determined in step ST56 that the current zoom ratio is the maximum magnification, the receiver main body section 100A proceeds to step ST57. In step ST57, the receiver main body section 100A, namely, the dynamic range/frequency analysis section 118, determines dynamic range information DI and frequency information FI for each magnification. In this case, the dynamic range/frequency analysis section 118 determines, for each of the defined magnifications, the average value of differences between minimum values and maximum values of pixel signals within the individual blocks accumulated in the memory, and uses the resulting value as the dynamic range information DI. Further, the dynamic range/frequency analysis section 118 sums, for each magnification, the absolute values of 16 DCT coefficients in an area corresponding to one-quarter of the high-frequency range of each of the individual blocks accumulated in the memory, and thereafter determines the average value of the 16 sum values. The determined average value is used as the frequency information FI.

Then, in step ST58, the receiver main body section 100A, namely, the system controller 101, determines a recommended zoom magnification on the basis of the dynamic range information DI and frequency information FI determined for each magnification in step ST57. In this case, for example, the system controller 101 selects the highest zoom ratio from among zoom ratios satisfying the conditions that the dynamic range information DI is equal to or greater than a threshold value and that the frequency information FI is equal to or less than a threshold value, and determines the selected zoom ratio as the recommended zoom ratio.

Then, in step ST59, the receiver main body section 100A presents the recommended zoom ratio determined in step ST58 to the user. In this case, the system controller 101 causes the OSD section 120 to generate a display signal SCH for displaying a zoom frame corresponding to the recommended zoom ratio, and combines the display signal SCH with (superimposes the display signal SCH on) the image signal using the combining section 121.

After the processing of step ST59, in step ST60, the receiver main body section 100A ends the process.

In the flowchart of FIG. 33, the process of steps ST42 and ST43 is followed by the process of steps ST44 and ST45. Alternatively, for example, the process of steps ST42 and ST43 may be performed in parallel to the process of steps ST44 and ST45.

In this case, the process illustrated in the flowchart of FIG. 26 is performed for every predetermined frame such as every frame or every scene change. The values of the image quality parameters r and z supplied from the system controller 101 to the DRC-volume processing section 116 are sequentially updated in accordance with the image.

The process described above will now be described with reference to FIG. 28. The manual adjustment of track-zoom (159) is performed from the normal mode (151). Thereafter, the automatic adjustment of resolution and noise level (153) is performed, and the presentation and selection of a recommended zoom ratio (155) is executed.

When the normal mode (which is a non-track-zoom/resolution and noise level adjustment/pan-tilt-zoom mode) is changed to the resolution and noise level adjustment mode, the receiver main body section 100A does not perform the priority process described above, and performs only a resolution and noise level adjustment process. Also, when the normal mode is changed to the pan-tilt-zoom mode, the receiver main body section 100A performs only a pan-tilt-zoom process. That is, referring to FIG. 28, the process of manual adjustment of resolution and noise level (154) is performed from the normal mode (151), or the process of manual adjustment of pan, tilt, and zoom (157) is executed from the normal mode (151).

Further, when the user performs a pan-tilt-zoom operation in the track-zoom mode, the receiver main body section 100A changes an image to be displayed on the display section 122 in accordance with the operation of the user, and reflects an operating value as it is. That is, referring to FIG. 28, the process of manual adjustment of pan, tilt, and zoom (157) is executed during the manual adjustment of track-zoom (159).

Further, when the user performs a resolution and noise level adjustment operation in the track-zoom mode, the receiver main body section 100A thereafter automatically proceeds to the process of steps ST44 and ST45 illustrated in the flowchart of FIG. 33, and presents the recommended zoom ratio. That is, referring to FIG. 28, the manual adjustment of resolution and noise level (154) is performed during the manual adjustment of track-zoom (159). Thereafter, the presentation and selection of the recommended zoom ratio (155) is performed.

FOURTH EXAMPLE

Figure 36:
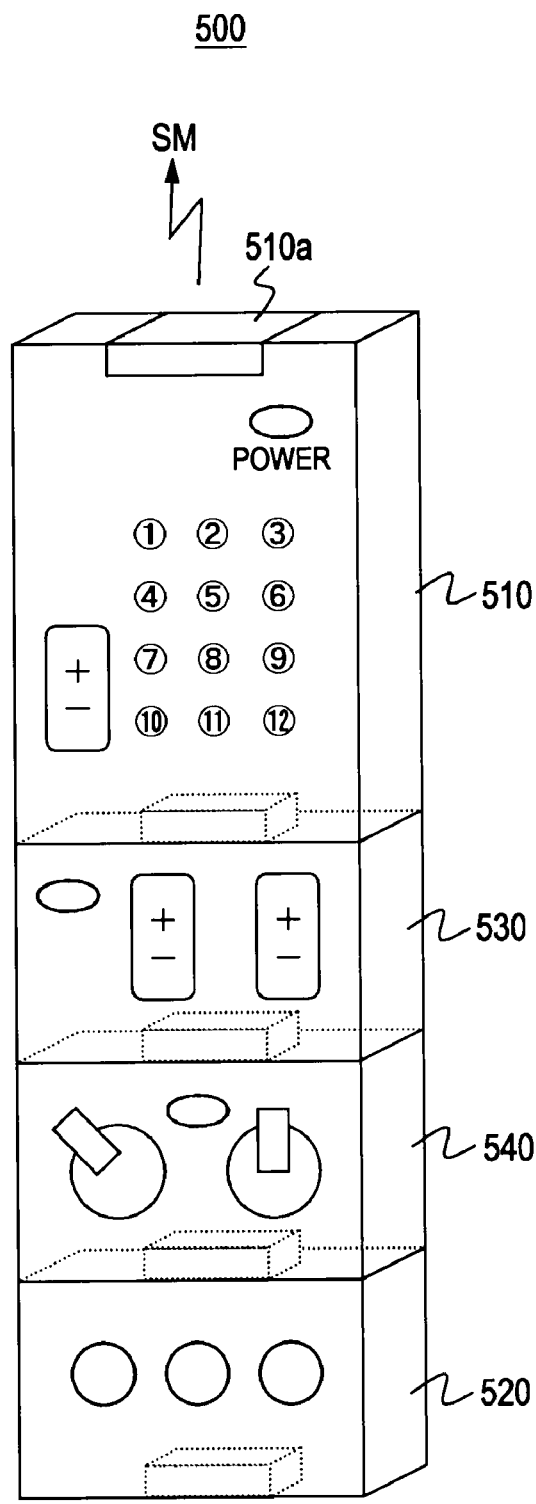
FIG. 36 is a diagram illustrating an example configuration of anassembled remote controller.

FIG. 36 illustrates the configuration of the remote controller 500 according to a fourth example of the present embodiment. In the fourth example, the remote controller 500 is configured such that the resolution/noise level adjustment unit 530, the pan-tilt-zoom unit 540, and the track-zoom unit 520 are connected to the base unit 510 in this order. In the fourth example, the priority rank is higher in the order of the track-zoom unit 520, the pan-tilt-zoom unit 540, and the resolution/noise level adjustment unit 530.

As described above, transmission data (see FIG. 4) included in a remote control signal SM output from the transmission section 510a of the base unit 510 when each unit of the remote controller 500 is operated includes operation data and data that indicates the connection order of the function operation units (i.e., the track-zoom unit 520, the resolution/noise level adjustment unit 530, and the pan-tilt-zoom unit 540). The data that indicates the connection order serves as priority data that indicates the priorities of the function operation units in the receiver main body section 100A.

A user, when assembling the remote controller 500, places the pan-tilt-zoom unit 540 immediately above the track-zoom unit 520, and the resolution/noise level adjustment unit 530 above the pan-tilt-zoom unit 540 in the manner illustrated in FIG. 36. This may imply that the user probably has the highest interest in the track-zoom operation, the second highest interest in the pan-tilt-zoom operation, and the third highest interest in the adjustment of the resolution and noise level.

The fourth example is an example where a user merely performs a track-zoom operation, thereby automatically presenting a possible object to be zoomed and further automatically presenting recommended values of the image quality parameters r and z. Specifically, when an operation is performed using the track-zoom unit 520, the receiver main body section 100A performs processes in accordance with the priorities, starting with the track-zoom unit 520 (the highest priority), where the pan-tilt-zoom unit 540 connected above the track-zoom unit 520 is regarded as the second highest priority and the resolution/noise level adjustment unit 530 connected above the pan-tilt-zoom unit 540 is regarded as the next highest priority.

Figure 37:
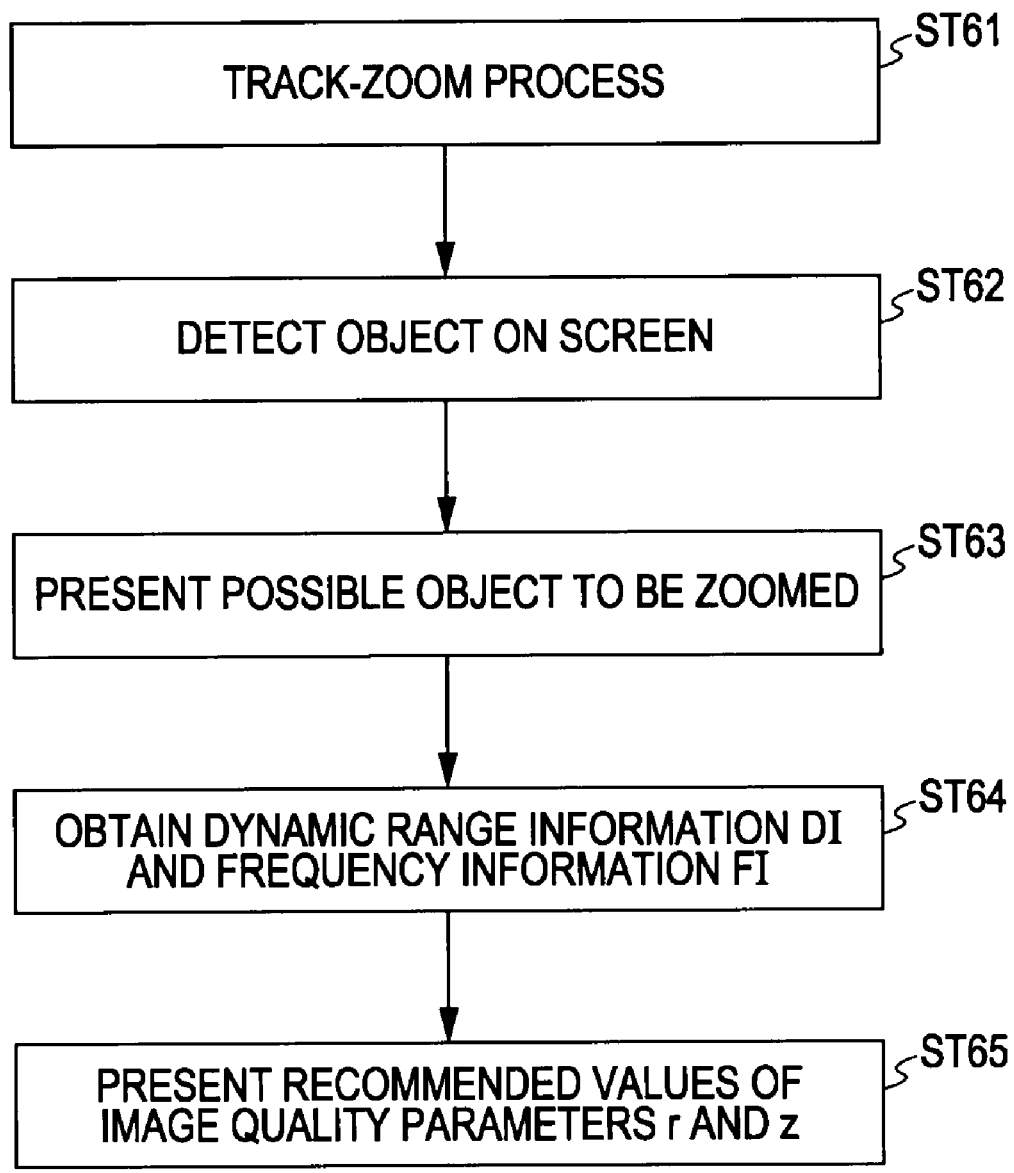
FIG. 37 is a flowchart illustrating a process procedure of the receiver main body section, in a case where the remote controller is configured such that a resolution/noise level adjustment unit, a pan-tilt-zoom unit, and a track-zoom unit are connected to a base unit in this order, when a track-zoom operation is performed using the track-zoom unit.

FIG. 37 is a flowchart illustrating a process procedure of the receiver main body section 100A when a track-zoom operation is performed using the track-zoom unit 520 in the remote controller 500 that has been assembled in the manner illustrated in FIG. 36.

First, in step ST61, the receiver main body section 100A, namely, the pan-tilt-zoom/track zoom processing section 117, performs a track-zoom process on the basis of operation data of the track-zoom unit 520. In this case, an SD signal processed in the pan-tilt-zoom/track zoom processing section 117 is supplied to the DRC-volume processing section 116 through the selector 115, and is converted into an HD signal. Thus, as indicated by an arrow P9 illustrated in FIG. 38A, an object being tracked is displayed all the time in the center of the display section 122.

Then, in step ST62, the receiver main body section 100A, namely, the object detection section 119, detects an object included in an image on the basis of the image signal subjected to the track-zoom process, and obtains object information OI. In this case, for example, the object detection section 119 determines adjacent pixel differences in a frame image signal to detect a contour on the screen, thereby detecting an object included in the image.

Then, in step ST63, the receiver main body section 100A presents a possible object to be zoomed on the basis of the object information OI obtained in step ST62. The presentation of a possible object to be zoomed is performed by, for example, as indicated by an arrow P10 illustrated in FIG. 38A, displaying an zoom frame including the detected object on the image. In this case, under control of the system controller 101, a display signal SCH for displaying a zoom frame showing a possible object to be zoomed is generated from the OSD section 120. The display signal SCH is combined with (superimposed on) the image signal by the combining section 121.

Figure 38A:
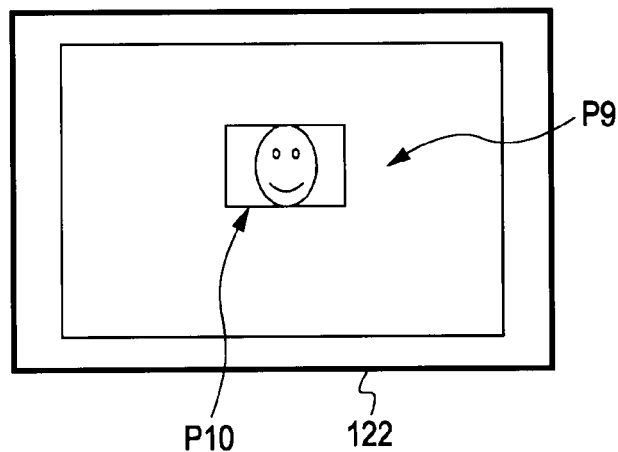
FIGS. 38A to 38C are diagrams illustrating an example of display on the display section.

In FIG. 38A, only one possible object to be zoomed is illustrated. However, a plurality of possible objects to be zoomed (zoom frames) may be displayed when the object information OI obtained in step ST62 contains a plurality of pieces of object information.

Figure 38B:
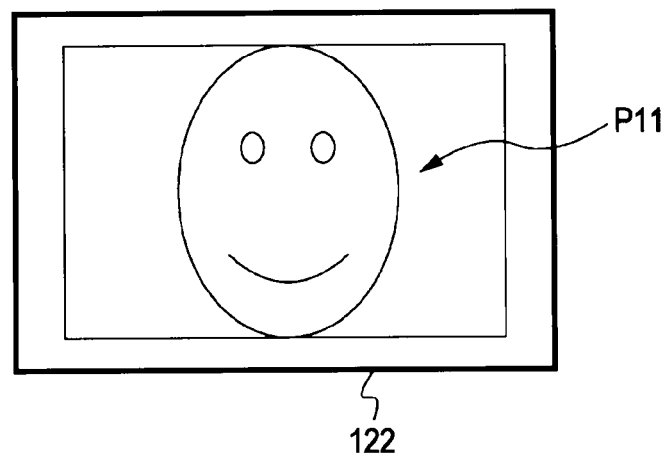

In the state where a possible object or objects to be zoomed are being displayed, for example, a user selects a predetermined possible object to be zoomed using the pan-tilt-zoom unit 540, thereby, as indicated by an arrow P11 illustrated in FIG. 38B, displaying the selected possible object to be zoomed in large scale on the display section 122 in a full-screen fashion.

Then, in step ST64, the receiver main body section 100A, namely, the dynamic range/frequency analysis section 118, analyzes the image signal subjected to the track-zoom process, and obtains dynamic range information DI and frequency information FI.

Then, in step ST65, the receiver main body section 100A, namely, the system controller 101, presents recommended values of the image quality parameters r and z which are supplied to the DRC-volume processing section 116 in order to adjust the resolution and noise level on the basis of the dynamic range information DI and frequency information FI obtained in step ST64.

Here, the dynamic range may be an index for measurement of resolution and the frequency may be an index for measurement of noise. When the dynamic range is large, it is determined that the resolution of a displayed image is high, and the recommended value of the image quality parameter r is determined so as to reduce the resolution. When the dynamic range is small, it is determined that the resolution of a displayed image is low, and the recommended value of the image quality parameter r is determined so as to increase the resolution. Further, when the number of high-frequency components is large, it is determined that the noise level is high, and the recommended value of the image quality parameter z is determined so as to suppress noise. When the number of high-frequency components is small, it is determined that the noise level is low, and the recommended value of the image quality parameter z is determined so as not to suppress noise.

Figure 38C:
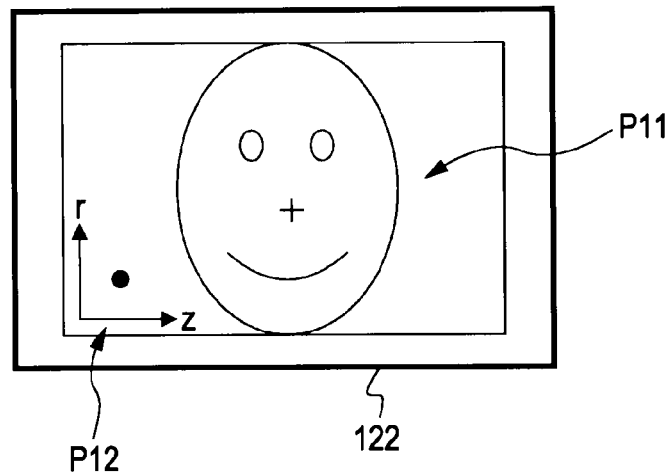

The recommended values of the image quality parameters r and z determined by the system controller 101 in the above manner are displayed so as to be superimposed on the image on the screen of the display section 122, as indicated by an arrow P12 illustrated in FIG. 38C. In this case, under control of the system controller 101, a display signal SCH for displaying the recommended values of the image quality parameters r and z is generated from the OSD section 120. The display signal SCH is combined with (superimposed on) the image signal by the combining section 121.

The details of the process of steps ST64 and ST65 described above are the same as or similar to the process illustrated in the flowchart of FIG. 26, except for the following points: The setting of the image quality parameters r and z in step ST17 is replaced by the presentation of the recommended values of the image quality parameters r and z. In the state where the recommended values of the image quality parameters r and z are being displayed, for example, a user performs an operation of adopting the recommended values of the image quality parameters r and z using the resolution/noise level adjustment unit 530, thereby allowing the system controller 101 to set the recommended values of the image quality parameters r and z in the DRC-volume processing section 116. Thus, the adjustment of the resolution and noise level is performed.

FIG. 39 is a flowchart illustrating the details of the process of steps ST62 and ST63 illustrated in the flowchart of FIG. 37.

First, in step ST71, the receiver main body section 100A starts the process, and then proceeds to step ST72. In step ST72, the receiver main body section 100A, namely, the object detection section 119, determines adjacent pixel differences in a frame image signal to detect a contour on the screen, thereby detecting objects included in an image. Then, in step ST73, the receiver main body section 100A, namely, the object detection section 119, calculates the sizes of the objects detected in step ST72.

Then, in step ST74, the receiver main body section 100A, namely, the object detection section 119, determines a predetermined number of objects, starting with the object having the largest size, among the objects detected in step ST72 as possible objects to be zoomed, and obtains object information OI.

Then, in step ST75, the receiver main body section 100A presents the possible objects to be zoomed determined in step ST74. In this case, the system controller 101 causes the OSD section 120 to generate a display signal SCH for displaying zoom frames including the possible objects to be zoomed, and combines the display signal SCH with (superimposes the display signal SCH on) the image signal using the combining section 121.

After the processing of step ST75, in step ST76, the receiver main body section 100A ends the process.

The process described above will now be described with reference to FIG. 28. The manual adjustment of track-zoom (159) is performed from the normal mode (151). Thereafter, the presentation and selection of possible objects to be zoomed (156) is performed, and the presentation of recommended values of resolution and noise level (152) is performed.

When the normal mode (which is a non-track-zoom/resolution and noise level adjustment/pan-tilt-zoom mode) is changed to the resolution and noise level adjustment mode, the receiver main body section 100A does not perform the priority process described above, and performs only a resolution and noise level adjustment process. Also, when the normal mode is changed to the pan-tilt-zoom mode, the receiver main body section 100A performs only a pan-tilt-zoom process. That is, referring to FIG. 28, the process of manual adjustment of resolution and noise level (154) is executed from the normal mode (151), or the process of manual adjustment of pan, tilt, and zoom (157) is performed from the normal mode (151).

Further, when the user performs a pan-tilt-zoom operation in the track-zoom mode, the receiver main body section 100A changes an image to be displayed on the display section 122 in accordance with the operation of the user, and reflects an operating value as it is. That is, referring to FIG. 28, the process of manual adjustment of pan, tilt, and zoom (157) is executed during the manual adjustment of track-zoom (159).

In this case, the receiver main body section 100A is in a state where a new object that is located in the center is tracked. Thereafter, the receiver main body section 100A further performs the process of steps ST64 and ST65 illustrated in the flowchart of FIG. 37 to set optimum image quality parameters r and z for the screen changed in the pan-tilt-zoom process. That is, referring to FIG. 28, when the manual adjustment of pan, tilt, and zoom (157) is executed during the manual adjustment of track-zoom (159), the object located in the center of the screen is tracked, and the automatic adjustment of resolution and noise level (153) is further performed.

Further, when the user changes the image quality parameters r and z in the track-zoom mode, the receiver main body section 100A reflects the operating values as they are. That is, referring to FIG. 28, the process of the manual adjustment of resolution and noise level (154) is performed during the manual adjustment of track-zoom (159).

FIFTH EXAMPLE

In the first to fourth examples described above, the remote controller 500 is constructed using the base unit 510 and three function operation units (i.e., the track-zoom unit 520, the resolution/noise level adjustment unit 530, and the pan-tilt-zoom unit 540). Alternatively, the remote controller 500 may be constructed using the base unit 510 and two function operation units (i.e., two of the track-zoom unit 520, the resolution/noise level adjustment unit 530, and the pan-tilt-zoom unit 540). A fifth example of the present embodiment is an example where the remote controller 500 is constructed using the base unit 510 and two function operation units.

Figure 40:
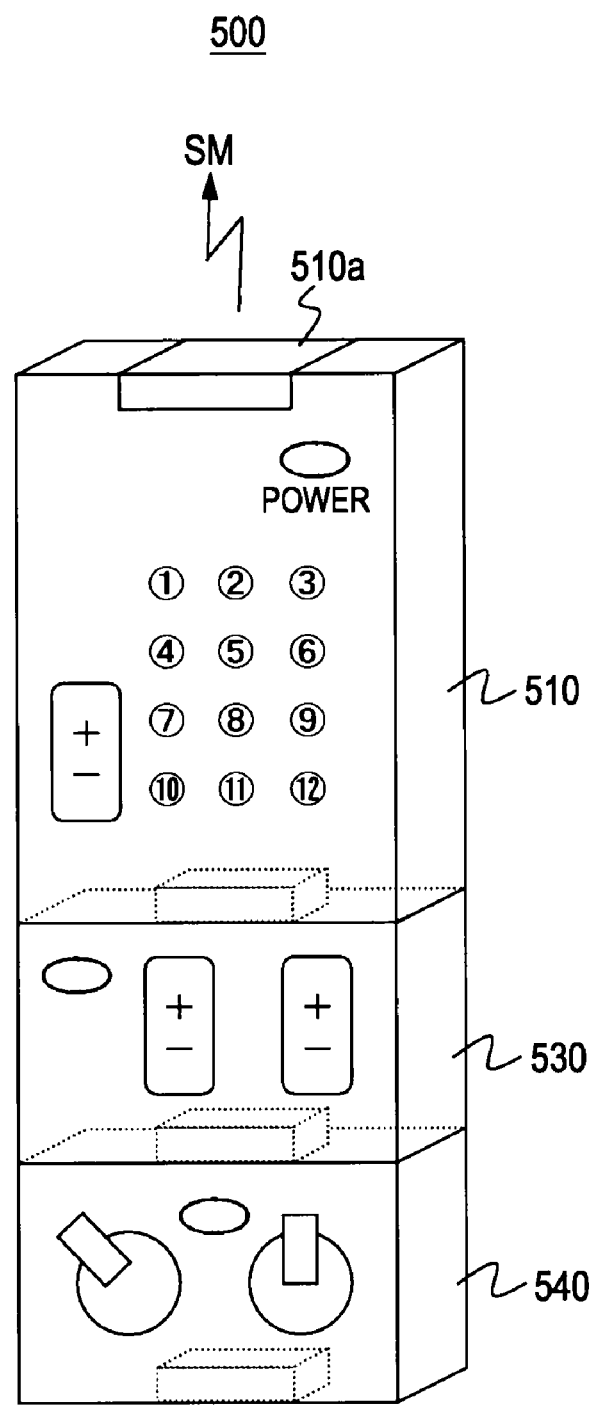
FIG. 40 is a diagram illustrating an example configuration of anassembled remote controller.

FIG. 40 illustrates the configuration of the remote controller 500 according to the fifth example. In the fifth example, the remote controller 500 is configured such that the resolution/noise level adjustment unit 530 and the pan-tilt-zoom unit 540 are connected to the base unit 510 in this order. In the fifth example, the priority rank is higher in the order of the pan-tilt-zoom unit 540 and the resolution/noise level adjustment unit 530.

Figure 41:
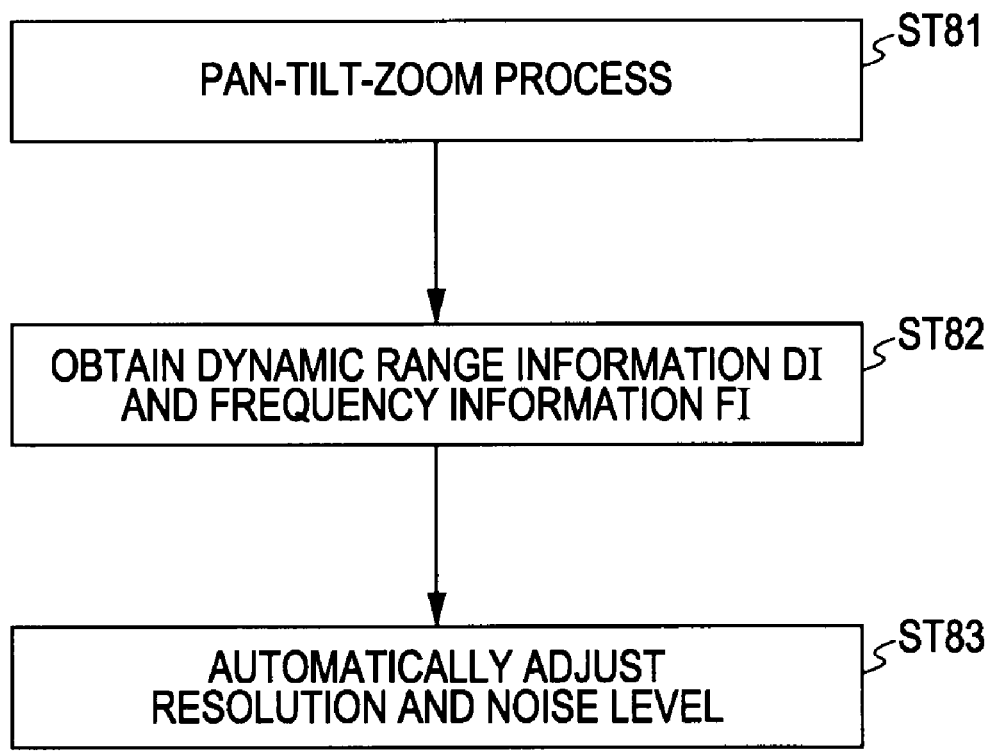
FIG. 41 is a flowchart illustrating a process procedure of the receiver main body section, in a case where the remote controller is configured such that a resolution/noise level adjustment unit and a pan-tilt-zoom unit are connected to a base unit in this order, when a pan-tilt-zoom operation is performed using the pan-tilt-zoom unit.

FIG. 41 is a flowchart illustrating a process procedure of the receiver main body section 100A when a pan-tilt-zoom operation is performed using the pan-tilt-zoom unit 540 in the remote controller 500 that has been assembled in the manner illustrated in FIG. 40.

First, in step ST81, the receiver main body section 100A, namely, the pan-tilt-zoom/track zoom processing section 117, performs a pan-tilt-zoom process on the basis of operation data of the pan-tilt-zoom unit 540. In this case, an SD signal processed in the pan-tilt-zoom/track zoom processing section 117 is supplied to the DRC-volume processing section 116 through the selector 115, and is converted into an HD signal. Thus, an image based on the image signal subjected to the pan-tilt-zoom process is displayed on the display section 122.

Then, in step ST82, the receiver main body section 100A, namely, the dynamic range/frequency analysis section 118, analyzes the image signal subjected to the pan-tilt-zoom process, and obtains dynamic range information DI and frequency information FI.

Then, in step ST83, the receiver main body section 100A, namely, the system controller 101, changes the image quality parameters r and z to be supplied to the DRC-volume processing section 116 on the basis of the dynamic range information DI and frequency information FI obtained in step ST82, and adjusts the resolution and noise level.

Steps ST81 to ST83 illustrated in the flowchart of FIG. 41 correspond to steps ST1 to ST3 illustrated in the flowchart of FIG. 24, respectively, and the details of the processing of the steps above is similar to that described with reference to the flowchart of FIG. 24.

In the television receiver 100 illustrated in FIG. 1, therefore, the remote controller 500 sends transmission data that includes priority data that indicates the priorities of the function operation units (i.e., the track-zoom unit 520, the resolution/noise level adjustment unit 530, and the pan-tilt-zoom unit 540) as well as operation data of the individual units. In the receiver main body section 100A which serves as a device to operate, when operation data included in transmission data is operation data of a function operation unit with the highest priority, an image signal is processed on the basis of this operation data. Then, operation data of the other function operation units are set in the order specified in the priority data to perform processing. In the receiver main body section 100A of the television receiver 100, therefore, the function operations can be performed in an appropriate order, and comfortable and accurate operations for users can be realized.

In the television receiver 100 illustrated in FIG. 1, furthermore, the remote controller 500 is configured such that priorities are assigned to the function operation units in accordance with the order in which the track-zoom unit 520, the resolution/noise level adjustment unit 530, and the pan-tilt-zoom unit 540 are connected to the base unit 510. Since the priorities are assigned in accordance with the connection order, a user can merely change the connection order of the function operation units to easily change the priorities.

Figure 42:
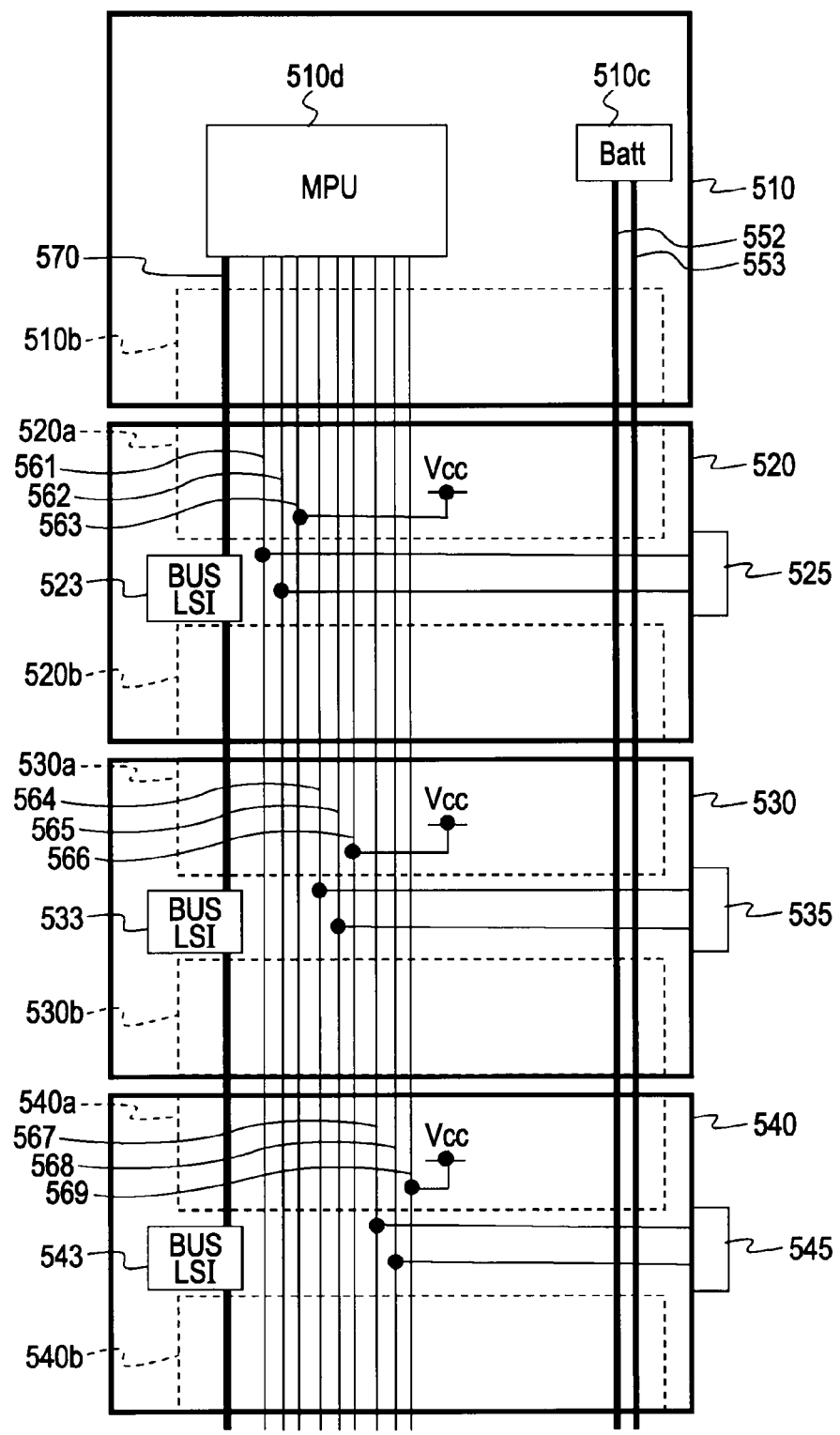
FIG. 42 is a schematic wiring diagram illustrating the connection between units of the remote controller.

The priorities of the function operation units may be assigned on the basis of priority setting values that are set in the function operation units. FIG. 42 is a schematic wiring diagram illustrating the connection between the units of the remote controller 500. In FIG. 42, portions corresponding to those illustrated in FIG. 3 are assigned the same numerals.

In the remote controller 500 illustrated in FIG. 42, setting devices 525, 535, and 545 for setting priorities on the track-zoom unit 520, the resolution/noise level adjustment unit 530, and the pan-tilt-zoom unit 540, respectively, are provided. The setting devices 525, 535, and 545 may be, for example, dual in-line package (DIP) switches. Then, 2-bit setting data that is set by the setting device 525 of the track-zoom unit 520 is supplied to the MPU 510d of the base unit 510 through the data lines 561 and 562. Further, 2-bit setting data that is set by the setting device 535 of the resolution/noise level adjustment unit 530 is supplied to the MPU 510d of the base unit 510 through the data lines 564 and 565. Further, 2-bit setting data that is set by the setting device 535 of the pan-tilt-zoom unit 540 is supplied to the MPU 510d of the base unit 510 through the data lines 567 and 568.

Since each of the function operation units is provided with a setting device configured to set a priority, a user can change the priorities, as desired, using the setting devices without changing the connection order of the function operation units.

In the embodiment and examples described above, the television receiver 100 is used. As alternatives, other devices that perform operations using a remote controller, such as video devices or audio devices, may also be used in a similar manner.

The present application contains subject matter related to that disclosed in Japanese Priority Patent Application JP 2008-182140 filed in the Japan Patent Office on Jul. 14, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A remote controller comprising:
    a base unit having a transmission section configured to transmit a remote control signal;
    a plurality of function operation units connected to the base unit and configured to operate different functions; and
    a priority setting section configured to set priorities of the plurality of function operation units,
    wherein when each of the plurality of function operation units is operated, the transmission section of the base unit sends transmission data, the transmission data including operation data and priority data that indicates the priorities of the plurality of function operation units set by the priority setting section.

2. The remote controller according to claim 1, wherein the priority setting section sets the priorities in accordance with an order in which the plurality of function operation units are connected to the base unit.

3. The remote controller according to claim 2, wherein each of the function operation units includes
    a data obtaining section configured to obtain data from another one of the function operation units that is connected to the function operation unit, the data being adapted to identify the other one of the function operation units, and
    a data supply section configured to supply data to the other one of the function operation units, the data being adapted to identify the function operation unit, and
    wherein the priority data that indicates the priorities of the plurality of function operation units includes data obtained by the data obtaining sections of the plurality of function operation units.

4. The remote controller according to claim 3, wherein the plurality of function operation units send the data obtained by the data obtaining sections to the base unit using different lines.

5. The remote controller according to claim 1, wherein the priority setting section sets the priorities in accordance with priority setting values of the plurality of function operation units.

6. An image signal processing apparatus comprising:
    a transmission data receiving section configured to receive transmission data, the transmission data including operation data and priority data that indicates priorities of a plurality of function operation units;

an image signal processing section configured to process an input image signal to obtain an output image signal; and a control section configured to control an operation of the image signal processing section based on the transmission data received by the transmission data receiving section, wherein when it is determined, based on the priority data included in the transmission data, that the operation data included in the transmission data is operation data of a highest-priority one of the function operation units, the control section controls the operation of the image signal processing section based on the operation data, then sets operation data of the other function operation units in an order specified by the priority data, and performs processing.

7. The image signal processing apparatus according to claim 6, wherein the control section performs at least one of controlling the operation of the image signal processing section based on the set operation data of the other function operation units and superimposing on the output image signal a display signal for presenting the set operation data of the other function operation units to a user.

8. The image signal processing apparatus according to claim 7, wherein the image signal processing section includes an image quality adjustment function section, a pan-tilt-zoom function section, and a track-zoom function section, and wherein when the priority data included in the transmission data received by the transmission data receiving section indicates that a pan-tilt-zoom unit is assigned a highest priority, an image quality adjustment unit is assigned a second highest priority, and a track-zoom unit is assigned a third highest priority and when the operation data included in the transmission data received by the transmission data receiving section is operation data of the pan-tilt-zoom unit, the control section controls an operation of the pan-tilt-zoom function section in the image signal processing section based on the operation data included in the transmission data, then, the control section analyzes the output image signal to create operation data of the image quality adjustment unit, and controls the image quality adjustment function section in the image signal processing section based on the created operation data, and then, the control section detects a possible tracking point from motion of portions on a screen based on the output image signal, and superimposes on the output image signal a display signal for displaying the possible tracking point.

9. The image signal processing apparatus according to claim 7, wherein the image signal processing section includes an image quality adjustment function section, a pan-tilt-zoom function section, and a track-zoom function section, and wherein when the priority data included in the transmission data received by the transmission data receiving section indicates that a pan-tilt-zoom unit is assigned a highest priority, a track-zoom unit is assigned a second highest priority, and an image quality adjustment unit is assigned a third highest priority and when the operation data included in the transmission data received by the transmission data receiving section is operation data of the pan-tilt-zoom unit, the control section controls an operation of the pan-tilt-zoom function section in the image signal processing section based on the operation data included in the transmission data, then, the control section detects a possible tracking point from motion of portions on a screen based on the output image signal, and superimposes on the output image signal a display signal for displaying the possible tracking point, and then, the control section analyzes the output image signal to create recommended operation data of the image quality adjustment unit, and superimposes on the output image signal a display signal for displaying the recommended operation data.

10. The image signal processing apparatus according to claim 7, wherein the image signal processing section includes an image quality adjustment function section, a pan-tilt-zoom function section, and a track-zoom function section, and wherein when the priority data included in the transmission data received by the transmission data receiving section indicates that a track-zoom unit is assigned a highest priority, an image quality adjustment unit is assigned a second highest priority, and a pan-tilt-zoom unit is assigned a third highest priority and when the operation data included in the transmission data received by the transmission data receiving section is operation data of the track-zoom unit, the control section controls an operation of the track-zoom function section in the image signal processing section based on the operation data included in the transmission data, then, the control section analyzes the output image signal to create operation data of the image quality adjustment unit, and controls the image quality adjustment function section in the image signal processing section based on the created operation data, and then, the control section sequentially creates and analyzes image signals for individual zoom ratios, determines a recommended zoom ratio, and superimposes on the output image signal a display signal for displaying the recommended zoom ratio.

11. The image signal processing apparatus according to claim 7, wherein the image signal processing section includes an image quality adjustment function, a pan-tilt-zoom function, and a track-zoom function, and wherein when the priority data included in the transmission data received by the transmission data receiving section indicates that a track-zoom unit is assigned a highest priority, a pan-tilt-zoom unit is assigned a second highest priority, and an image quality adjustment unit is assigned a third highest priority and when the operation data included in the transmission data received by the transmission data receiving section is operation data of the track-zoom unit, the control section controls an operation of the track-zoom function of the image signal processing section based on the operation data included in the transmission data, then, the control section extracts an object based on the output image signal, and superimposes on the output image signal a display signal for displaying possible objects to be zoomed, and then, when one of the displayed possible objects to be zoomed is selected, the control section analyzes the output image signal to create recommended operation data of the image quality adjustment unit, and superimposes on the output image signal a display signal for displaying the recommended operation data.

12. An image signal processing method comprising the steps of:

receiving transmission data, the transmission data including operation data and priority data that indicates priorities of a plurality of function operation units; and processing an input image signal to obtain an output image signal, wherein when it is determined, based on the priority data included in the received transmission data, that the operation data included in the received transmission data is operation data of a highest-priority one of the function operation units, the input image signal is processed based on the operation data, then operation data of the other function operation units is set in an order specified by the priority data, and processing is performed.

* * * * *